(12) United States Patent
Gotoh et al.

(10) Patent No.: US 7,529,160 B2
(45) Date of Patent: May 5, 2009

(54) METHOD AND APPARATUS FOR SIMULTANEOUS RECORDING AND REPRODUCING INFORMATION RECORDING MEDIUM THEREFOR

(75) Inventors: Yoshiho Gotoh, Osaka (JP); Miyuki Sasaki, Osaka (JP); Kaoru Murase, Nara (JP); Tatsushi Bannai, Osaka (JP)

(73) Assignee: Panasonic Corporation, Kadoma (JP)

( * ) Notice: Subject to any disclaimer, the term of this patent is extended or adjusted under 35 U.S.C. 154(b) by 547 days.

(21) Appl. No.: 10/488,195

(22) PCT Filed: Aug. 29, 2002

(86) PCT No.: PCT/JP02/08766

§ 371 (c)(1),
(2), (4) Date: Oct. 15, 2004

(87) PCT Pub. No.: WO03/019554

PCT Pub. Date: Mar. 6, 2003

(65) Prior Publication Data

US 2005/0068819 A1     Mar. 31, 2005

(30) Foreign Application Priority Data

| Aug. 30, 2001 | (JP) | ............................. 2001-262481 |
| Sep. 25, 2001 | (JP) | ............................. 2001-292592 |
| Jul. 30, 2002 | (JP) | ............................. 2002-221635 |
| Aug. 19, 2002 | (JP) | ............................. 2002-238590 |

(51) Int. Cl.
*G11B 7/085* (2006.01)

(52) U.S. Cl. .................................. 369/30.23; 369/47.33

(58) Field of Classification Search ... 369/47.32–47.34, 369/30.23–30.24
See application file for complete search history.

(56) References Cited

U.S. PATENT DOCUMENTS

| 5,343,452 A | * | 8/1994 | Maeda et al. | ............. 369/30.25 |
| 5,436,875 A | * | 7/1995 | Shinada | ................... 369/30.23 |
| 5,526,132 A | * | 6/1996 | Tsubota et al. | ................. 386/52 |

(Continued)

FOREIGN PATENT DOCUMENTS

JP          9-63190         3/1997

(Continued)

*Primary Examiner*—Tan X Dinh
(74) *Attorney, Agent, or Firm*—Renner, Otto, Boisselle & Sklar, LLP

(57) ABSTRACT

In order to perform simultaneous recording of a plurality of pieces of real time data, a large capacity of buffer memories were required. In addition, it was difficult to reproduce data which was recorded by a different apparatus. The present invention has an objective of providing an information recording medium, a simultaneous recording method, and an information recording and reproduction apparatus which guarantee simultaneous recording. The simultaneous recording is guaranteed by reproducing data in each of areas having at least a minimum size fulfilling the simultaneous recording condition which allows for the number of access operations which is twice the number of pieces of real time data to be recorded, and when the data amount in the buffer is empty, switching the current recording operation to another recording operation to continue recording.

22 Claims, 39 Drawing Sheets

U.S. PATENT DOCUMENTS

| | | | | |
|---|---|---|---|---|
| 5,831,955 A | * | 11/1998 | Arataki et al. | 369/47.32 |
| 6,018,612 A | * | 1/2000 | Thomason et al. | 386/82 |
| 6,240,244 B1 | | 5/2001 | Ikeda | 386/125 |
| 6,594,203 B2 | * | 7/2003 | Ueki | 369/30.23 |
| 6,826,132 B2 | * | 11/2004 | Mitsuno | 369/30.23 |
| 7,233,553 B2 | * | 6/2007 | Gotoh et al. | 369/47.32 |

FOREIGN PATENT DOCUMENTS

| | | |
|---|---|---|
| JP | 10-322662 | 12/1998 |
| JP | 2001-43631 | 2/2001 |
| JP | 2001-094906 | 4/2001 |
| WO | 99/48094 | 9/1999 |

* cited by examiner

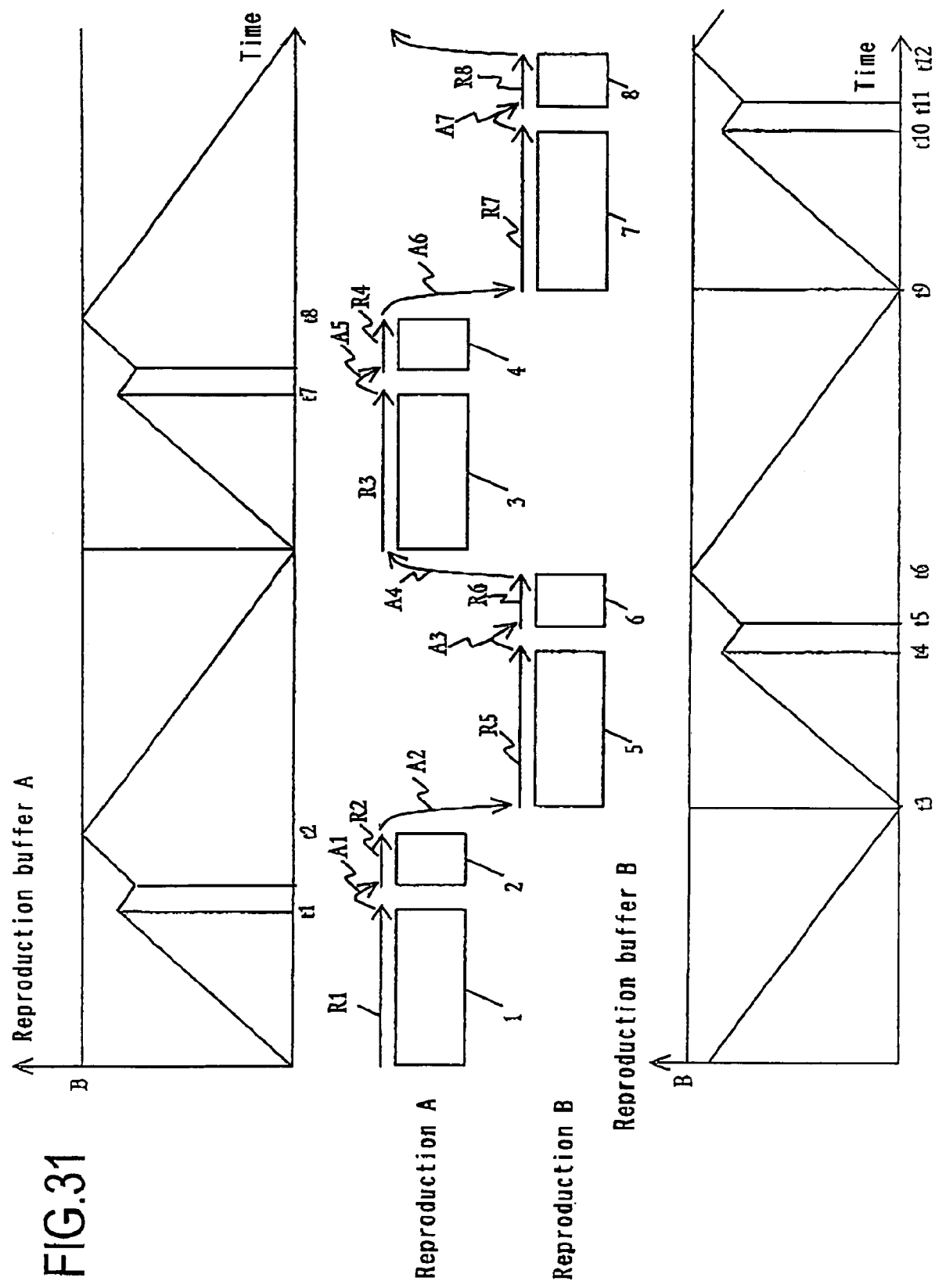

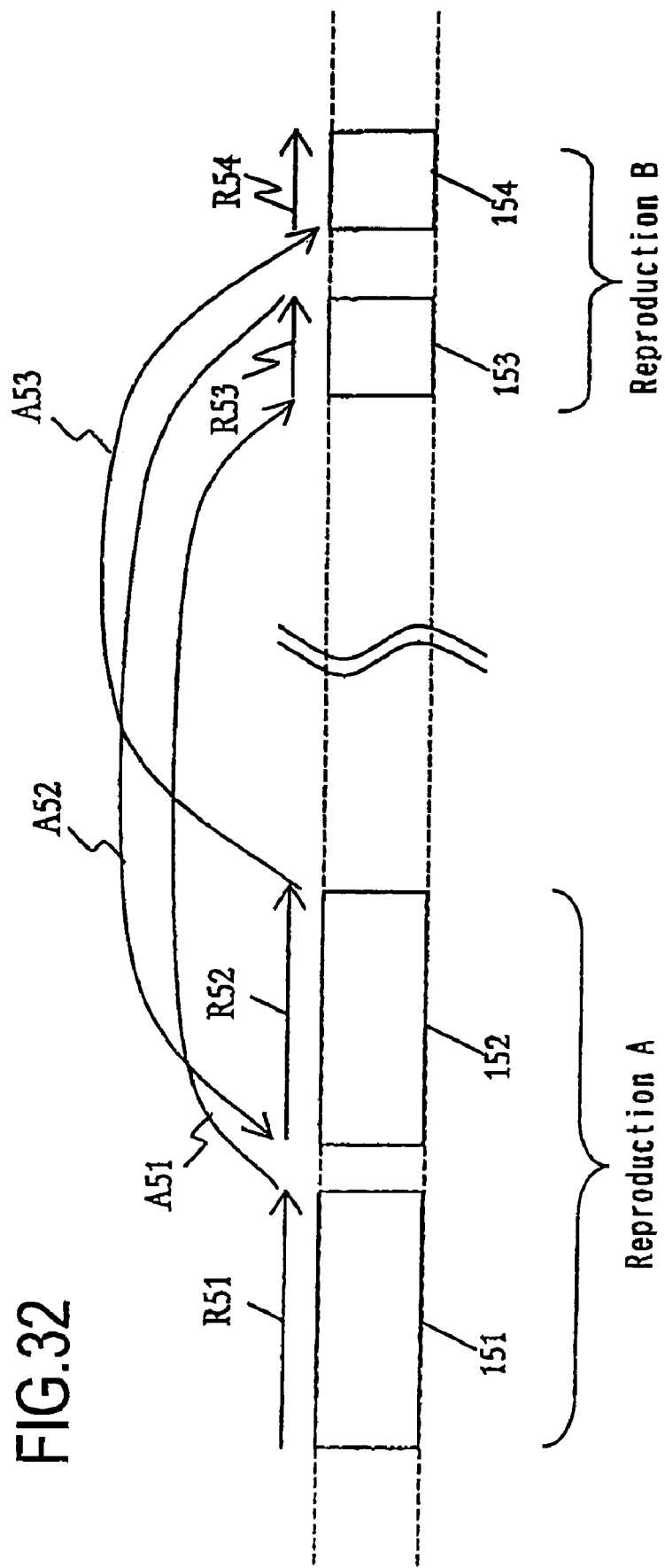

METHOD AND APPARATUS FOR SIMULTANEOUS RECORDING AND REPRODUCING INFORMATION RECORDING MEDIUM THEREFOR

TECHNICAL FIELD

The present invention relates to an information recording medium, a method for simultaneous recording, a method for simultaneous reproduction, an information recording apparatus, and an information reproduction apparatus capable of simultaneous recording or reproduction of a plurality of pieces of real time data.

BACKGROUND ART

One exemplary information recording medium having a sector structure is a hard disc. Hard discs, which are increasing more and more in memory capacity and used for multimedia contents, are applied in wider fields including personal computers and various consumer apparatuses.

Hereinafter, simultaneous recording in a conventional hard disc will be described with reference to the figures. In hard discs, the size of recording areas is pre-fixed to be a unit larger than a sector, and access is performed in units of fixed-sized block.

FIG. 2 shows a model for simultaneously recording a plurality of pieces of real time data. This model includes a pickup 74 for recording real time data to and reproducing real time data from an information recording medium, an encoder A (encoder 70) for encoding first real time data, a recording buffer A (recording buffer 72) for temporarily storing the encoded first real time data before the first real time data is recorded by the pickup 74, an encoder B (encoder 71) for encoding second real time data, and a recording buffer B (recording buffer 73) for temporarily storing the encoded second real time data before the second real time data is recorded by the pickup 74.

FIG. 38 shows an example in which two pieces of real time data are recorded on an information recording medium while ensuring continuity using the recording buffers A and B. In this example, while the first real time data is recorded in areas 83 and 85 of the information recording medium, the second real time data is recorded in areas 81 and 84 of the information recording medium.

In FIG. 38, A81, A82 and A83 refer to operations of the pickup 74 of moving between areas to be accessed (access operations). It is assumed here that the time required for each of the access operations A81, A82 and A83 is a time period required for the pickup 74 to move between an innermost area and an outermost area of the information recording medium. (i.e., the maximum access time Ta). It is also assumed that the data transfer rate between the pickup 74 and each of the recording buffers A and B is a constant rate Vt. It is also assumed that the data transfer rate between each of the encoders A and B and each of the recording buffers A and B is a constant rate Vd. In the case where the data to be recorded is compressed at a variable rate, Vd is the maximum value of the range in which the rate is variable.

In a recording operation W81, data accumulated in the recording buffer A is all recorded in the area 81. Then, data is accumulated in the recording buffer A during the access operation A81, a recording operation W86 and the access operation A82. In a recording operation W86, data accumulated in the recording buffer A is all recorded in the area 84. Then, data is accumulated in the recording buffer A during the access operation A83, a recording operation W87 and the next access operation (not shown).

During the recording operation W81 and the access operation A81, data is accumulated in the recording buffer B. In the recording operation W86, data accumulated in the reproduction buffer B is all recorded in the area 83. Then, during the access operation A82, the recording operation W82 and the access operation A83, data is accumulated in the recording buffer B. In the recording operation W87, data accumulated in the recording buffer B is all recorded in the area 85.

In the case where the transfer rate is constant, the data amount in the recording buffer A is balanced between a recording state and a non-recording state. The data amount in the recording buffer B is also balanced between a recording state and a non-recording state. Since the recording of the first real time data (recording A) and the recording of the second real time data (recording B) are performed alternately, the two pieces of real time data can be recorded continuously.

The example shown in FIG. 38 shows a condition for the minimum size of the areas in which data can be recorded and reproduced. Namely, since it cannot be defined where in the Information recording medium (disc) the areas for recording and reproduction exist, the access between the recording areas is considered based on the maximum access time including the time period until the rotation rate of the disc becomes a desired value.

FIG. 39 shows a transition in the data amounts in the recording buffer A and the recording buffer B while the data is recorded at a variable rate. In the case where data of more than or equal to the size of the recording area is not accumulated in the recording buffer A at the time of termination of a series of operations of: a recording operation W91, an access operation A91, a recording operation W96, and an access operation A92, a low recording rate results in the state where there is no sufficient data to be recorded. Thus, the recording operation is temporarily interrupted, which extends the time required for recording. In this case, an access operation A93 is performed for accessing a recording area for another piece of real time data, and thus a recording operation W97 is performed. In the case as described above where the data is recorded and access is performed, both in units of fixed-size block, the memory size required for the recording buffer A is a sum of the amount of data accumulated during two access operations and one recording operation and the size of the fixed block. The recording buffer B needs to have the same memory size as that of the recording buffer A.

In the case of a hard disc, data transfer capability is high. Therefore, the size of the fixed block can be reduced and the size of the buffer memory can also be reduced.

However, when the above-described system of simultaneous recording is applied to an optical disc, there is a problem in that a large buffer memory is necessary. The reasons are that the data transfer rate of the optical disc is low and the access time is long. There is another problem in that simultaneous recording needs to be performed stably. In addition, there is a need for simultaneously reproducing a plurality of pieces of real time data which have been recorded and edited.

DISCLOSURE OF THE INVENTION

A method according to the present invention is for simultaneously recording a plurality of pieces of real time data on an information recording medium in accordance with a simultaneous recording model. The simultaneous recording model includes a pickup P for accessing an area on the information recording medium, an encoding module EMi for encoding real time data Di, and a recording buffer WBi for accumulating the encoded real time data Di. The method comprising the steps of searching for an unassigned area in a volume space in the information recording medium and assigning at least one unassigned area in the volume space as an area Ai in which the real time data Di is to be recorded; executing a recording operation Wi for recording the real time data DI accumulated in the recording buffer WBi in the area Ai; and determining whether the recording buffer WBi is empty or not while the recording operation Wi is being executed; when the recording buffer WBi is determined to be empty, switching the recording operation Wi to another recording operation Wj ($i \neq j$); and when the recording buffer WBi is determined not to be empty, continuing the recording operation Wi. Each of the at least one area assigned as the area Ai is structured to fulfill a simultaneous recording condition that the recording buffer WBi can be made empty by at most one access operation and at most two recording operations. i is any integer of 1 or greater and n or less, and n is any Integer of 2 or greater which represents the number of the plurality of pieces of real time data for simultaneous recording.

Each of the at least one area assigned as the area Ai has a size of Y or greater. $Y = 2 \times n \times Ta \times Vd \times Vt \div (Vt - n \times Vd)$. Ta is an access time required for the pickup P to access between an innermost area and an outermost area of the information recording medium. Vt is a data transfer rate between the pickup P and the recording buffer WBi. Vd is a data transfer rate between the encoding module EMi and the recording buffer WBi for all values of i.

Each of the at least one area assigned as the area Ai has a size of Yi or greater. $Yi = (2 \times n \times Ta \times Vt \times Vdi) + \{Vt - (Vd1 + Vd2 + \ldots + Vdn)\}$. Ta is an access time required for the pickup P to access between an innermost area and an outermost area of the information recording medium. Vt is a data transfer rate between the pickup P and the recording buffer WBi. Vdi Is a data transfer rate between the encoding module EMi and the recording buffer WBi.

The method further includes the steps of estimating a first access time required for the pickup P to access from the area Ai to an area Aj and a second access time required for the pickup P to access from one area among the at least one area assigned as the area Ai to another area.

Each of the at least one area assigned as the area Ai has a size of Y or greater. $Y = \{2 \times (T1 + \ldots + Tn) \times Vt \times Vd\} \div (Vt - n \times Vd)$. Ti is the first access time or the second access time. Vt is a data transfer rate between the pickup P and the recording buffer WBi. Vd is a data transfer rate between the encoding module EMi and the recording buffer WBi for all values of i.

Each of the at least one area assigned as the area Ai has a size of Yi or greater. $Yi = \{2 \times (Ti + \ldots + Tn) \times Vt \times Vdi\} + \{Vt - (Vd1 + Vd2 + \ldots + Vdn)\}$. Ti is the first access time or the second access time. Vt is a data transfer rate between the pickup P and the recording buffer WBi. Vdi is a data transfer rate between the encoding module EMi and the recording buffer WBi.

The area Ai is provided in an outer portion of the information recording medium for all values of i.

A method according to the present invention is for simultaneously recording a plurality of pieces of real time data on an information recording medium in accordance with a simultaneous recording model. The simultaneous recording model includes a pickup P for accessing an area on the information recording medium, an encoding module EMi for encoding real time data Di, and a recording buffer WBi for accumulating the encoded real time data Di. The method includes the steps of searching for an unassigned area in a volume space in the information recording medium and assigning at least one unassigned area in the volume space as an area Ai in which the real time data Di is to be recorded; executing a recording operation Wi for recording the real time data Di accumulated in the recording buffer WBi in the area Ai; and determining whether the real time data Di has been recorded up to an end of one of at least one area assigned as the area Ai in the recording operation Wi or not; when the real time data Di is determined to have been recorded up to the end, switching the recording operation Wi to another recording operation Wj ($i \neq J$); and when the real time data Di is determined not to have been recorded up to the end, continuing the recording operation Wi. Each of the at least one area assigned as the area Ai is structured to fulfill a simultaneous recording condition that the real time data Di, which is accumulated in the recording buffer WBi during n number of access operations accompanying switching between the recording operations and (n-1) number of recording operations, can be recorded by one recording operation. i is any integer of 1 or greater and n or less, and n is any integer of 2 or greater which represents the number of the plurality of pieces of real time data for simultaneous recording.

Each of the at least one area assigned as the area Ai has a size of Yi. $Yi = (n \times Ta \times Vt \times Vdi) + \{Vt - (Vd1 + Vd2 + \ldots + Vdn)\}$. Ta is an access time required for the pickup P to access between an innermost area and an outermost area of the Information recording medium. Vt is a data transfer rate between the pickup P and the recording buffer WBi. Vdi is a data transfer rate between the encoding module EMi and the recording buffer WBi.

The method further includes the steps of estimating an access time required for the pickup P to access from the area Ai to an area Aj.

Each of the at least one area assigned as the area Ai has a size of Y. $Y = \{(T1 + \ldots + Tn) \times Vt \times Vd\} + (Vt - n \times Vd)$. Ti is the access time. Vt Is a data transfer rate between the pickup P and the recording buffer WBi. Vd is a data transfer rate between the encoding module EMi and the recording buffer WBi for all values of i.

Each of the at least one area assigned as the area Ai has a size of Yi. $Yi = \{(T1 + \ldots + Tn) \times Vt \times Vdi\} \div \{Vt - (Vd1 + Vd2 + \ldots + Vdn)\}$. Ti Is the access time. Vt is a data transfer rate between the pickup P and the recording buffer WBi. Vdi is a data transfer rate between the encoding module EMi and the recording buffer WBi.

The area Ai is provided in an outer portion of the information recording medium for all values of i.

An information recording apparatus according to the present invention is for simultaneously recording a plurality of pieces of real time data on an information recording medium in accordance with a simultaneous recording model. The simultaneous recording model includes a pickup P for accessing an area on the information recording medium, an encoding module EMi for encoding real time data Di, and a recording buffer WBi for accumulating the encoded real time data Di. The information recording apparatus includes means for searching for an unassigned area in a volume space in the information recording medium and assigning at least one unassigned area in the volume space as an area Ai in which the real time data Di is to be recorded: means for executing a recording operation Wi for recording the real time data Di accumulated in the recording buffer WBi in the area Ai; and means for determining whether the recording buffer WBi is empty or not while the recording operation Wi is being executed; when the recording buffer WBi is determined to be empty, switching the recording operation Wi to another recording operation Wj ($i \neq j$); and when the recording buffer WBi is determined not to be empty, continuing the recording operation Wi. Each of the at least one area assigned as the area Ai is structured to fulfill a simultaneous recording condition that the recording buffer WBi can be made empty by at most one access operation and at most two recording operations. i is any integer of 1 or greater and n or less, and n is any integer of 2 or greater which represents the number of the plurality of pieces of real time data for simultaneous recording.

An information recording apparatus according to the present invention is for simultaneously recording a plurality of pieces of real time data on an information recording medium in accordance with a simultaneous recording model. The simultaneous recording model includes a pickup P for accessing an area on the information recording medium, an encoding module EMi for encoding real time data Di, and a recording buffer WBi for accumulating the encoded real time data Di. The information recording apparatus includes means for searching for an unassigned area in a volume space in the information recording medium and assigning at least one unassigned area in the volume space as an area Ai in which the real time data Di is to be recorded; means for executing a recording operation Wi for recording the real time data Di accumulated in the recording buffer WBi in the area Ai; and means for determining whether the real time data Di has been recorded up to an end of one of at least one area assigned as the area Ai in the recording operation Wi or not; when the real time data Di is determined to have been recorded up to the end, switching the recording operation Wi to another recording operation Wj ($i \neq j$); and when the real time data Di is determined not to have been recorded up to the end, continuing the recording operation Wi. Each of the at least one area assigned as the area Ai is structured to fulfill a simultaneous recording condition that the real time data Di, which is accumulated in the recording buffer WBi during n number of access operations accompanying switching between the recording operations and (n−1) number of recording operations, can be recorded by one recording operation. i is any integer of 1 or greater and n or less and n is any integer of 2 or greater which represents the number of the plurality of pieces of real time data for simultaneous recording.

An information recording medium having a plurality of pieces of real time data recorded thereon in accordance with a simultaneous recording model is provided. The simultaneous recording model includes a pickup P for accessing an area on the information recording medium, an encoding module EMi for encoding real time data Di, and a recording buffer WBi for accumulating the encoded real time data Di. Each of at least one area assigned as an area Ai in which the real time data Di accumulated in the recording buffer WBi is to be recorded is structured to fulfill a simultaneous recording condition that the recording buffer WBi can be made empty by at most one access operation and at most two recording operations. i is any integer of 1 or greater and n or less and n is any integer of 2 or greater which represents the number of the plurality of pieces of real time data for simultaneous recording.

Each of the at least one area assigned as the area Ai has a size of Y or greater. $Y = 2 \times n \times Ta \times Vd \times Vt + (Vt - n \times Vd)$. Ta is an access time required for the pickup P to access between an innermost area and an outermost area of the information recording medium. Vt is a data transfer rate between the pickup P and the recording buffer WBi. Vd is a data transfer rate between the encoding module EMi and the recording buffer WBi for all values of i.

Each of the at least one area assigned as the area Ai has a size of Yi or greater. $Yi = (2 \times n \times Ta \times Vt \times Vdi) \div \{Vt - (Vd1 + Vd2 + \ldots + Vdn)\}$. Ta is an access time required for the pickup P to access between an innermost and an outermost area of the information recording medium. Vt is a data transfer rate between the pickup P and the recording buffer WBi. Vdi is a data transfer rate between the encoding module EMi and the recording buffer WBi.

Each of the at least one area assigned as the area Ai has a size of Y or greater. $Y = \{2 \times (T1 + \ldots + Tn) \times Vt \times Vd\} + (Vt - n \times Vd)$. Ti is an estimated first access time required for the pickup P to access from the area Ai to an area Aj or an estimated second access time required for the pickup P to access from one area among the at least one area assigned as the area Ai to another area. Vt is a data transfer rate between the pickup P and the recording buffer WBi. Vd is a data transfer rate between the encoding module EMi and the recording buffer WBi for all values of i.

Each of the at least one area assigned as the area Ai has a size of Yi or greater. $Yi = \{2 \times (T1 + \ldots + Tn) \times Vt \times Vdi\} \div \{Vt - (Vd1 + Vd2 + \ldots + Vdn)\}$. Ti is an estimated first access time required for the pickup P to access from the area Al to an area Aj or an estimated second access time required for the pickup P to access from one area among the at least one area assigned as the area Ai to another area. Vt is a data transfer rate between the pickup P and the recording buffer WBi. Vdi is a data transfer rate between the encoding module EMi and the recording buffer WBi.

The area Ai is provided in an outer portion of the information recording medium for all values of i.

An information recording medium having a plurality of pieces of real time data recorded thereon in accordance with a simultaneous recording model is provided. The simultaneous recording model includes a pickup P for accessing an area on the information recording medium, an encoding module EMi for encoding real time data Di, and a recording buffer WBi for accumulating the encoded real time data Di. Each of at least one area assigned as an area Ai in which the real time data Di accumulated in the recording buffer WBi is to be recorded is structured to fulfill a simultaneous recording condition that the real time data Di, which is accumulated in the recording buffer WBi during n number of access operations accompanying switching between the recording operations and (n−1) number of recording operations, can be recorded by one recording operation. i is any integer of 1 or greater and n or less and n is any integer of 2 or greater which represents the number of the plurality of pieces of real time data for simultaneous recording.

Each of the at least one area assigned as the area Ai has a size of Yi. $Yi = (n \times Ta \times Vt \times Vdi) \div \{Vt - (Vd1 + Vd2 + \ldots + Vdn)\}$. Ta is an access time required for the pickup P to access between an innermost area and an outermost area of the information recording medium. Vt is a data transfer rate between the pickup P and the recording buffer WBi. Vdi is a data transfer rate between the encoding module EMi and the recording buffer WBi.

Each of the at least one area assigned as the area Ai has a size of Y. $Y = \{(T1 + \ldots + Tn) \times Vt \times Vd\} + (Vt - n \times Vd)$. Ti is an estimated access time required for the pickup P to access from the area Ai to an area Aj. Vt is a data transfer rate between thee pickup P and the recording buffer WBi. Vd is a data transfer rate between the encoding module EMi and the recording buffer WBi for all values of i.

Each of the at least one area assigned as the area Ai has a size of Yi. $Yi = \{(T1 + \ldots + Tn) \times Vt \times Vdi\} \div \{Vt - (Vd1 + Vd2 + \ldots + Vdn)\}$. Ti is an estimated access time required for the pickup P to access from the area Ai to an area Aj. Vt is a data transfer rate between the pickup P and the recording buffer WBi. Vdi is a data transfer rate between the encoding module EMi and the recording buffer WBi.

The area Ai is provided in an outer portion of the information recording medium for all values of i.

A method according to the present invention is for simultaneously reproducing a plurality of pieces of real time data recorded on an information recording medium in accordance with a simultaneous reproduction model. The simultaneous reproduction model includes a pickup P for accessing an area on the information recording medium, a reproduction buffer RBi for accumulating real time data Di read from the information recording medium, and a decoding module DMi for decoding the real time data Di accumulated in the reproduction buffer RBi. The method includes the steps of executing a reproduction operation Ri for reading the real time data Di from an area Ai having the real time data Di recorded therein; determining whether the reproduction buffer RBi is full or not while the reproduction operation Ri is being executed; when the reproduction buffer RBi is determined to be full, switching the reproduction operation Ri to another reproduction operation Rj (i≠J); and when the reproduction buffer RBi is determined not to be full, continuing the reproduction operation Ri. Each of at least one area assigned as the area Ai is structured to fulfill a simultaneous reproduction condition that the reproduction buffer RBi can be made full by at most one access operation and at most two reproduction operations. i is any integer of 1 or greater and n or less and n is any integer of 2 or greater which represents the number of the plurality of pieces of real time data for simultaneous reproduction.

Each of the at least one area assigned as the area Ai has a size of Y or greater. $Y=2 \times n \times Ta \times Vd \times Vt+(Vt-n \times Vd)$. Ta is an access time required for the pickup P to access between an innermost area and an outermost area of the information recording medium. Vt is a data transfer rate between the pickup P and the reproduction buffer RBi. Vd is a data transfer rate between the decoding module DMi and the reproduction buffer RBi for all values of i.

Each of the at least one area assigned as the area Ai has a size of Yi or greater. $Yi=(2 \times n \times Ta \times Vt \times Vdi) \div \{Vt-(Vd1+Vd2+\ldots+Vdn)\}$. Ta is an access time required for the pickup P to access between an innermost area and an outermost area of the information recording medium. Vt is a data transfer rate between the pickup P and the reproduction buffer RBi. Vdi is a data transfer rate between the decoding module DMi and the reproduction buffer RBi.

The method further includes the steps of estimating a first access time required for the pickup P to access from the area Ai to an area Aj and a second access time required for the pickup P to access from one area among the at least one area assigned as the area Ai to another area.

Each of the at least one area assigned as the area Ai has a size of Y or greater. $Y=\{2 \times (T1+\ldots+Tn) \times Vt \times Vd\}+(Vt-n \times Vd)$. Ti is the first access time or the second access time. Vt is a data transfer rate between the pickup P and the reproduction buffer RBi. Vd is a data transfer rate between the decoding module DMj and the reproduction buffer RBi for all values of j.

Each of the at-least one area assigned as the area Ai has a size of Yi or greater. $Yi=\{2 \times (T1+\ldots+Tn) \times Vt \times Vdi\} \div \{Vt-(Vd1+Vd2+\ldots+Vdn)\}$. Ti is the first access time or the second access time. Vt is a data transfer rate between the pickup P and the reproduction buffer RBi. Vdi is a data transfer rate between the decoding module DMi and the reproduction buffer RBi.

The area Ai is provided in an outer portion of the information recording medium for all values of i.

Real time data D1 through Dn includes video data and a plurality of pieces of audio data, and a portion of the video data and at least one piece of the plurality of pieces of audio data are simultaneously reproduced.

A method according to the present invention is for simultaneously reproducing a plurality of pieces of real time data recorded on the information recording medium in accordance with a simultaneous reproduction model. The simultaneous reproduction model includes a pickup P for accessing an area on an information recording medium, a reproduction buffer RBi for accumulating real time data Di read from the information recording medium, and a decoding module DMi for decoding the real time data Di accumulated in the reproduction buffer RBi. The method includes the steps of executing a reproduction operation Ri for reading the real time data Di from an area Ai having the real time data Di recorded therein; and determining whether the real time data Di has been reproduced up to an end of one of at least one area assigned as the area Ai in the reproduction operation Ri or not; when the real time data Di is determined to have been reproduced up to the end, switching the reproduction operation Ri to another reproduction operation Rj (i≠j); and when the real time data Di is determined not to have been reproduced up to the end, continuing the reproduction operation Ri. Each of the at least one area assigned as the area Ai is structured to fulfill a simultaneous reproduction condition that the real time data Di, which is accumulated in the reproduction buffer RBi during one reproduction operation, can be consumed during n number of access operations accompanying switching between the reproduction operations and (n−1) number of reproduction operations. i is any integer of 1 or greater and n or less and n is any integer of 2 or greater which represents the number of the plurality of pieces of real time data for simultaneous reproduction.

Each of the at least one area assigned as the area Al has a size of Yi. $Yi=(n \times Ta \times Vt \times Vdi)+\{Vt-(Vd1+Vd2+\ldots+Vdn)\}$. Ta is an access time required for the pickup P to access between an innermost area and an outermost area of the information recording medium. Vt is a data transfer rate between the pickup P and the reproduction buffer RBi. Vdi is a data transfer rate between the decoding module DMi and the reproduction buffer RBi.

The method further includes the steps of estimating an access time required for the pickup P to access from the area Ai to an area Aj.

Each of the at least one area assigned as the area Al has a size of Y. $Y=\{(T1+\ldots+Tn) \times Vt \times Vd\} \div (Vt-n \times Vd)$. Ti is the access time. Vt is a data transfer rate between the pickup P and the reproduction buffer RBi. Vd is a data transfer rate between the decoding module DMi and the reproduction buffer RBi for all values of i.

Each of the at least one area assigned as the area Ai has a size of Yi. $Yi=\{(T1+\ldots+Tn) \times Vt \times Vdi\}+\{Vt-(Vd1+Vd2+\ldots+Vdn)\}$. Ti is the access time. Vt is a data transfer rate between the pickup P and the reproduction buffer RBi. Vdi is a data transfer rate between the decoding module DMi and the reproduction buffer RBi.

The area Ai is provided in an outer portion of the information recording medium for all values of i.

Real time data D1 through Dn includes video data and a plurality of pieces of audio data, and a portion of the video data and at least one piece of the plurality of pieces of audio data are simultaneously reproduced.

An information reproduction apparatus according to the present invention is for simultaneously reproducing a plurality of pieces of real time data recorded on an information recording medium in accordance with a simultaneous reproduction model. The simultaneous reproduction model includes a pickup P for accessing an area on the information recording medium, a reproduction buffer RBi for accumulating real time data Di read from the information recording medium, and a decoding module DMi for decoding the real time data Di accumulated in the reproduction buffer RBi. The information reproduction apparatus includes means for executing a reproduction operation Ri for reading the real time data Di from an area Ai having the real time data Di recorded therein; and means for determining whether the reproduction buffer RBi is full or not while the reproduction operation Ri is being executed; when the reproduction buffer RBi is determined to be full, switching the reproduction operation Ri to another reproduction operation Rj (i≠j); and when the reproduction buffer RBi is determined not to be full, continuing the reproduction operation Ri. Each of at least one area assigned as the area Ai is structured to fulfill a simultaneous reproduction condition that the reproduction buffer RBi can be made full by at most one access operation and at most two reproduction operations. i is any integer of 1 or greater and n or less and n is any integer of 2 or greater which represents the number of the plurality of pieces of real time data for simultaneous reproduction.

An information reproduction apparatus according to the present invention is for simultaneously reproducing a plurality of pieces of real time data recorded on an information recording medium in accordance with a simultaneous reproduction model. The simultaneous reproduction model includes a pickup P for accessing an area on the information recording medium, a reproduction buffer RBi for accumulating real time data Di read from the information recording medium, and a decoding module DMi for decoding the real time data Di accumulated in the reproduction buffer RBi. The information reproduction apparatus includes means for executing a reproduction operation Ri for reading the real time data Di from an area Ai having the real time data Di recorded therein; and means for determining whether the real time data Di has been reproduced up to an end of one of at least one area assigned as the area Ai in the reproduction operation Ri or not; when the real time data Di is determined to have been reproduced up to the end, switching the reproduction operation Ri to another reproduction operation Rj (i≠j); and when the real time data Di is determined not to have been reproduced up to the end, continuing the reproduction operation Ri. Each of the at least one area assigned as the area Ai is structured to fulfill a simultaneous reproduction condition that the real time data Di, which is accumulated in the reproduction buffer RBi during one reproduction operation, can be consumed during n number of access operations accompanying switching between the reproduction operations and (n−1) number of reproduction operations. i is any integer of 1 or greater and n or less and n is any integer of 2 or greater which represents the number of the plurality of pieces of real time data for simultaneous reproduction.

A method according to the present invention is for editing a plurality of pieces of real time data recorded on an information recording medium so as to ensure that the plurality of pieces of real time data are simultaneously reproduced in accordance with a simultaneous reproduction model. The simultaneous reproduction model includes a pickup P for accessing an area on the information recording medium, a reproduction buffer RBi for accumulating real time data Di read from the information recording medium, and a decoding module DMi for decoding the real time data Di accumulated in the reproduction buffer RBi. The method includes the steps of selecting at least one area from an area Ai having the real time data Di recorded therein; and determining whether or not each of the selected at least one area is structured to fulfill a simultaneous reproduction condition that the reproduction buffer RBi can be made full by at most one access operation and at most two reproduction operations.

A method according to the present invention is for editing a plurality of pieces of real time data recorded on an information recording medium so as to ensure that the plurality of pieces of real time data are simultaneously reproduced in accordance with a simultaneous reproduction model. The simultaneous reproduction model includes a pickup P for accessing an area on the information recording medium, a reproduction buffer RBi for accumulating real time data Di read from the information recording medium, and a decoding module DMi for decoding the real time data Di accumulated in the reproduction buffer RBi. The method includes the steps of selecting at least one area from an area Ai having the real time data Di recorded therein; and determining whether or not each of the selected at least one area is structured to fulfill a simultaneous reproduction condition that the real time data Di, which is accumulated in the reproduction buffer RBi during one reproduction operation, can be consumed during n number of access operations accompanying switching between the reproduction operations and (n−1) number of reproduction operations.

An editing apparatus according to the present invention is for editing a plurality of pieces of real time data recorded on an information recording medium so as to ensure that the plurality of pieces of real time data are simultaneously reproduced in accordance with a simultaneous reproduction model. The simultaneous reproduction model includes a pickup P for accessing an area on the information recording medium, a reproduction buffer RBi for accumulating real time data Di read from the information recording medium, and a decoding module DMi for decoding the real time data Di accumulated in the reproduction buffer RBi. The editing apparatus includes means for selecting at least one area from an area Ai having the real time data Di recorded therein; and means for determining whether or not each of the selected at least one area is structured to fulfill a simultaneous reproduction condition that the reproduction buffer RBi can be made full by at most one access operation and at most two reproduction operations.

An editing apparatus according to the present Invention is for editing a plurality of pieces of real time data recorded on an information recording medium so as to ensure that the plurality of pieces of real time data are simultaneously reproduced in accordance with a simultaneous reproduction model. The simultaneous reproduction model includes a pickup P for accessing an area on the information recording medium, a reproduction buffer RBi for accumulating real time data Di read from the information recording medium, and a decoding module DMi for decoding the real time data Di accumulated in the reproduction buffer RBi. The editing apparatus includes means for selecting at least one area from an area Ai having the real time data Di recorded therein; and means for determining whether or not each of the selected at least one area is structured to fulfill a simultaneous reproduction condition that the real time data Di, which is accumulated in the reproduction buffer RBi during one reproduction operation, can be consumed during n number of access operations accompanying switching between the reproduction operations and (n−1) number of reproduction operations.

A method according to the present invention to for searching for one piece of video data while reproducing k number of audio data recorded on an Information recording medium in accordance with a simultaneous reproduction model. The simultaneous reproduction model includes a pickup P for accessing an area on the information recording medium, a reproduction buffer RBv for accumulating video data Dv read from the information recording medium, a decoding module DMv for decoding the video data Dv accumulated in the reproduction buffer RBv, a reproduction buffer RBi for accumulating audio data Di read from the information recording medium, and a decoding module DMi for decoding the audio data Di accumulated in the reproduction buffer RBi. The method includes the steps of executing a reproduction operation Rv for partially reading the video data Dv from an area Av having the video data Dv recorded therein; intermittently reproducing the video data Dv from n number of areas in the area Av, and then accessing an area Ai, thereby switching the reproduction operation Rv to a reproduction operation Ri; executing the reproduction operation Ri for reading the audio data Di from the area Ai having the audio data Di recorded therein; and reading an amount of data determined based on a simultaneous reproduction condition from the area Ai, and then accessing the area Av, thereby switching the reproduction operation Ri to the reproduction operation Rv. A simultaneous reproduction condition is fulfilled that the real time data Dj, which is consumed in the reproduction buffer RBi during (n−1) number of access operations to the area Av, n number of reproduction operations from the area Av, an access operation from the area Av to the area Ai, (k−1) number of access operations between the areas Ai, (k−1) number of reproduction operations of the data from the areas Ai, and an access operation from the area Ai to the area Av, is read by one reproduction operation and transferred from the reproduction buffer RBj to the decoding module DMj at the speed of search, which is m times as fast as the normal speed; and i, k and n are each an arbitrary integer.

An information reproduction apparatus according to the present invention is for searching for one piece of video data while reproducing k number of audio data recorded, on an information recording medium in accordance with a simultaneous reproduction model. The simultaneous reproduction model includes a pickup P for accessing an area on the information recording medium, a reproduction buffer RBv for accumulating video data Dv read from the information recording medium, a decoding module DMv for decoding the video data Dv accumulated in the reproduction buffer RBv, a reproduction buffer RBi for accumulating audio data Di read from the information recording medium, and a decoding module DMi for decoding the audio data Di accumulated in the reproduction buffer RBi. The information reproduction apparatus includes means for executing a reproduction operation RV for partially reading the video data Dv from an area Av having the video data Dv recorded therein; means for intermittently reproducing the video data Dv from n number of areas in the area Av, and then accessing an area Ai, thereby switching the reproduction operation RV to a reproduction operation Ri; means for executing the reproduction operation Ri for reading the audio data Di from the area Ai having the audio data Di recorded therein; and means for reading an amount of data determined based on a simultaneous reproduction condition from the area Ai, and then accessing the area Av, thereby switching the reproduction operation Ri to the reproduction operation Rv. A simultaneous reproduction condition is fulfilled that the real time data Dj, which is consumed in the reproduction buffer RBi during (n−1) number of access operations to the area Av, n number of reproduction operations from the area Av, an access operation from the area Av to the area Ai, (k−1) number of access operations between the areas Ai, (k−1) number of reproduction operations of the data from the areas Ai, and an access operation from the area Ai to the area Av, is read by one reproduction operation and transferred from the reproduction buffer RBj to the decoding module DMj at the speed of search, which is m times as fast as the normal speed; and i, k and n are each an arbitrary integer.

BRIEF DESCRIPTION OF THE DRAWINGS

FIG. 30 is a flowchart illustrating a method for simultaneous reproduction from variable-sized recording areas according to the fourth example of the present invention.

FIG. 31 shows a condition for simultaneous reproduction from variable-sized recording areas of the information recording medium according to the fourth example of the present invention.

FIG. 32 shows access operations to reproduction areas on the disc and a layout of fixed-sized recording areas for simultaneous reproduction according to the fourth example of the present invention.

BEST MODE FOR CARRYING OUT THE INVENTION

Hereinafter, embodiments of the present invention will be described by way of drawings.

EXAMPLE 1

A method for performing simultaneous recording of a plurality of pieces of real time data on an information recording medium using a simultaneous recording model will be described. The simultaneous recording model used here has the identical structure to that of the simultaneous recording model shown in FIG. 2 in that two buffers, i.e., the recording buffers A and B are included. The term "real time data" refers to data including at least either video data or audio data. The term "information recording medium" refers to any type of recording medium such as, for example, an optical disc.

Figure 1:
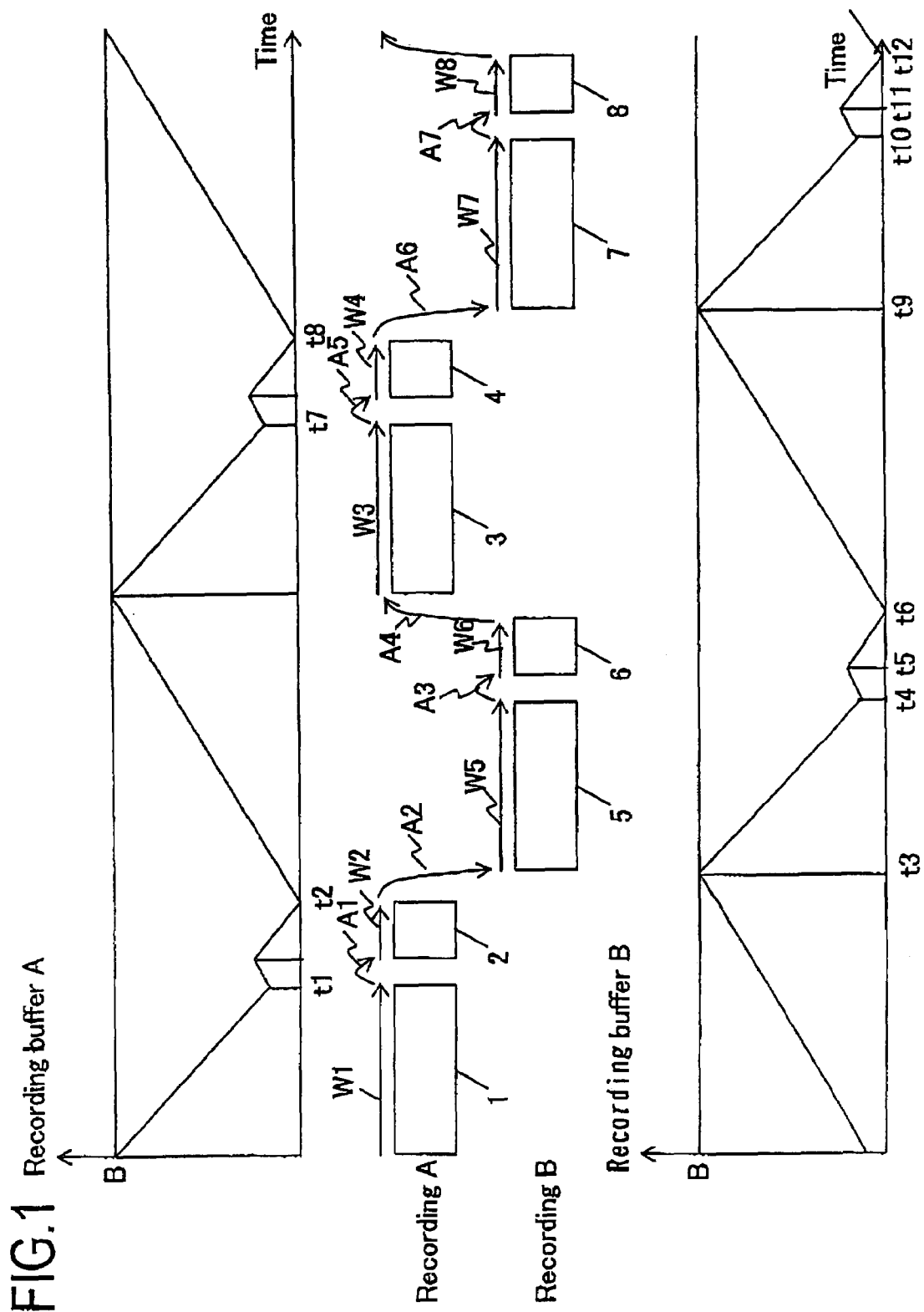
FIG. 1 shows a simultaneous recording condition for an information recording medium according to a first example of the present invention.

FIG. 1 shows a transition in the data amounts in the recording buffers A and B in the simultaneous recording model during simultaneous recording of real time data A and B.

In the example shown in FIG. 1, while the real time data A is recorded in areas 1, 2, 3 and 4 of the information recording medium, real time data B is recorded in areas 5, 6, 7 and 8 of the information recording medium. The areas 1, 2, 3 and 4 are assigned as areas in which the real time data A is to be recorded. The areas 5, 6, 7 and 8 are assigned as areas in which the real time data B is to be recorded.

In FIG. 1, A1 through A7 refer to operations of the pickup 74 of moving between areas to be accessed (access operations). It is assumed here that the time required for each of the access operations A1 through A7 is a time period required for the pickup 74 to move between an innermost area and an outermost area of the information recording medium (i.e., the maximum access time Ta). It is also assumed that the data transfer rate between the pickup 74 and each of the recording buffers A and B is a constant rate Vt. It is also assumed that the data transfer rate between each of the encoders A and B and each of the recording buffers A and B is a constant rate Vd. In the case where the data to be recorded is compressed at a variable rate, Vd is the maximum value of the range in which the rate is variable.

In a recording operation W1, real time data A accumulated in the recording buffer A is recorded in the area 1. When the real time data A is recorded up to the end of the area 1, the recording buffer A is not empty. Therefore, the recording operation of the real time data A (recording A) is not switched to the recording operation of real time data B (recording B). After an access operation A1, in a recording operation W2, real time data A accumulated in the recording buffer A is recorded in the area 2.

While the recording operation W2 is being executed, the recording buffer A becomes empty. As a result, the recording operation of the real time data A (recording A) is switched to the recording operation of the real time data B (recording B)(access operation A2).

In a recording operation W5, the real time data B accumulated in the recording buffer B is recorded in the area 5. When the real time data B is recorded up to the end of the area 5, the recording buffer B it not empty. Therefore, the recording operation of the real time data B (recording B) is not switched to the recording operation of the real time data A (recording A). After an access operation A3, in a recording operation W6, the real time data B accumulated in the recording buffer B is recorded in the area 6.

While the recording operation W6 is being executed, the recording buffer B becomes empty. As a result, the recording operation of the real time data B (recording B) is switched to the recording operation of the real time data A (recording A)(access operation A4).

Thus, the method of simultaneous recording according to the present invention is designed so as to fulfill the simultaneous recording condition that the recording buffers A and B can be made empty by at most one access operation and at most two recording operations. Thus, it is made possible to surely record the real time data A and B on the information recording medium, without causing the recording buffer A and B to overflow, and without causing the recording buffer A and B to underflow.

For example, the above-mentioned condition for simultaneous recording can be fulfilled where each of at least one area assigned as an area in which the real time data A is to be recorded has a size of Y or greater, and each of at least one area assigned as an area in which the real time data B is to be recorded has a size of Y or greater. Accordingly, the condition for simultaneous recording can be fulfilled by searching for at least one unassigned area having a size of Y or greater and assigning the one area thus found as an area in which the real time data A is to be recorded. The area in which the real time data B is to be recorded is obtained in a similar manner.

In the example shown in FIG. 1, the condition for simultaneous recording can be fulfilled where each of the areas 1 through 4 has a size of Y or greater, and each of the areas 5 through 8 has a size of Y or greater.

The minimum size Y for the recording area, and a buffer size B which Is required for each of the recording buffers A and B, are obtained by the following expressions.

$$Y = 4 \times Ta \times Vd \times Vt \div (Vt - 2 \times Vd)$$

$$B = (4 \times Ta + Y \div Vt) \times Vd$$

The expression for obtaining the minimum size Y for the recording area is derived as follows.

During a recording operation for recording the real time data A, the data in the recording buffer A is consumed at Vt−Vd. During an access operation and a recording operation for recording the real time data B, the data in the recording buffer A is accumulated at Vd. The data amount which is consumed from the recording buffer A during the recording operation W1, the access operation A1 and the recording operation W2 is equal to the data amount accumulated in the recording buffer A during the access operation A2, the recording operation W5, the access operation A3, the recording operation W6 and the access operation A4. Accordingly, for simultaneous recording of two pieces of real time data, the following expression is satisfied.

$$Y + Vt \times (Vt - Vd) - Ta \times Vd = (3 \times Ta + Y \div Vt) \times Vd$$

By manipulating this expression, the above expression for obtaining the minimum size Y for the recording area is obtained.

In the case where the number of pieces of real time data which are to be simultaneously recorded is n (n is any integer of 2 or greater), a simultaneous recording model including n number of encoders and n number of recording buffers is used. In this case, the number of access operations is in proportion to the number of pieces of real time data to be simultaneously recorded. Therefore, the following expression is satisfied.

$$Y + Vt \times (Vt - Vd) - Ta \times Vd = ((2 \times n - 1) \times Ta + (n - 1) \times Y \div Vt) \times Vd$$

Accordingly, when the number of pieces of real time data which are to be simultaneously recorded is n, the minimum size Y for the recording area and the size B required for each recording buffer, are obtained by the following expressions.

$$Y = 2 \times n \times Ta \times Vd \times Vt \div (Vt - n \times Vd)$$

$$B = (2 \times n \times Ta + (n - 1) \times Y/Vt) \times Vd$$

One of the differences of the present invention from the prior art is that the number of times of access is doubled according to the present invention. According to the present invention, the access operation is performed when the recording operation of real time data A (recording A) and the recording operation of the real time data B (recording B) are switched to each other, and also when access is performed from one of at least one area assigned as an area in which real time data A (or real time data B) is to be recorded to another area. Accordingly, the present invention provides a model capable of performing an access operation four times from the time when recording buffer A (or the recording buffer B) becomes full until the next time when recording buffer A (or the recording buffer B) becomes full. In this manner, it is made possible to dynamically switch the recording operations in accordance with the transition in the data amounts in the recording buffers. Thus, the transition in the data amounts in the recording buffers can be stably controlled. In more detail, when the data amount in the recording buffer A becomes close to full, the recording operation of the real time data B is immediately switched to the recording operation of the real time data A. In this way, the data amount in the recording buffer A can be decreased. When the data amount in the recording buffer B becomes close to full, the recording operation of the real time data A is immediately switched to the recording operation of the real time data B. In this way, the data amount in the recording buffer B can be decreased.

Figure 3:
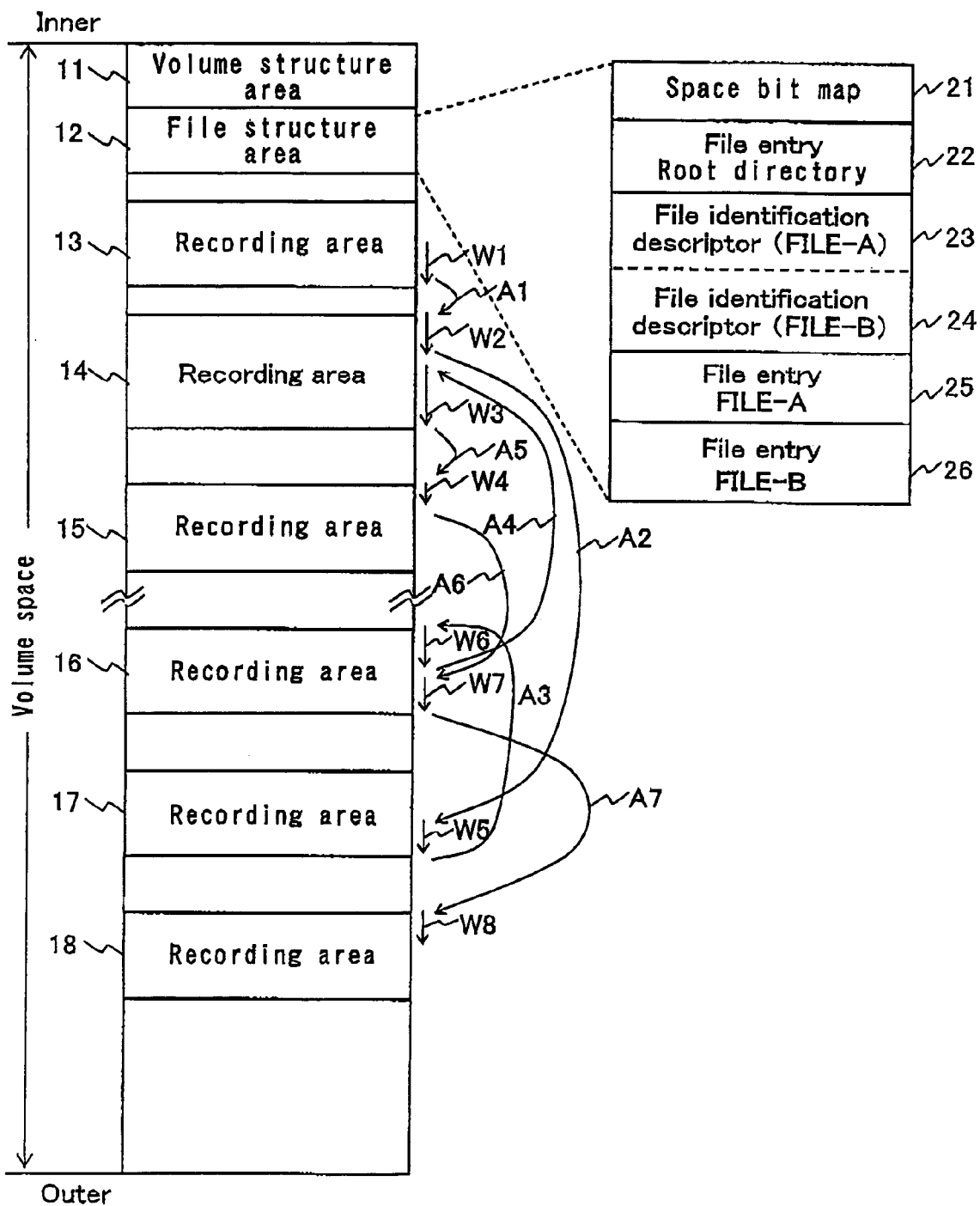
FIG. 3 shows a layout illustrating access operations on the information recording medium according to the first example of the present invention.

FIG. 3 shows an example of arrangement of areas on an information recording medium (optical disc) in which files to be managed by a volume file structure defined by the ECMA167 Standards are recorded.

In FIG. 3, W1 through W8 refer to the recording operations described above with reference to FIG. 1, and A1 through A7 refer to the access operations described above with reference to FIG. 1.

Figure 7:
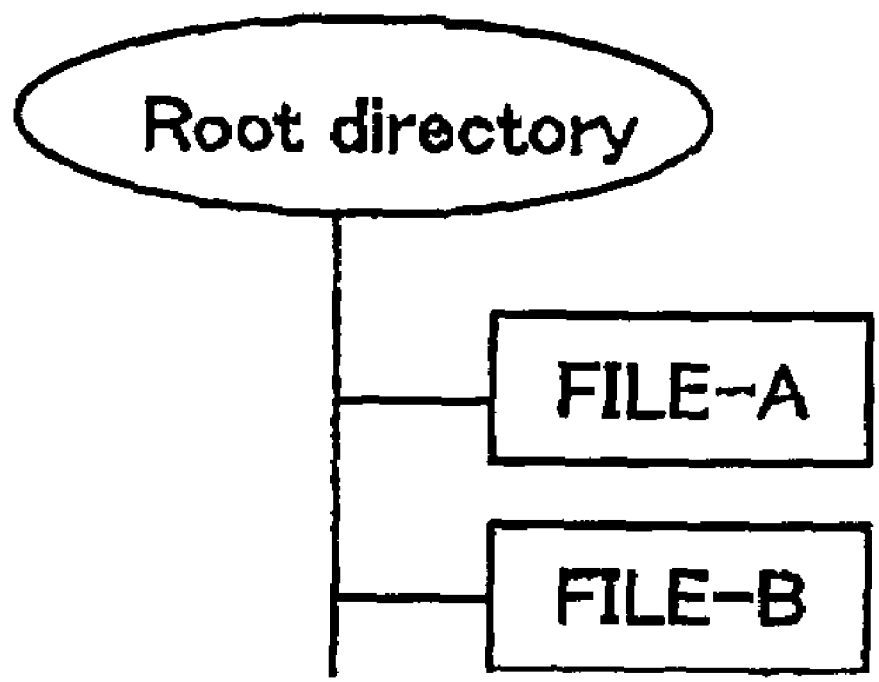
FIG. 7 shows a directory structure of data to be recorded.

In FIG. 3, the top side represents the inner side of the optical disc, and the bottom side represents the outer side of the optical disc. In a volume space, a volume structure area 11 and a file structure area 12 are assigned. The file structure area 12 includes a space bit map 21 in which unused areas in the volume space are registered as unassigned areas sector by sector, and a data structure corresponding to the directory structure shown in FIG. 7 (i.e., a file entry 22 of a root directory, a file identification descriptor 23 of FILE-A, a file identification descriptor 24 of FILE-B, a file entry 25 of FILE-A, and a file entry 26 of FILE-B).

According to the ECMA167 Standards, an area in which the file data is recorded is referred to as an "extent". Positional information of the extent is registered in the file entry. For each file under the directory, a file identification descriptor is recorded in the file structure area 12.

An area in which real time data is recorded is referred to as a "real time extent" so as to be distinguished from the area where general data is recorded.

In the example shown in FIG. 3, as areas in which real time data of FILE-A is to be recorded, recording areas 13, 14 and 15 in an inner portion of the optical disc are assigned. As areas in which real time data of FILE-B is to be recorded, recording areas 16, 17 and 18 in an outer portion of the optical also are assigned. The recording area 15 and the recording area 16 are distanced from each other such that an access time required for access therebetween is equal to an access time required for access between an innermost area and an outermost area of the optical disc.

Each of the recording areas 13 through 18 has a size of Y (minimum size for the recording area) or greater in order to fulfill the above-described simultaneous recording condition. Thus, even when, for example, the real time data is actually recorded in a part of a recording area the real time data can further be recorded in the next recording area after the access operation. Therefore, the real time data can be recorded in an area having a total size of Y or greater. Under the condition for simultaneous recording described above with reference to FIG. 1, a time period required for the access operation (access time) is set to be an access time required for accessing from an innermost area to an outermost area of the optical disc. Therefore, regardless of where in the optical disc the recording area is located, simultaneous recording can be guaranteed.

Figure 4:
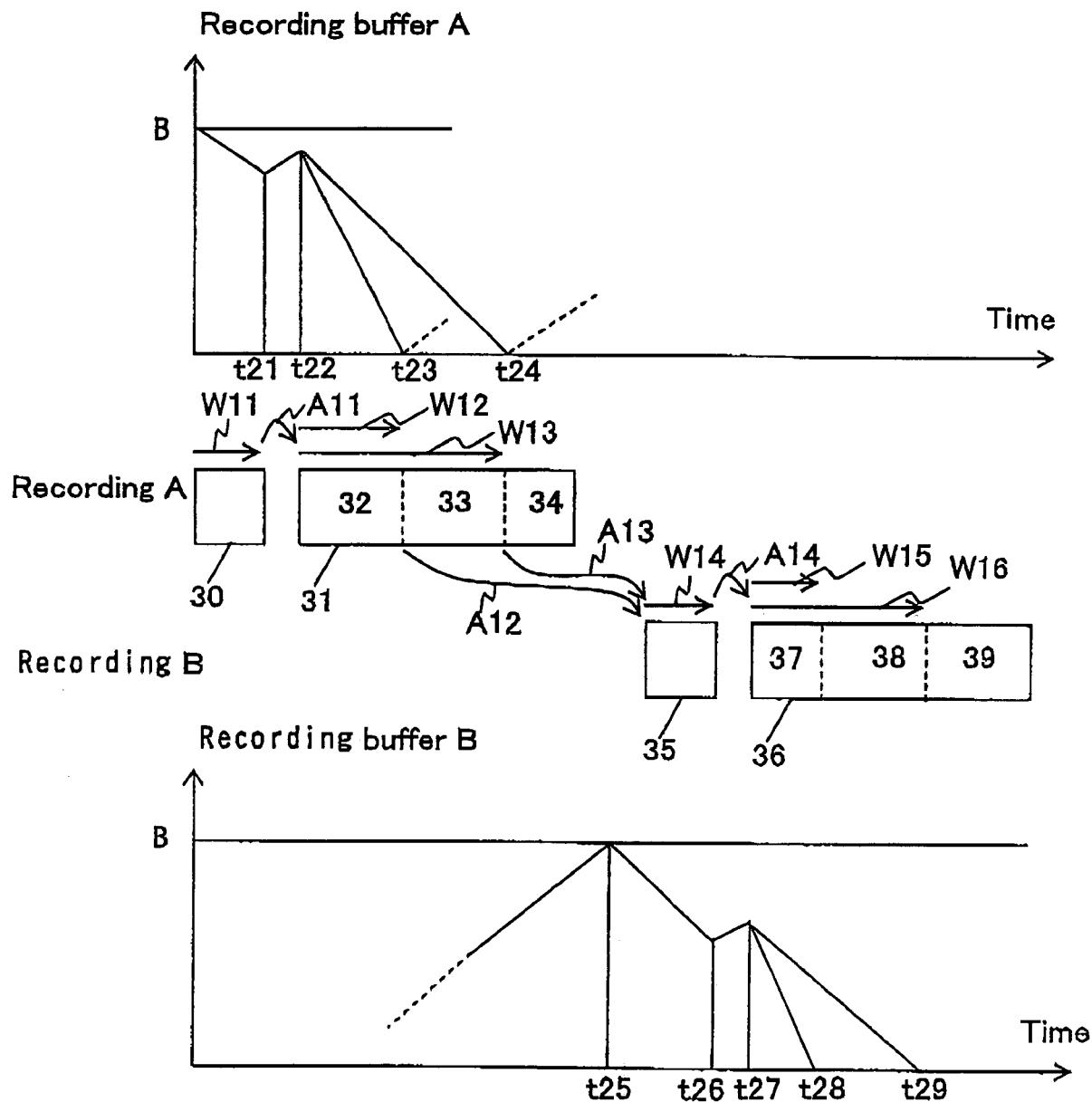
FIG. 4 shows a switching operation for simultaneous recording for the information recording medium according to the first example of the present invention.

FIG. 4 shows a transition in the data amounts in the recording buffers A and B.

Hereinafter, with reference to FIG. 4, the relationship between the transition in the transfer rate of the data to be recorded, and the transition in the data amounts in the recording buffers will be described.

The recording areas 30 and 31 are assigned as areas in which the real time data A is to be recorded. The recording areas 35 and 36 are assigned as areas in which the real time data B is to be recorded. The recording area 31 includes areas 32, 33 and 34. The recording area 36 includes areas 37, 38 and 39.

In a recording operation of the real time data A, when the data transfer rate to the recording buffer A is maximum, the recording buffer A becomes empty at time t24 as a result of performing a recording operation W11, an access operation A11, and a recording operation W13. When the data transfer rate to the recording buffer A is lower than the maximum rate, the amount of data transferred from the encoder A to the recording buffer A is smaller. Therefore, the recording buffer A becomes empty at time t23, which Is earlier than time t24, as a result of performing the recording operation W11, the access operation A11, and a recording operation W12. Namely, when the data transfer rate from the encoder A to the recording buffer A is lower, the recording buffer A becomes empty earlier. When the recording operation of the real time data A is switched to the recording operation of the real time data B at time t23, the time until the recording operation of real time data B is switched to the next recording operation is equal to or less than the sum of (i) a time period required for performing three access operations and (ii) a time period required for performing two recording operations for recording data in two recording areas. Therefore, the recording buffer A is not overflowed. Even when the data having the maximum transfer rate needs to be recorded in the next recording operation, that data can be recorded in an area having a size of Y which is obtained based on the simultaneous recording condition.

In a recording operation of the real time data B also, when the data transfer rate to the recording buffer B is maximum, data can be recorded in an area having a size of Y by one recording operation. When the data transfer rate to the recording buffer B is maximum, the recording buffer B becomes full at time t29 as a result of performing a recording operation W14, an access operation A14, and a recording operation W16. When the data transfer rate to the recording buffer B is lower than the maximum rate, the amount of data transferred from the encoder B to the recording buffer A is smaller. Therefore, the recording buffer B becomes empty at time t28, which is earlier than time t29, as a result of performing the recording operation W14, the access operation A14, and a recording operation W15. Namely, when the data transfer rate from the encoder B to the recording buffer B is lower, the recording buffer B becomes empty earlier. When the recording operation of the real time data B is switched to the recording operation of the real time data A at time t28, the time until the recording operation of real time data A is switched to the next recording operation is equal to or less than the sum of (i) a time period required for performing three access operations and (ii) a time period required for performing two recording operations for recording data in two recording areas. Therefore, the recording buffer B is not overflowed. Even when the data having the maximum transfer rate needs to be recorded in the next recording operation, that data can be recorded in an area having a size of Y which is obtained based on the simultaneous recording condition.

Next, an Information recording and reproduction apparatus and a method for performing simultaneous recording according to a first example of the present invention will be described with reference to FIGS. 3, 5 and 6.

Figure 5:
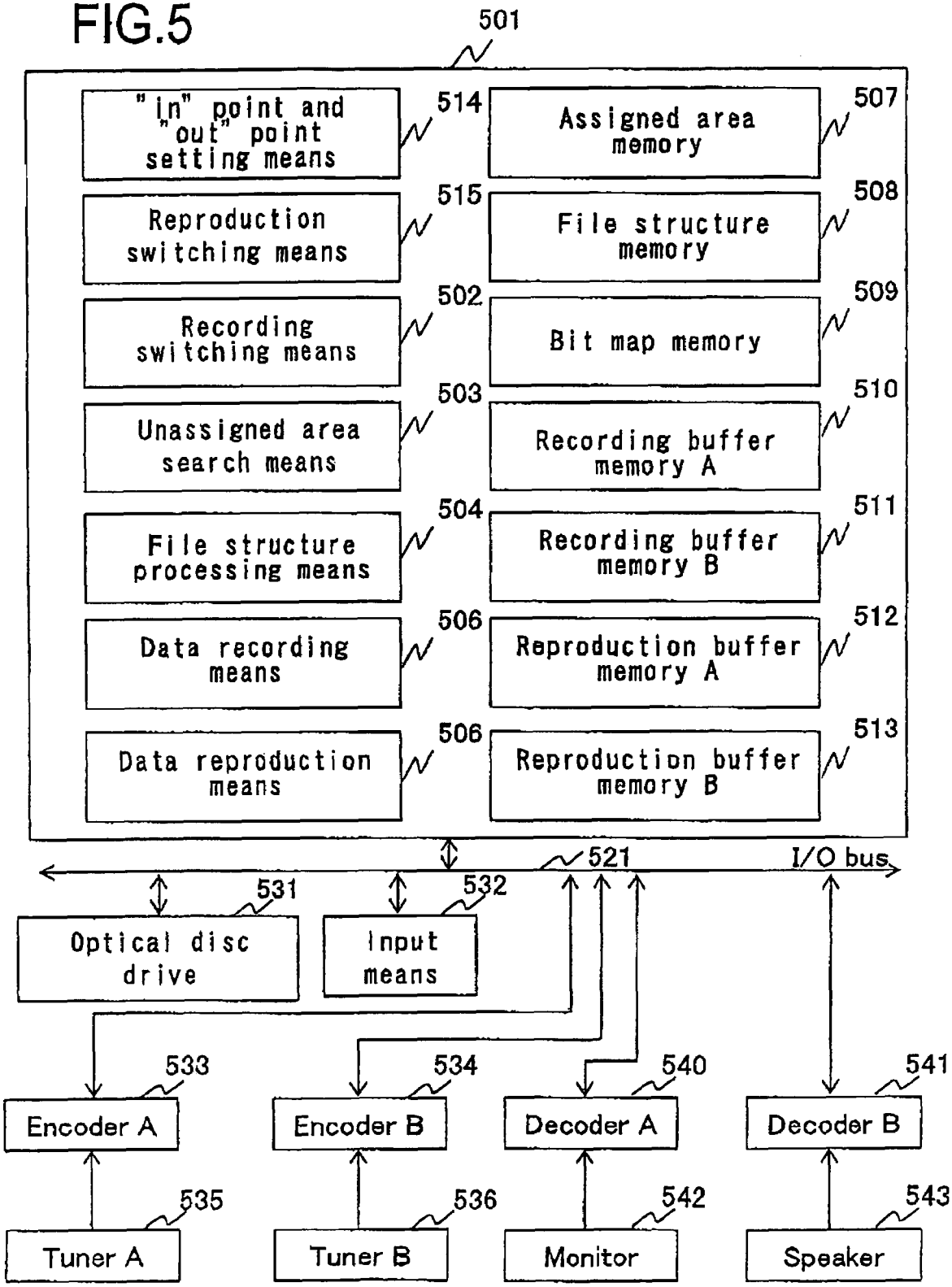
FIG. 5 is a block diagram illustrating an information recording and reproduction apparatus according to the first example of the present invention.

FIG. 5 shows a structure of the information recording and reproduction apparatus in the first example.

The information recording and reproduction apparatus includes a system control section 501, an I/O bus 521, an optical disc drive 531, input means 532 for designating a recording mode or instructing the start of simultaneous recording, tuners A and B (tuners 535 and 536) for receiving TV broadcasting, encoders A and B (encoders 533 and 534) respectively for encoding an audio/video signal selected by the tuners A and B, a decoder A (decoder 540) for decoding audio/video data, a monitor 542 for reproducing audio/video output from the decoder A, a decoder B (decoder 541) for decoding the audio data, and a speaker 543 for reproducing the audio output from the decoder B.

The system control section 501 is realized by, for example, a microcomputer and a memory. The elements included in the system control section 501 are realized by, for example, the microcomputer executing various programs. The memories included in the system control section 501 are realized by, for example, areas of one memory being used for different uses.

Recording switching means 502 switches recording operations of a plurality of pieces of real time data while checking the data amounts in the buffer memories. Unassigned area search means 503 searches for an area fulfilling the simultaneous recording condition from unassigned areas in the volume space. File structure processing means 504 reads data from the file structure area 12 and analyzes the file structure. Data recording means 505 instructs the optical disc drive 531 to record data. Data reproduction means 506 instructs the optical disc drive 531 to reproduce data.

An assigned area memory 507 temporarily stores positional information of the recordable area which is found by the unassigned area search means 503. A file structure memory 508 is for temporarily storing the data which is read from the file structure area 12 in the buffer memories. A bit map memory 509 is for reducing the number of times of access to the disc by storing the data which is read from the space bit map 21. A recording buffer memory A (recording buffer memory 510) and a recording buffer memory B (recording buffer memory 511) respectively correspond to the recording buffer A (recording buffer 72) and the recording buffer B (recording buffer 73) of the simultaneous recording model, and each has a buffer memory which is greater than or equal to the size calculated based on the simultaneous recording condition. A reproduction buffer memory A (reproduction buffer memory 512) and a reproduction buffer memory B (reproduction buffer memory 513) are respectively for temporarily storing a plurality of pieces of data which are to be simultaneously reproduced.

The information recording and reproduction apparatus shown in FIG. 5 has both a function of simultaneously recording a plurality of pieces of real time data on an information recording medium and a function of simultaneously reproducing a plurality of pieces of real time data recorded on the information recording medium. By extracting means relating to simultaneous recording from the information recording and reproduction apparatus shown in FIG. 5, an information recording apparatus having a function of simultaneously recording a plurality of pieces of real time data on an information recording medium can be configured. By extracting means relating to simultaneous reproduction from the information recording and reproduction apparatus shown in FIG. 5, an information reproduction apparatus having a function of simultaneously reproducing a plurality of pieces of real time data recorded on an information recording medium can be configured. By extracting means relating to editing of real time data from the information recording and reproduction apparatus shown in FIG. 5, an editing apparatus having a function of ensuring simultaneous reproduction of a plurality of pieces of real time data including the edited real time data can be configured.

Figure 6:
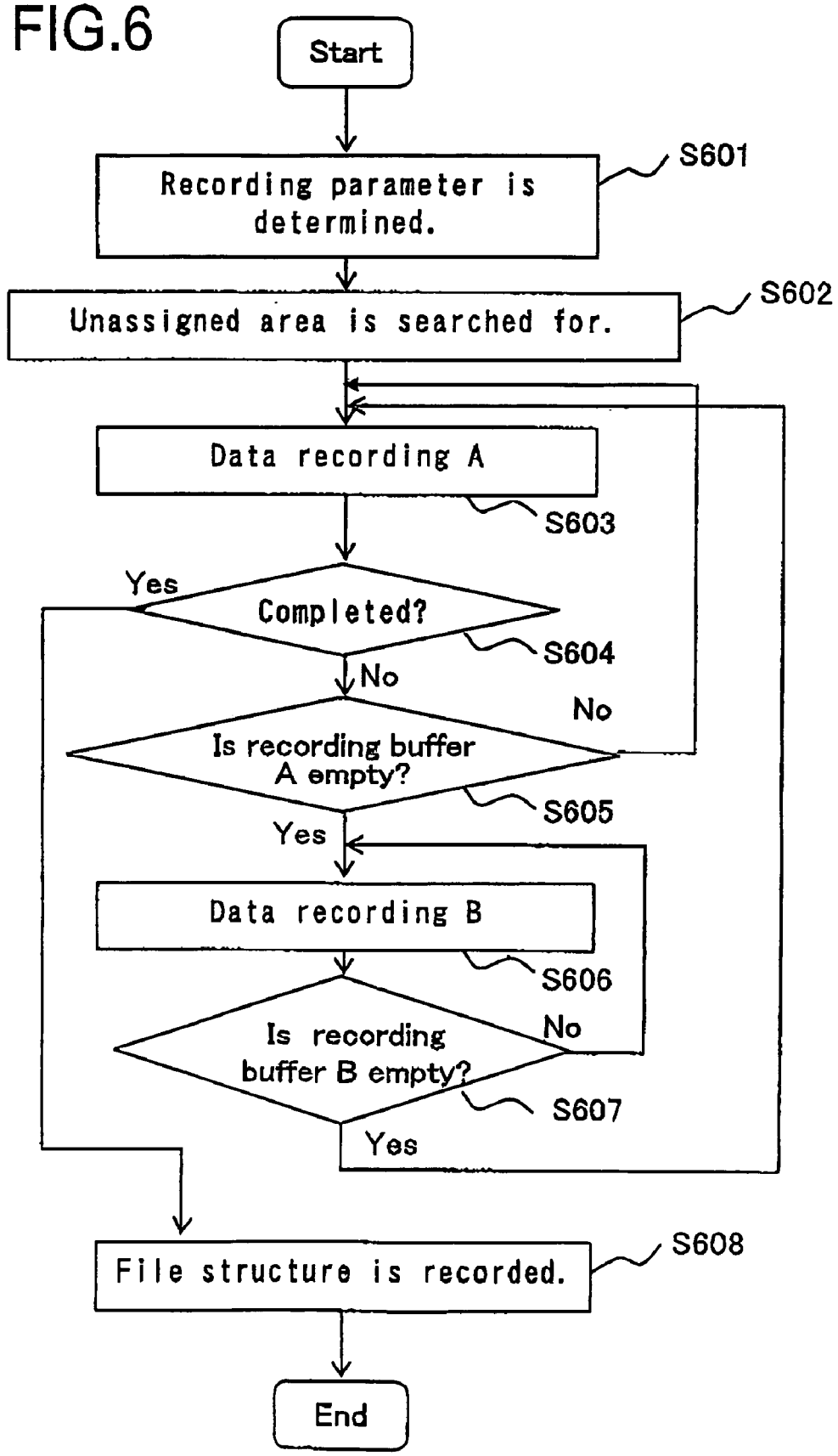
FIG. 6 is a flowchart illustrating a method for simultaneous recording according to the first example of the present invention.

FIG. 6 shows a procedure of a method for simultaneous recording. Such a method is stored, for example, in the form of a program in a memory in the system control section 501. Such a program can be executed by the microcomputer in the system control section 501.

The user uses the input means 532 to input an instruction for simultaneous recording to the Information recording and reproduction apparatus. In compliance with the instruction for simultaneous recording, the minimum size Y for the recording area is determined in accordance with the maximum transfer rate of the data to be recorded. The method for obtaining the minimum size Y for the recording area is as described with reference to FIG. 1 ($Y=4 \times Ta \times Vd \times Vt+(Vt-2 \times Vd)$). When recording a specific program such as a movie or the like, the user sets the recording time. In this manner, a recording parameter is determined (step S601).

The unassigned area search means 503 searches for an unassigned area having a size of Y (minimum size for the recording area) or greater which is obtained in step S601, for each piece of real time data to be recorded, based on the data stored in the bit map memory 509. When the user sets the recording time, the unassigned area search means 503 performs a search for an unassigned area in the volume space until the sum of the sizes of the unassigned areas is greater than or equal to the logical product of the maximum rate and the recording time, and assigns at least one unassigned area in the volume space as an area in which real time data is to be recorded (step S602). Accordingly, each of at least one area assigned as the area in which real time data is to be recorded has a size of Y or greater. Thus, the simultaneous recording condition is fulfilled.

In FIG. 3, the recording areas 13, 14 and 15 are assigned as areas in which the real time data A is to be recorded, and the recording areas 16, 17 and 18 are assigned as areas in which the real time data B is to be recorded. Each of the recording areas 13 through 18 has a size of Y or greater. The positional information on the recording areas 13 through 18 is stored in the assigned area memory 507.

The data recording means 505 instructs the optical disc drive 531 to record the real time data A accumulated in the recording buffer memory A on the optical disc, and transfers the real time data A to be recorded to the optical disc drive 531 (step S603).

In FIG. 3, the real time data A is recorded in a part of the recording area 13 in the recording operation W1. When it is determined that the recording operation is to be continued in step S605 described below, real time data A is recorded from the start of the recording area 14 in the recording operation W2 after the access operation A1.

In FIG. 3, the real time data A is recorded from the middle of the recording area 13. In the case where the recording operation is started from the recording area 13, the real time data A may be recorded from the start of the recording area 13.

When the user uses the input means 532 to input an instruction for terminating recording to the information recording and reproduction apparatus, the recording switching means 502 terminates the recording operation (step S604).

The recording switching means 502 determines whether the recording buffer memory A is empty or not. When the recording buffer memory A is determined to be empty, the recording switching means 502 switches the recording operation of the real time data A to the recording operation of the real time data B. When the recording buffer memory A is determined not to be empty, the recording switching means 502 continues the recording operation of the real time data A (step S605).

In FIG. 3, the recording buffer memory A becomes empty in the recording operation W2. Thus, the recording switching means 502 switches the recording operation of the real time data A to the recording operation of the real time data B. As a result, the real time data B is recorded in a part of the recording area 17 in the recording operation W5 after the access operation A2. There is no problem in starting to record the real time data B from the middle of the recording area 17 in the recording operation W5. The reason is that in this manner, another recording area can be accessed so as to continue the recording operation of the real time data B if necessary. In FIG. 3, the recording operation of the real time data B is continued in the recording operation W6 after the access operation A3.

The data recording means 505 instructs the optical disc drive 531 to record the real time data B accumulated in the recording buffer memory B on the optical disc, and transfers the real time data B to be recorded to the optical disc drive 531 (step S606).

The recording switching means 502 determines whether the recording buffer memory B is empty or not. When the recording buffer memory B is determined to be empty, the recording switching means 502 switches the recording operation of the real time data B to the recording operation of the real time data A. When the recording buffer memory B is determined not to be empty, the recording switching means 502 continues the recording operation of the real time data B (step S607).

In FIG. 3, the recording buffer memory B becomes empty in the recording operation W6. Thus, the recording switching means 502 switches the recording operation of the real time data B to the recording operation of the real time data A. As a result, the real time data A is recorded in the remaining area of the recording area 14 in the recording operation W3 after the access operation A4. There is no, problem in starting to record the real time data A from the middle of the recording area 14 in the recording operation W3. The reason is that in this manner, another recording area can be accessed so as to continue the recording operation of the real time data A if necessary. In FIG. 3, recording switching means 502 continues the recording operation of the real time data A in the recording operation W4 after the access operation A5.

When recording of all the data is completed, the file structure processing means 504 records a file entry in the file structure area 12 in order to manage the areas in which real time data is recorded as real time extents (step S608).

In this manner, the recording operation of the real time data A and the recording operation of the real time data B are switched to each other while the data accumulation states in the recording buffer memories A and B are checked.

In the above example, two pieces of real time data are continuously recorded. Three or greater pieces of real time data can be continuously recorded when the data Is recorded in a recording area having at least a size by which an access operation can be performed twice the number of times as the number of pieces of the real time data.

For simultaneous recording of n number of real time data, a simultaneous recording model including the following is used: a pickup P for accessing an area in the information recording medium, an encoding module EMi for encoding real time data Di, and a recording buffer WBi for accumulating the encoded real time data Di. (This simultaneous recording model will be referred to as an "n-simultaneous recording model", hereinafter.) In this case, the following operation is performed in each of the above-mentioned steps.

Step S602: The unassigned area search means 503 searches for an unassigned area in the volume space in the information recording medium, and assigns at least one unassigned area in the volume space as an area Ai in which real time data Di is to be recorded.

Step S603, S606: In compliance with the instruction from the data recording means 505 for recording, the optical disc drive 531 executes a recording operation Wi for recording the real time data Di accumulated in the recording buffer WBi in the area Ai.

Step S605, S607: While the recording operation Wi is being executed, the recording switching means 502 determines whether the recording buffer WBi is empty or not. When the recording buffer WBi Is determined to be empty, the recording switching means 502 switches the recording operation Wi to another recording operation Wj ($i \neq j$). When the recording buffer WBi is determined not to be empty, the recording switching means 502 continues the recording operation Wi.

Each of at least one area assigned as the area Ai is structured so as to fulfill the simultaneous recording condition that the recording buffer WBi can be made empty by at most one access operation and at most two recording operations.

The simultaneous recording condition can be fulfilled where, for example, each of at least one area assigned as the area Ai has a size of Y or greater. The method for obtaining the minimum size Y for the recording area is as described with reference to FIG. 1.

$$Y = 2 \times n \times Ta \times Vd \times Vt \div (Vt - n \times Vd)$$

In the above, Ta represents the access time required for the pickup P to move between an innermost area and an outermost area of the information recording medium.

Vt represents the data transfer rate between the pickup P and the recording buffer WBi.

Vd represents the data transfer rate between the encoding module EMi and the recording buffer WBi for all values of i.

Here, i is any integer of 1 or greater and n or less, and n is any integer of 2 or greater which represents the number of a plurality of pieces of real time data to be simultaneously recorded.

Figure 8:
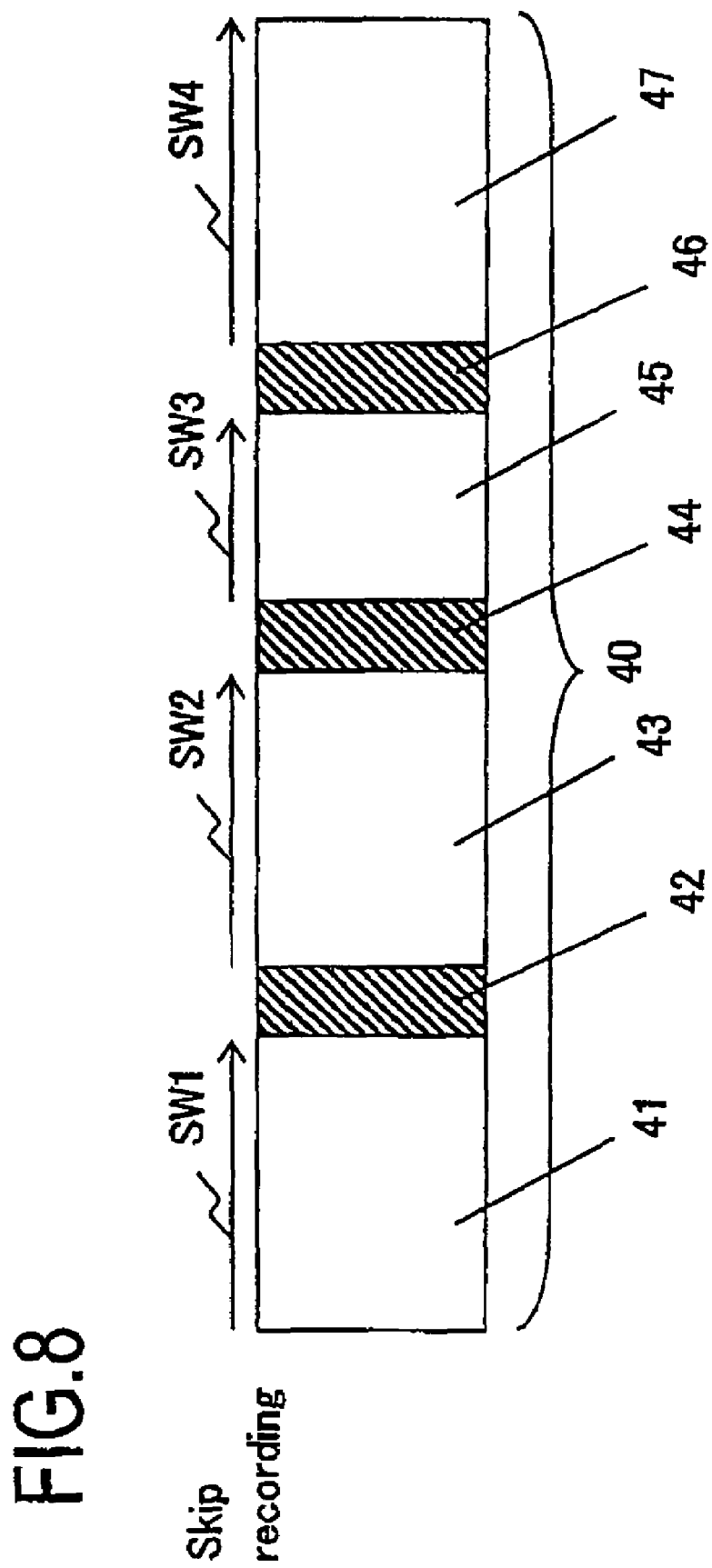
FIG. 8 shows an operation for skip recording.

Skip recording may be performed to pre-assigned areas. "Skip recording" refers to a technique for performing recording while avoiding pre-detected defects or defects detected during the data recording. With reference to FIG. 8 which illustrates skip recording, it is assumed that, for example, no defective sector is detected in an area 40 before recording and defective areas 42, 44 and 46 are detected during the recording. In this case, data which was to be recorded in the defective area is recorded in the area next to the defective area in order to avoid the defective area. In the example of skip recording shown in FIG. 8, the recording operations are performed in the order of SW1, SW2, SW3 and SW4. Since the access time is short in skip recording, skip recording may be performed such that areas including defects are avoided in units of ECC block, not in units of sector. Where the size of each ECC block is E, the access-time to each ECC block in such skip recording is E+Vt. In order to guarantee compatibility among apparatuses in simultaneous recording, the number of ECC blocks to be skipped may be limited. For example, the ratio of the skippable area in skip recording to the recording area is defined as "e". When skip recording is performed under the simultaneous recording condition described above with reference to FIG. 1, recording is performed in an area of Ye×(1−e) (Ye is the minimum size of the recording area), and the area of Ye×e is skipped and only accessed to and is not recorded to. In the case where two pieces of real time data are to be recorded, the condition for simultaneous recording obtained in consideration of skip recording with a limited ratio of skippable area is as follows.

$$Ye \times (1-e) \div Vt \times (Vt-Vd) - Ta \times Vd - Ye \times e + Vt \times Vd = (3 \times Ta + Ye \times (1-e) + Vt) \times Vd + Ye \times e + Vt \times Vd$$

Thus, $$Ye = 4 \times Ta \times Vd \times Vt + (Vt - e \times Vt - 2 \times Vd)$$

A buffer size Be required in this case is as follows.

$$Be = (4 \times Ta + Ye \times (1-e) + Vt) \times Vd + 2 \times Ye \times e + Vt \times Vd$$

The recording may be performed in units of ECC block, not in units of sector.

Although not shown, a threshold in a buffer Is predetermined such that the buffer is determined to be empty when the data amount in the buffer is below the threshold. Therefore, the size of the buffer memory may contain a margin corresponding to the minimum reading or writing unit or a margin corresponding to the time period until the rotation rate becomes a desired value.

Recording operations are switched at an optimal timing. Therefore, even when an error occurs during recording, and as a result, recording cannot be performed for a certain time period, the return to the normal state is rapidly realized.

Figure 2:
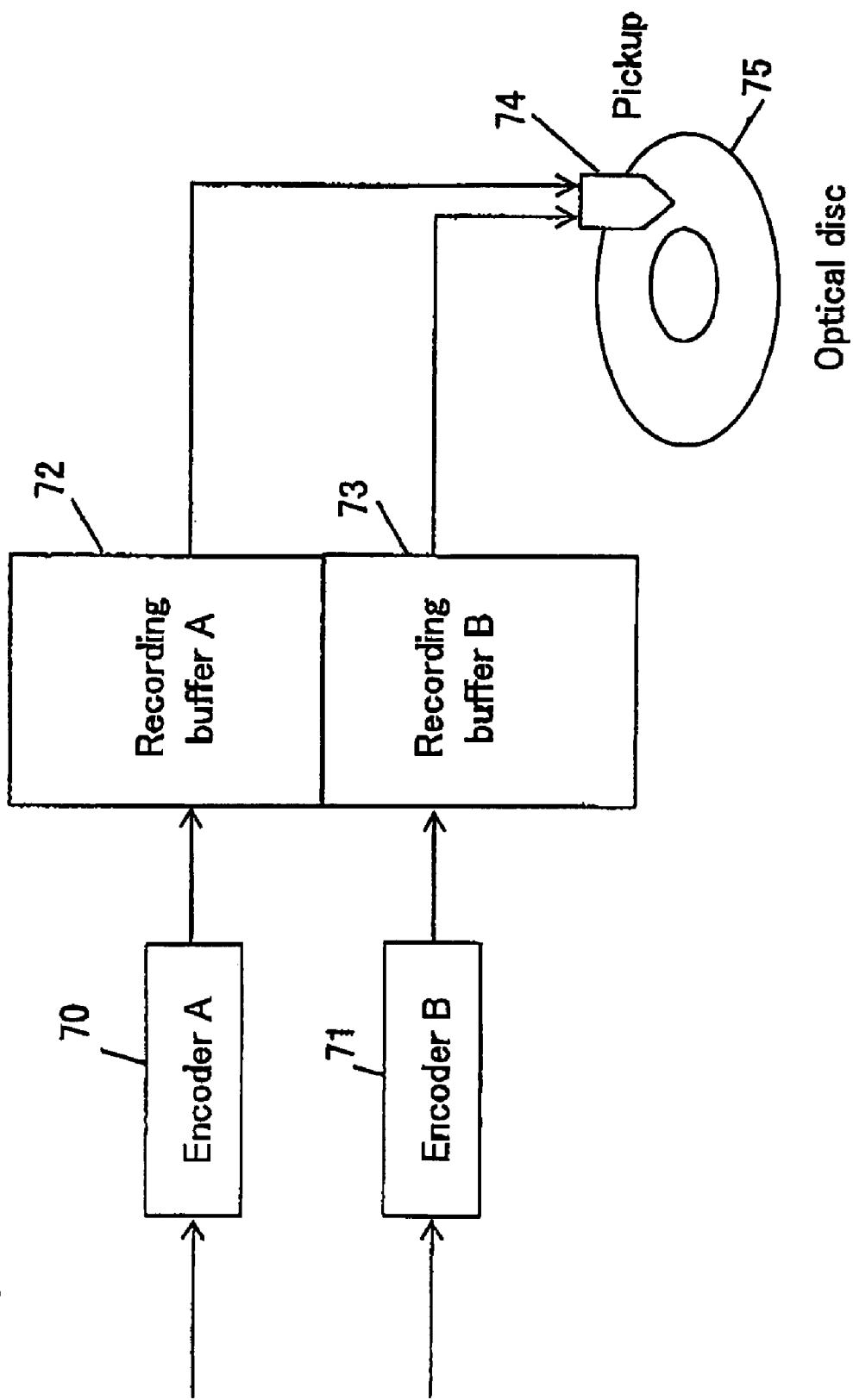
FIG. 2 shows a simultaneous recording model.

FIG. 2 shows a model; neither the encoder nor the decoder are absolutely necessary. A system handling only digital signals, such as a streamer, does not include an encoder or decoder. The present invention, when applied to a streamer, provides the effect of transferring audiovisual data with no interruption.

EXAMPLE 2

In the second example of the present invention, a case where the transfer rates of a plurality of pieces of real time data are different will be described. In the first example, the simultaneous recording condition is described in the case where the plurality of pieces of real time data have the same transfer rate. In the second example, a simultaneous recording condition is set for each of the data having a high transfer rate and data having a low transfer rate. This allows data having a low transfer rate to be recorded even in a small continuous empty area, and also reduces the required size of buffer memories.

Figure 9:
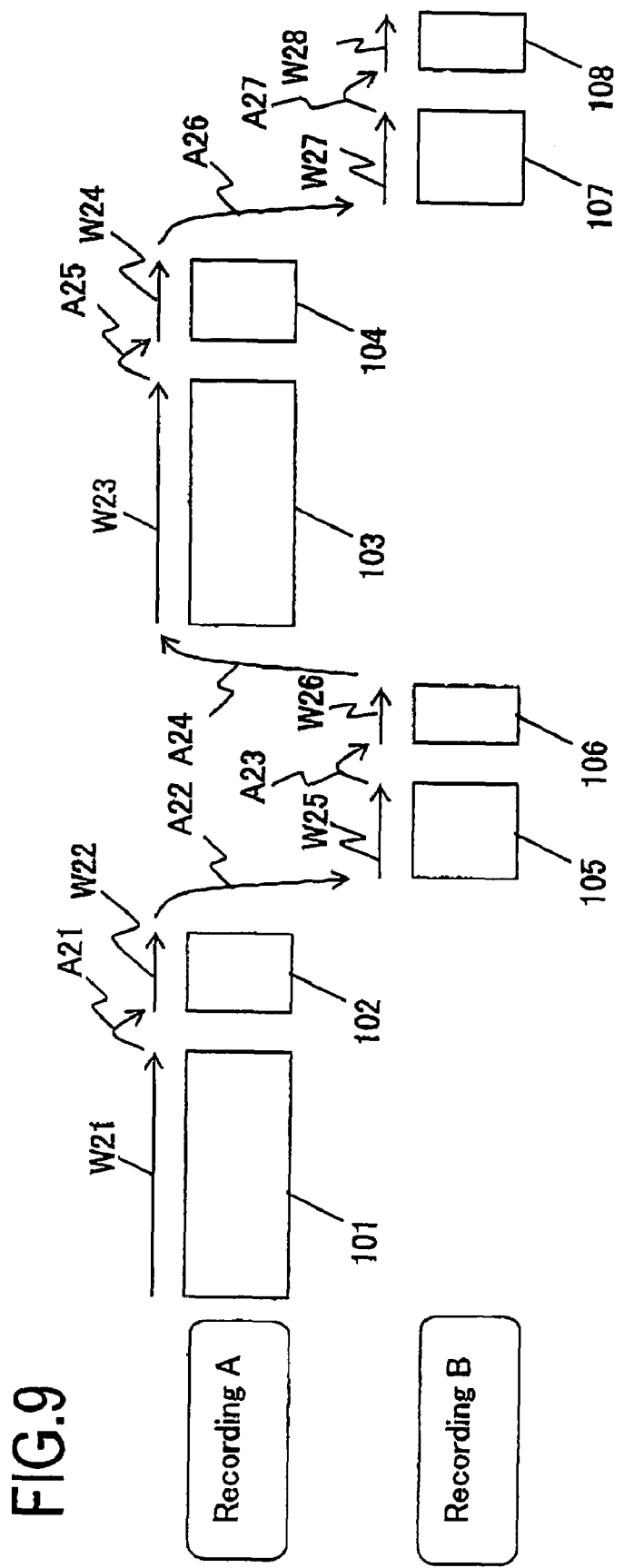
FIG. 9 shows recording operations and access operations for simultaneous recording of two pieces of real time data according to a second example of the present invention.

FIG. 9 shows recording operations and access operations for two pieces of real time data, i.e., the real time data A having a high transfer rate and the real time data B having a low transfer rate. The recording of the real time data A is referred to as recording A, and the recording of the real time data B is referred to as recording B. The simultaneous recording model is identical to that shown in FIG. 2 which is described in the first example. The transition in the data amounts in the recording buffers during the simultaneous recording is described in the first example and will be omitted here.

Figure 10:
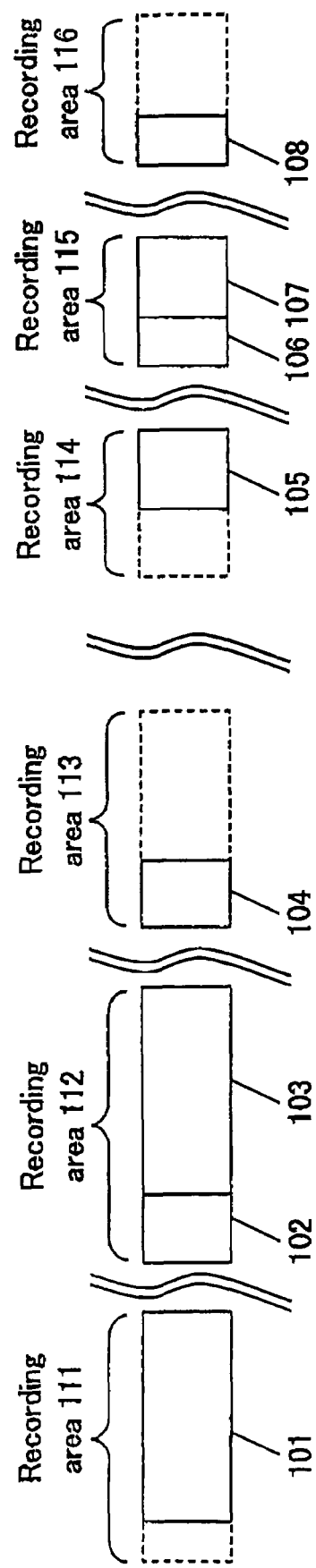
FIG. 10 shows a layout of recording areas on the disc according to the second example of the present invention.

FIG. 10 shows a layout of recording areas on the disc. The left side represents the inner side of the disc, and the right side represents the outer side of the disc. In FIG. 10, recording areas 111, 112 and 113 are assigned as areas in which the real time data A is to be recorded, and recording areas 114, 115 and 116 are assigned as areas in which the real time data B is to be recorded. The real time data A is actually recorded in an area 101 of the recording area 111, areas 102 and 103 of the recording area 112, and an area 104 of the recording area 113. The real time data B is actually recorded in an area 105 of the recording area 114, areas 106 and 107 of the recording area 115, and an area 108 of the recording area 116.

In FIG. 9, A21 through A27 refer to operations of the pickup 74 of moving between areas to be accessed (access operations). It is assumed here that the time required for each of the access operations A21 through A27 is a time period required for the pickup 74 to move between an innermost area and an outermost area of the information recording medium (i.e., the maximum access time Ta). It is also assumed that the data transfer rate between the pickup 74 and each of the recording buffers A and B is a constant rate Vt. It is also assumed that the data transfer rate between the encoder A and the recording buffer A is Vd1, which is the maximum value of a range in which the rate is variable. It is also assumed that the data transfer rate between the encoder B and the recording buffer B is Vd2, which is the maximum value of a range in which the rate is variable.

In a recording operation W21, the real time data A is recorded in the area 101. After an access operation A21, in a recording operation W22, the real time data A is recorded in the area 102. Then, the recording operation of the real time data A is switched to the recording operation of the real time data B (access operation A22).

In a recording operation W25, the real time data B is recorded in the area 105. After an access operation A23, in a recording operation W26, the real time data B is recorded in the area 106. Then, the recording operation of the real time data B is switched to the recording operation of the real time data A (access operation A24).

Thus, the method of simultaneous recording according to the present invention is designed so as to fulfill the simultaneous recording condition that recording operations are switched to each other by at most one access operation and at most two recording operations.

In the recording operation of recording the real time data A, data accumulated in the recording buffer A is accumulated at Vt−Vd1. In the access operation and the recording operation of recording the real time data B, data in the recording buffer A is accumulated at Vd1. The data amount which is consumed from the recording buffer A during the recording operation W21, the access operation A21 and the recording operation W22 Is equal to the data amount accumulated in the recording buffer A during the access operation A22, the recording operation W25, the access operation A23, the recording operation W26 and the access operation A24. Accordingly, the following expressions are satisfied, where Y1 is the minimum size of at least one recording area assigned as an area in which the real time data A is to be recorded, and Y2 is the minimum size of at least one recording area assigned as an area in which the real time data B is to be recorded.

$$Y1+Vt\times(Vt-Vd1)=(4Ta+Y2\div Vt)\times Vd1$$

$$Y2+Vt\times(Vt-Vd2)=(4Ta+Y1\div Vt)\times Vd2$$

By manipulating these expressions, the following expressions for obtaining the minimum size Y1 for the recording area and the minimum size Y2 for the recording area are obtained.

$$Y1=(4Ta\times Vt\times Vd1)\div(Vt-Vd1-Vd2)$$

$$Y2=(4Ta\times Vt\times Vd2)\div(Vt-Vd1-Vd2)$$

The simultaneous recording condition for recording two pieces of real time data having different transfer rates without missing any part of the data can be fulfilled where each of at least one recording area assigned as an area in which the real time data A is to be recorded has a size of Y1 or greater, and each of at least one recording area assigned as an area in which the real time data B Is to be recorded has a size of Y2 or greater.

A buffer size B1 required for the recording buffer A and a buffer size B2 required for the recording buffer B are obtained by the following expressions.

$$B1=(4Ta+Y2\div Vt)Vd1$$

$$B2=(4Ta+Y1\div Vt)Vd2$$

By setting Vd1>Vd2 as above, Y2 and B2 can be smaller than Y1 and B1, respectively.

In the case where the maximum transfer rate of the data to be recorded is known before the real time data is recorded, data recording is made possible by assigning a large continuous empty area, which is larger than the size fulfilling the simultaneous recording condition, as a recording area.

The simultaneous recording of the second example can be performed by the recording method described in the first example with reference to FIG. 6 by using, for searching for an unassigned area, different expressions from those of the first example for obtaining the simultaneous recording and reproduction condition.

In the case where the transfer rate is not known until immediately before the recording is performed, the data which is to be recorded first is set to be recorded at the maximum transfer rate within the range. The data which is to be recorded later is set to be recorded at the maximum transfer rate permitted by the system. Thus, recorded areas which fulfill the simultaneous recording condition can be found. When recording the second data, the transfer rate thereof is already known. Thus, an appropriate size of recording areas can be retrieved.

The information recording and reproduction apparatus in the second example has the same structure as that of the first example except for the sizes of the recording buffer memories A and B. The algorithm for switching the recording operation of the real time data A and the recording operation of the real time data B is the same as that of the first example. Namely, when the recording buffer memory A becomes empty, the recording operation of the real time data A is switched to the recording operation of the real time data B. When the recording buffer memory B becomes empty, the recording operation of the real time data B is switched to the recording operation of the real time data A.

The present invention is applicable to recording of a plurality of channels of digital broadcasting. When recording high-definition video data and video data having a low rate for mobile terminals, the respective maximum transfer rates are used. In this manner, empty areas on the disc resulting from repeated recording and erasure can be effectively used. It is not necessary to record data having a low transfer rate and data having a high transfer rate in an interleaved manner. Therefore, a plurality of pieces of data having a low transfer rate can be recorded as close as possible to each other. Thus, when transferring data having a low transfer rate to a mobile terminal, the access time is shortened and thus the data can be transferred at high speed.

Figure 11:
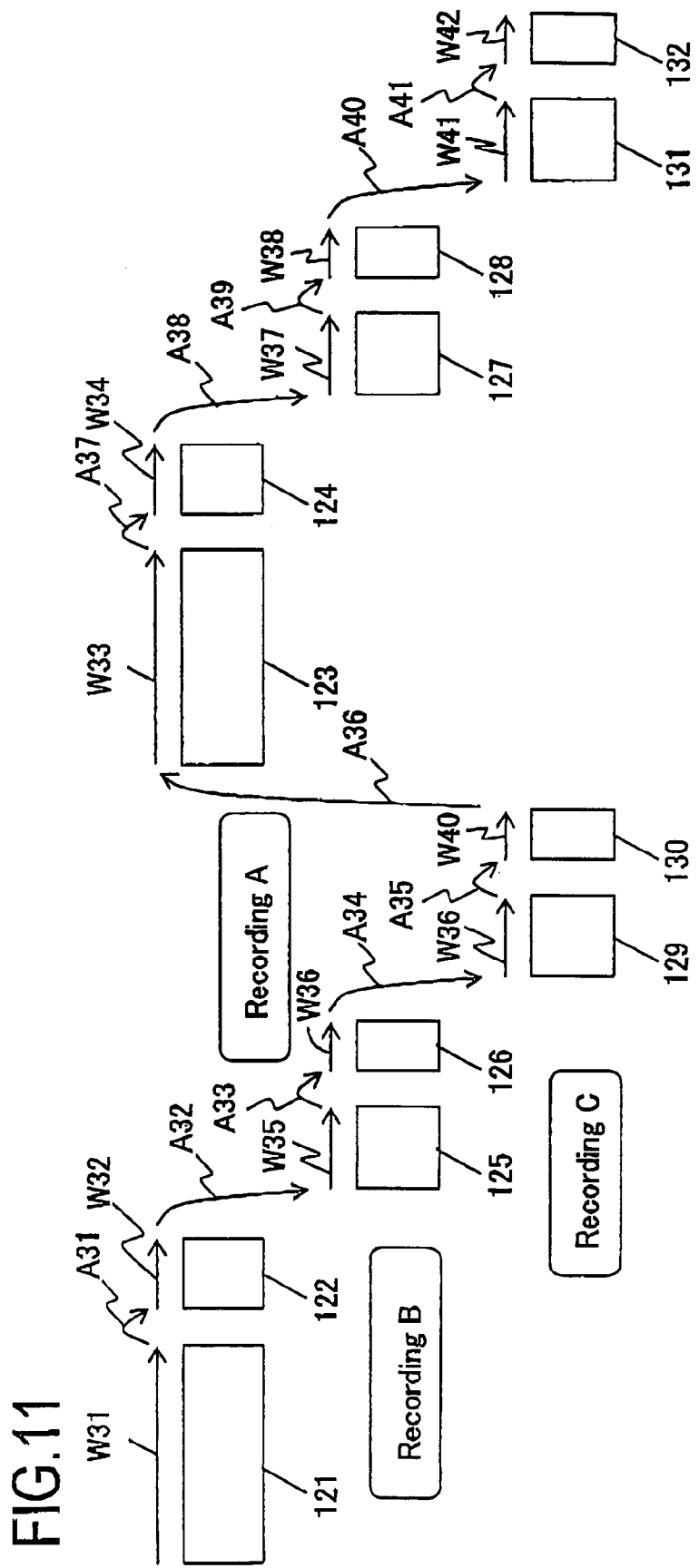
FIG. 11 shows recording operations and access operations for simultaneous recording of three pieces of real time data according to the second example of the present invention.

FIG. 11 shows recording operations and access operations for three pieces of real time data having different transfer rates. Like in FIG. 9, W31 through W42 refer to recording operations, and A31 through A41 refer to access operations. Reference numerals 121 through 132 each represent a part of a recording area in which the real time data is actually to be recorded. Based on FIG. 11, the simultaneous recording condition for the three pieces of real time data can be obtained in a similar manner as for the two pieces of real time data as follows.

$$Y1=(6Ta \times Vt \times Vd1)+(Vt-Vd1-Vd2-Vd3)$$

$$Y2=(6Ta \times Vt \times Vd2)+(Vt-Vd1-Vd2-Vd3)$$

$$Y3=(6Ta \times Vt \times Vd3)+(Vt-Vd1-Vd2-Vd3)$$

$$B1=(6Ta+Y2+Vt+Y3+Vt)Vd1$$

$$B2=(6Ta+Y3+Vt+Y1+Vt)Vd2$$

$$B3=(6Ta+Y1+Vt+Y2+Vt)Vd3$$

In the above expressions, Y is the minimum size of the recording area, Vd is the transfer rate of the data to be recorded, and B Is the size of a recording buffer. The numerals added to Y, Vd and B each represent the number assigned to the real time data to be recorded.

For simultaneous recording of n number of real time data on an information recording medium, the "n-simultaneous recording model" described above is used. A minimum size Yi for each of at least one recording area assigned as an area Al in which real time data Di is to be recorded and a size Bi of a recording buffer WBi for accumulating the real time data Di are obtained by the following expressions.

$$Yi=(2 \times n \times Ta \times Vt \times Vdi)+\{Vt-(Vd1+Vd2+\ldots+Vdn)\}$$

$$Bi=\{2 \times n \times Ta+(Y1+Y2+\ldots+Yn)+Vt-Yi+Vt\}Vdi$$

Ta is the access time required for the pickup P to access between an innermost area and an outermost area of the information recording medium.

Vt is the data transfer rate between the pickup P and the recording buffer WBi.

Vdi is the data transfer rate between the encoding module EMi and the recording buffer WBi.

In addition, i is any integer of 1 or greater and n or less, and n is any integer of 2 or greater which represents the number of the plurality of pieces of real time data for simultaneous recording.

The above-described simultaneous recording condition is applicable to the case where the transfer rate of the plurality of pieces of real time data is the same (i.e., in the case where Vd1=Vd2= . . . =Vdn).

EXAMPLE 3

In a third example, a case where a plurality of pieces of real time data to be recorded have different and fixed transfer rates will be described. DV-format data which is used for digital video cameras has a fixed transfer rate, not a variable transfer rate as in the MPEG format. With the real time data having a fixed transfer rate, the reproduction operations can be switched to each other in units of recording area once an optimal size for the recording area is determined. This simplifies the switching operation and also reduces the size of the recording area.

Figure 25:
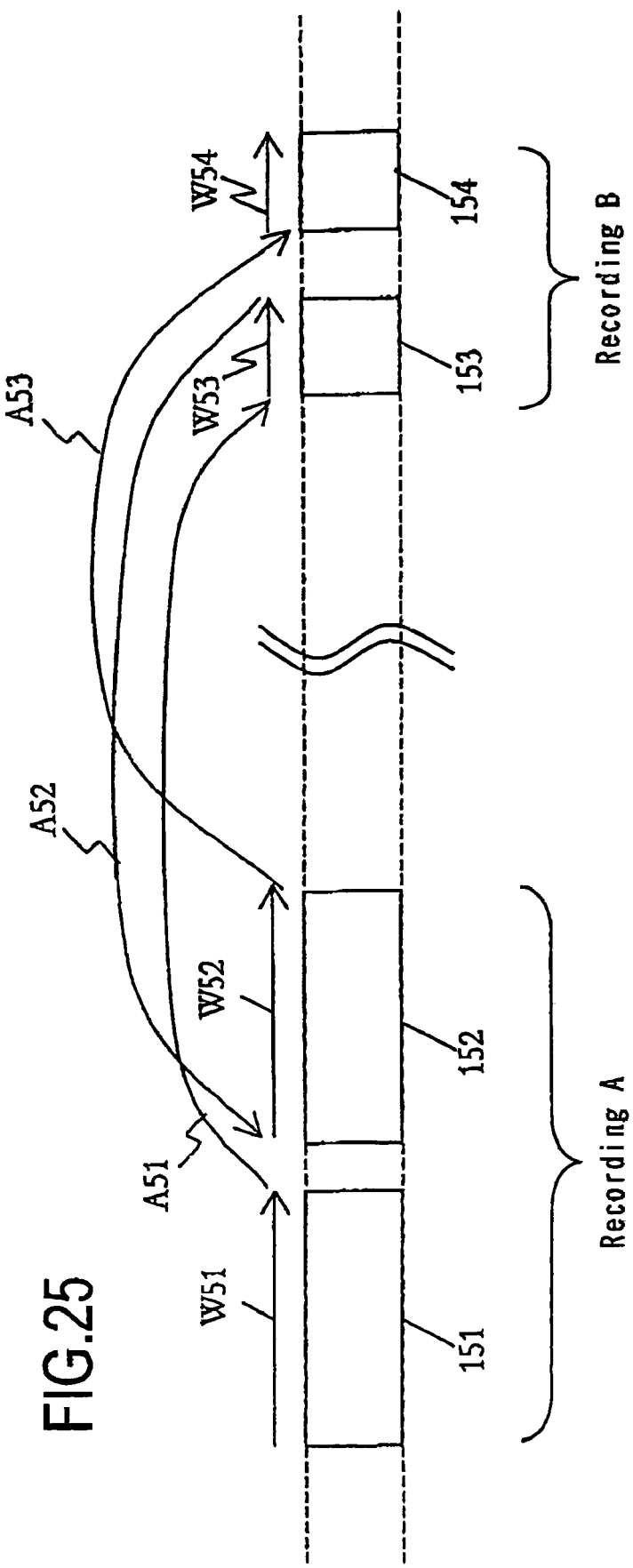
FIG. 25 shows a layout of recording areas for simultaneous recording of three pieces of real time data according to the third example of the present invention.

FIG. 25 shows a layout of recording areas for simultaneous recording of two pieces of real time data. As shown here, each of the recording areas has a different and fixed size in accordance with the type of data to be recorded in the area.

Figure 12:
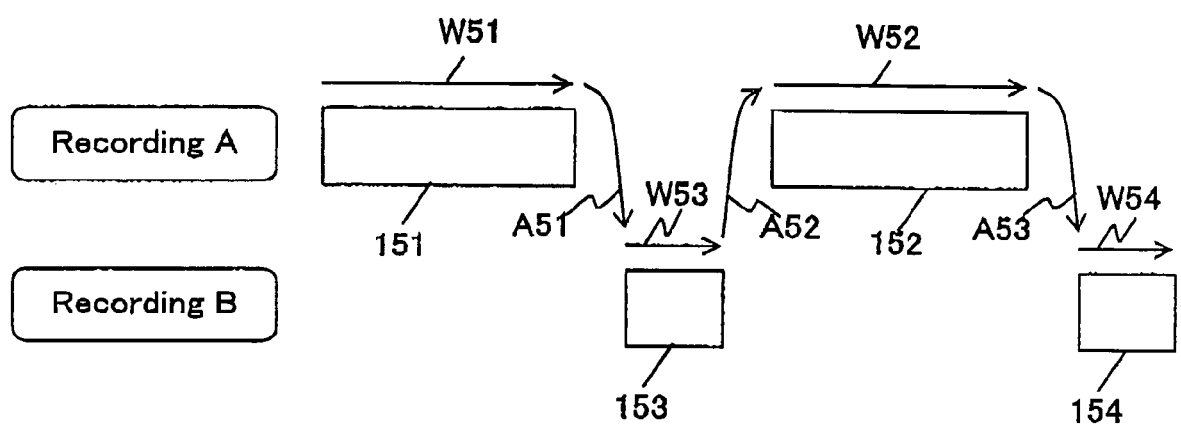
FIG. 12 shows recording operations and access operations for simultaneous recording of two pieces of real time data according to a third example of the present invention.

FIG. 12 shows recording operations and access operations for two pieces of real time data having different transfer rates. Like in FIG. 9, W51 through W54 refer to recording operations, and A51 through A53 refer to access operations. Reference numerals 151 through 154 each represent a recording area. Since the transfer rates of the plurality of pieces of real time data are fixed, the recording operations are switched to each other in units of area. Accordingly, when recording to one recording area is completed, the recording operation can be switched to another recording operation.

The information recording and reproduction apparatus in the third example has the same structure as that of the information recording and reproduction apparatus shown in FIG. 5 except for the operations of the unassigned area search means 503 and the recording switching means 502.

Figure 26:
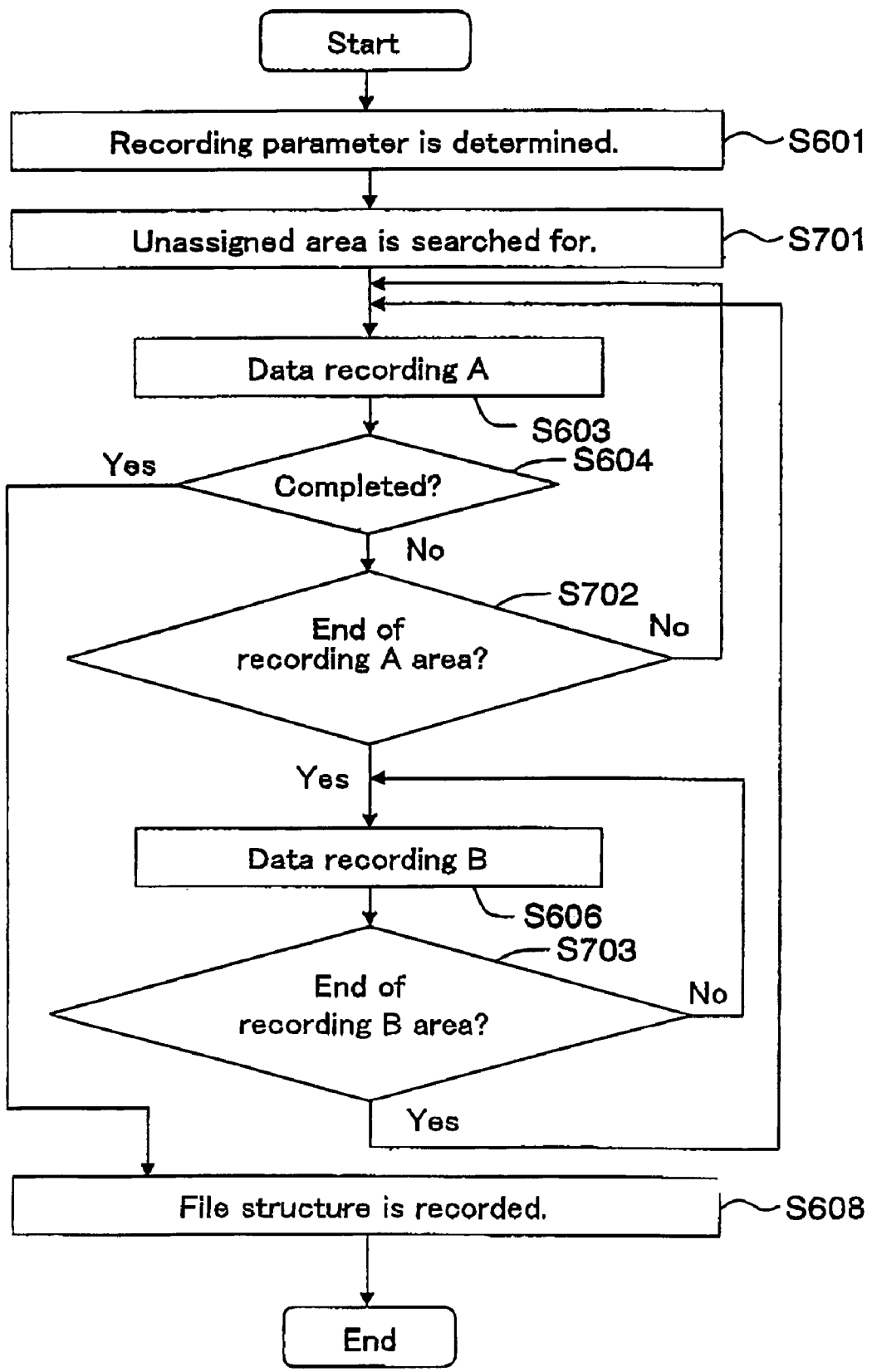
FIG. 26 is a flowchart illustrating a method for simultaneous recording of two pieces of real time data according to the third example of the present invention.

FIG. 26 shows a procedure of a method for simultaneous recording. Such a method is stored, for example, in the form of a program in a memory in the system control section 501. Such a program can be executed by, for example, the microcomputer in the system control section 501.

The procedure shown in FIG. 26 is the same as that of the first example (FIG. 6) except for the expressions for obtaining the simultaneous recording condition used in the step for searching for an unassigned area (S701) and the condition for switching the data recording A and data recording B (S702, S703).

In step S701, the unassigned area search means 503 searches for an unassigned area having a size of Y1 (or Y2) and assigns at least one unassigned area thus found as an area in which the real time data is to be recorded. A method for obtaining the size Y1 or Y2 of the recording area will be described below.

In step S702, in the recording operation of the real time data A, the recording switching means 502 determines whether or not the real time data A has been recorded up to the end of the at least one recording area assigned as an area in which the real time data A is to be recorded. When it is determined that the real time data A has been recorded up to the end of the recording area, the recording switching means 502 switches the recording operation of the real time data A to the recording operation of the real time data B. When it is determined that the real time data A has not been recorded up to the end of the recording area, the recording switching means 502 continues the recording operation of the real time data A.

In step S703, in the recording operation of the real time data B, the recording switching means 502 determines whether or not the real time data B has been recorded up to the end of the at least one recording area assigned as an area in which the real time data B is to be recorded. When it is determined that the real time data B has been recorded up to the end of the recording area, the recording switching means 502 switches the recording operation of the real time data B to the recording operation of the real time data A. When it is determined that the real time data B has not been recorded up to the end of the recording area, the recording switching means 502 continues the recording operation of the real time data B.

The data amount which is consumed from the recording buffer A during the recording operation W51 is equal to the data amount accumulated in the recording buffer A during the access operation A51, the recording operation W53 and the access operation A52. Accordingly, the following expressions are satisfied, where Y1 is the size of at least one recording area assigned as an area in which the real time data A is to be recorded, and Y2 to the size of at least one recording area assigned as an area in which the real time data B is to be recorded.

$$Y1+Vt\times(Vt-Vd1)=(2Ta+Y2+Vt)\times Vd1$$

$$Y2+Vt\times(Vt-Vd2)=(2Ta+Y1+Vt)\times Vd2$$

By manipulating these expressions, the following expressions for obtaining the size Y1 for the recording area and the size Y2 for the recording area are obtained.

$$Y1=(2Ta\times Vt\times Vd1)+(Vt-Vd1-Vd2)$$

$$Y2=(2Ta\times Vt\times Vd2)+(Vt-Vd1-Vd2)$$

A buffer size B1 required for the recording buffer A and a buffer size B2 required for the recording buffer B are obtained by the following expressions.

$$B1=(2Ta+Y2+Vt)Vd1$$

$$B2=(2Ta+Y1+Vt)Vd2$$

By setting the simultaneous recording condition for the plurality of pieces of real time data each having a fixed transfer rate utilizing the different recording rates thereof as described above, it is made possible to record data having a low transfer rate in a smaller recording area. Thus, empty areas in the disc can be effectively used.

Figure 13:
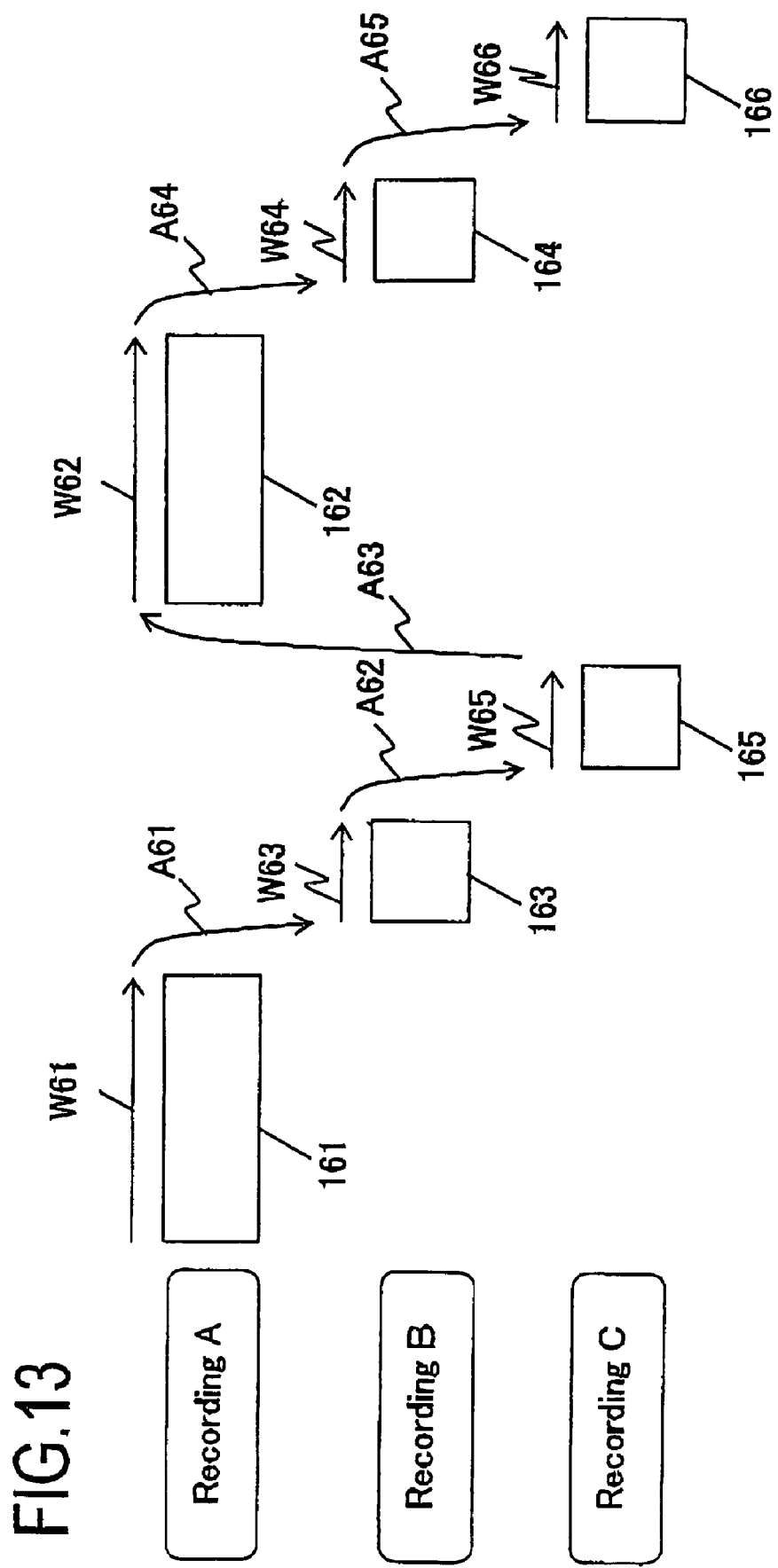
FIG. 13 shows recording operations and access operations for simultaneous recording of three pieces of real time data according to the third example of the present invention.

FIG. 13 shows recording operations and access operations for three pieces of real time data considered in a similar manner. The simultaneous recording condition for the three pieces of real time data can be obtained as follows.

$$Y1=(3Ta\times Vt\times Vd1)+(Vt-Vd1-Vd2-Vd3)$$

$$Y2=(3Ta\times Vt\times Vd2)+(Vt-Vd1-Vd2-Vd3)$$

$$Y3=(3Ta\times Vt\times Vd3)+(Vt-Vd1-Vd2-Vd3)$$

$$B1=(3Ta+Y2+Vt+Y3+Vt)Vd1$$

$$B2=(3Ta+Y3+Vt+Y1+Vt)Vd2$$

$$B3=(3Ta+Y1+Vt+Y2+Vt)Vd3$$

For simultaneous recording of n number of real time data, the "n-simultaneous recording model" described above is used. Referring to FIG. 26, the following operations are performed in steps S701, S603, S606, S702, and S703.

Step S701: The unassigned area search means 503 searches for an unassigned area in the volume space in the information recording medium and assigns at least one unassigned area in the volume space as an area Ai in which real time data Di is to be recorded.

Step S603, S606: In compliance with the instruction for recording from the data recording means 505, the optical disc drive 531 executes a recording operation Wi for recording the real time data Di accumulated in a recording buffer WBi in the area Ai.

Step S702, S703: In the recording operation Wi, the recording switching means 502 determines whether or not the real time data Di has been recorded up to the end of the at least one recording area assigned as the area Ai. When it is determined that the real time data Di has been recorded up to the end of the recording area, the recording switching means 502 switches the recording operation Wi to another recording operation Wj (i≠j). When it is determined that the real time data Di has not been recorded up to the end of the recording area, the recording switching means 502 continues the recording operation Wi.

Each of at least one recording area assigned as the area Ai is structured so as to fulfill the simultaneous recording condition that the real time data Di, which is accumulated in the recording buffer WBi during n number of access operations accompanying the switching between the recording operations and (n−1) number of recording operations, can be recorded by one recording operation.

The simultaneous recording condition can be fulfilled where, for example, each of at least one recording area assigned as the area Ai in which the real time data Di is to be recorded has a size of Yi.

The size Yi for the recording area and the size Bi for the recording buffer WBi are obtained by the following expressions.

$$Yi=(n\times Ta\times Vt\times Vdi)+\{Vt-(Vd1+Vd2+\ldots+Vdn)\}$$

$$Bi=\{n\times Ta+(Y1+Y2+\ldots+Yn)\div Vt-Yi+Vt\}Vdi$$

Ta is the access time required for the pickup P to access between an innermost area and an outermost area of the information recording medium.

Vt is the data transfer rate between the pickup P and the recording buffer WBi.

Vdi is the data transfer rate between the encoding module EMi and the recording buffer WBi.

In addition, i is any integer of 1 or greater and n or loss, and n is any integer of 2 or greater which represents the number of the plurality of pieces of real time data for simultaneous recording.

Figure 14:
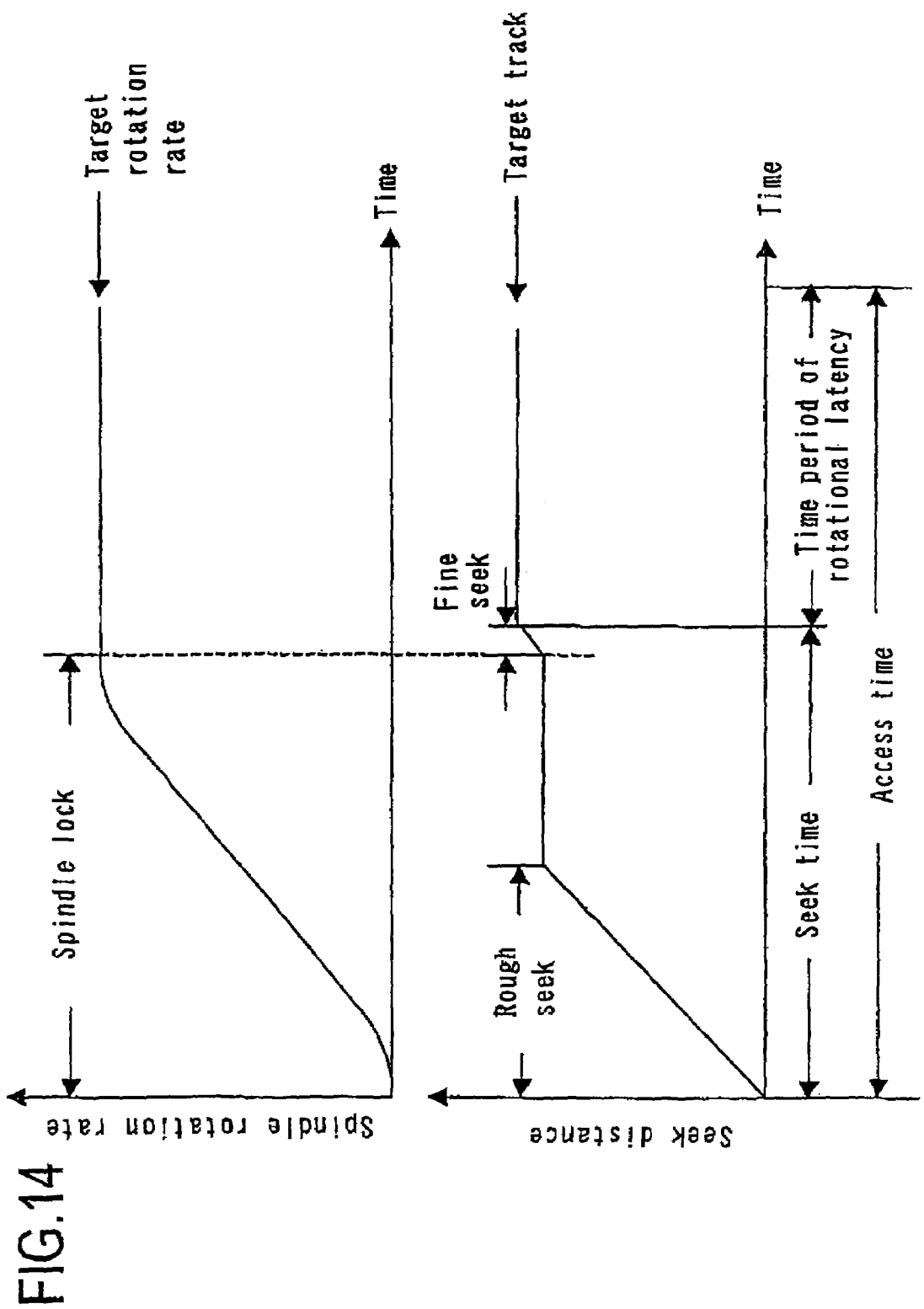
FIG. 14 shows the details of the access time according to the third example of the present invention.

Next, access performance of a drive for performing recording to and reproduction from a disc will be described. FIG. 14 shows the details of the access time of the drive for accessing a sector of a target track. When the distance for access is longer, the access time is longer by the distance corresponding to the movement (rough seek) of the pickup. For recording data on a CLV system (constant linear velocity system) disc, the rotation rate of the disc needs to be changed in accordance with the radial position to be accessed. Therefore, a spindle lock time is required for accelerating or decelerating the rotation of a spindle motor to match a prescribed rotation rate. The spindle motor is provided for rotating the disc. Once the rotation rate of the disc is locked, the search for an address becomes possible. Then, the movement of the pickup for performing multiple jumps in units of a plurality of tracks to access the target track (fine seek) requires some time. The multiple jumps are performed mainly using an optical system. After this, the pickup waits for the prescribed sector to come to the position corresponding to the pickup. Thus, recording or reproduction is made possible. When the distance for access is within a range of fine seek, the access time is the sum of the fine seek time and the time period of rotational latency. When the distance for access is ⅓ of the disc capacity, the access time is the sum of the corresponding spindle lock time and the rough seek time.

By pre-checking the access performance of the drive in simultaneous recording, the time for access between extents can be the access time obtained by the access performance of the drive, not the full seek time. Since such an access time is shorter than the full seek time, data can be recorded in a smaller continuous empty area. Even when the extent is made shorter by editing, it is more often determined that continuous recording is possible.

Figure 27:
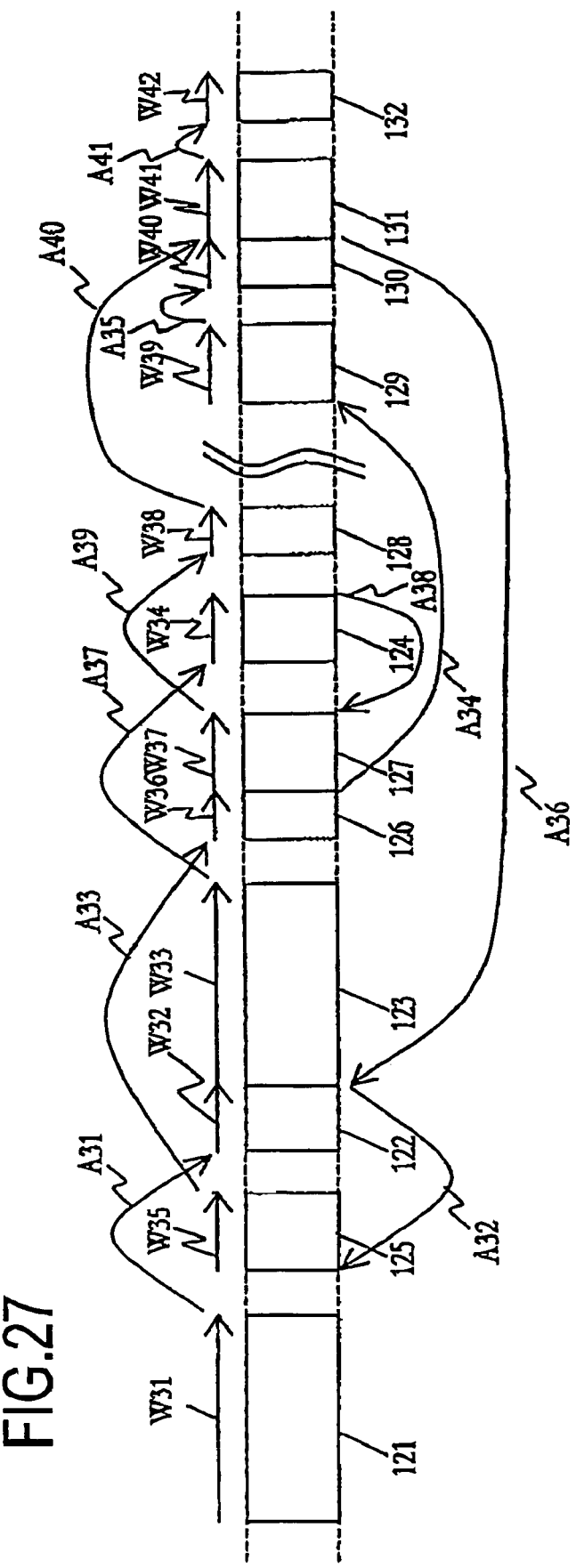
FIG. 27 shows access operations and a layout of recording areas for simultaneous recording of three pieces of real time data according to the third example of the present invention.

FIG. 27 shows access operations and a layout of recording areas for simultaneous recording of three pieces of real time data. In the case where, for example, the recording areas 128 and 129 are distanced from each other as far as an innermost area and an outermost area of the disc are distanced, the time required for each of access operations A40, A34 and A36 substantially equals the full seek time. In the case where the recording areas 122 and 121 are distanced from each other by approximately 100 tracks, the time required for the access operation A31 substantially equals the fine seek time.

In the method for simultaneous recording shown in FIG. 6, the access time (first access time or second access time) is estimated in step S602 in which an unassigned area is searched for. In the method for simultaneous recording shown in FIG. 26, the access time is estimated in step S701 in which an unassigned area is searched for. Such an estimation of the access time is performed by the unassigned area search means 503 (FIG. 5).

In consideration of the estimated access time, the simultaneous recording condition described in the second example is as follows.

$$Yi = \{2 \times (T1 + \ldots + Tn) \times Vt \times Vdi\} + \{Vt - (Vd1 + Vd2 + \ldots + Vdn)\}$$

$$Bi = \{2 \times (T1 + \ldots + Tn) + (Y1 + Y2 + \ldots + Yn) + Vt - Yi + Vt\}Vdi$$

Ti Is a first access time or a second access time. The first access time is the access time required for the pickup P to access from an area Ai in which real time data Di is to be recorded to an area Aj in which real time data DJ is to be recorded. The second access time is the access time required to access from one area among at least one area assigned as the area Ai in which the real time data Di is to be recorded to another area.

In addition, i is any integer of 1 or greater and n or less, and n is any integer of 2 or greater which represents the number of a plurality of pieces of real time data to be simultaneously recorded.

The above-described simultaneous recording condition is applicable to the case where the transfer rate of the plurality of pieces of real time data is the same (i.e., in the case where Vd1=Vd2= . . . =Vdn).

In consideration of the estimated access time, the simultaneous recording condition described in the third example is as follows.

$$Yi = \{(T1 + \ldots + Tn) \times Vt \times Vdi\} + \{Vt - (Vd1 + Vd2 + \ldots + Vdn)\}$$

$$Bi = \{(T1 + \ldots + Tn) + (Y1 + Y2 + \ldots + Yn) + Vt - Yi + Vt\}Vdi$$

Ti is the access time required for the pickup P to access from an area Ai in which real time data Di is to be recorded to an area Aj in which real time data Dj is to be recorded.

In addition, i is any integer of 1 or greater and n or less, and n is any integer of 2 or greater which represents the number of a plurality of pieces of real time data to be simultaneously recorded.

The above-described simultaneous recording condition is applicable to the case where the transfer rate of the plurality of pieces of real time data is the same (i.e., in the case where Vd1=Vd2= . . . =Vdn).

Figure 15:
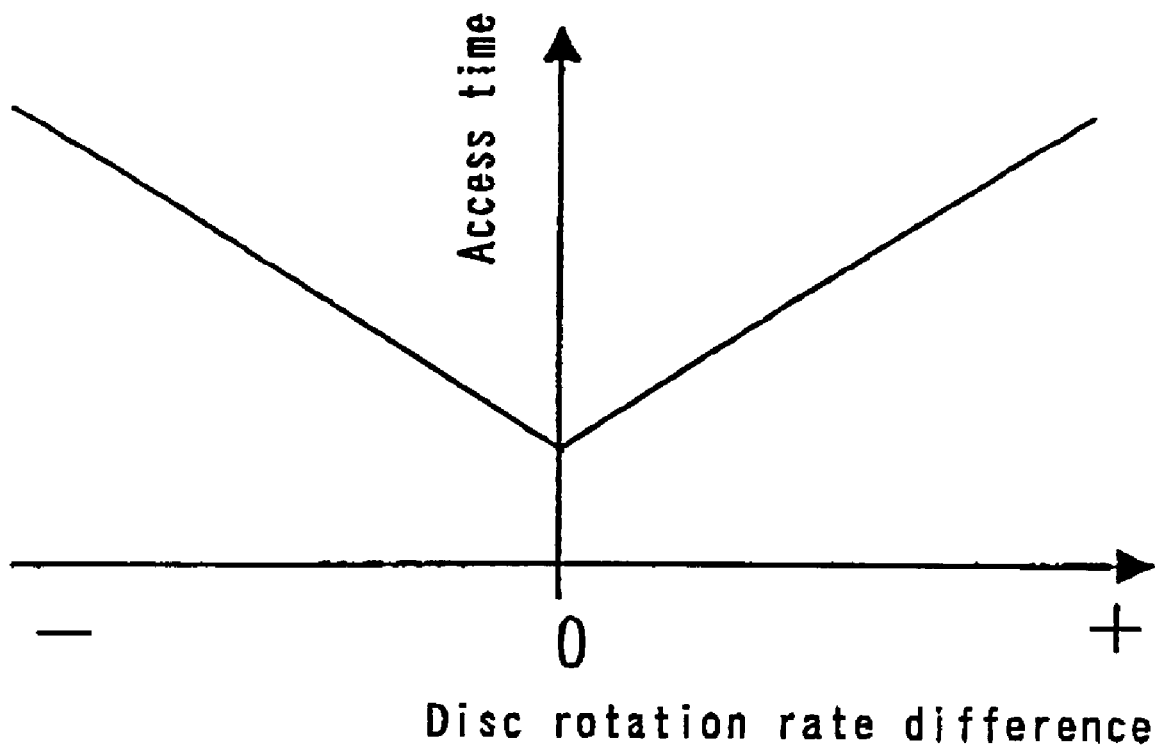
FIG. 15 shows the relationship between the rotation rate difference of the disc and the access time according to the third example of the present invention.

Next, a method for improving the utilization efficiency and editing efficiency of the disc by restricting the full seek time will be described. FIG. 15 shows the relationship between the rotation rate difference of the spindle motor of the drive and the access time. With the premise of TRQ=(N1−N2)·J/(dt·Kj), the access time Tacc is obtained as follows.

$$Tacc = \text{(spindle lock time)} + \text{(the time period of rotational latency)} + \text{constant} = (N1 - N2) \times J + (TRQ \times KJ) + Trev + \text{constant} \approx A \times dN + B$$

In the above expression, A and B are each a constant, dN is the rotation rate difference (=N1−N2), dt is the spindle look time, J is the inertial of the disc, Kj is the conversion constant, N1 is the rotation rate before access, N2 is the rotation rate after access, Trev is the time period of rotational latency, and TRQ is the torque of the motor. The above-mentioned access performance model is set based on the relationship between the rotation rate difference of the disc and the access time. As described above with reference to FIG. 14, for moving the pickup to a position close to the target track, rough seek and a change in the rotation rate of the spindle motor are necessary. With the performance of the spindle motor used in an optical disc drive, the access time is dominantly influenced by the change in the rotation rate of the spindle motor. Paying attention to the fact that the spindle lock time is in proportion to the rotation rate difference, the access time can be represented by the above expression. The time period of rotational latency (Trev), when being sufficiently smaller than the spindle lock time, can be omitted. In that case, the access time Tacc can be linearly estimated with respect to the rotation rate difference dN of the disc.

Once the initial position and the target position of the pickup are found, the rotation rate and the rotation rate difference of the disc can be uniquely obtained from the relationship thereof with the linear velocity of the disc. Where A1 is the address before access, A2 is the address after access, r1 is the radial position of A1, r2 is the radial position of A2, and r0 is the radial position of address 0, the addresses A1 and A2 are obtained as follows. The value of an address is in proportion to the area of a circle having the address on the outer circumference thereof. C is a constant.

$$A1 = C \cdot (\pi \cdot r1 \cdot r1 - \pi \cdot r0 \cdot r0)$$

$$A2 = C \cdot (\pi \cdot r2 \cdot r2 - \pi \cdot r0 \cdot r0)$$

The rotation rate at a certain address is in inverse proportion to the radial position thereof. Therefore, where N1 is the rotation rate of A1, N2 is the rotation rate of A2, and D is the constant, $$N1 = D/r1, \text{ and}$$

$$N2 = D/r2.$$

Using the above expressions, the rotation rate can be obtained from the address.

Figure 16:
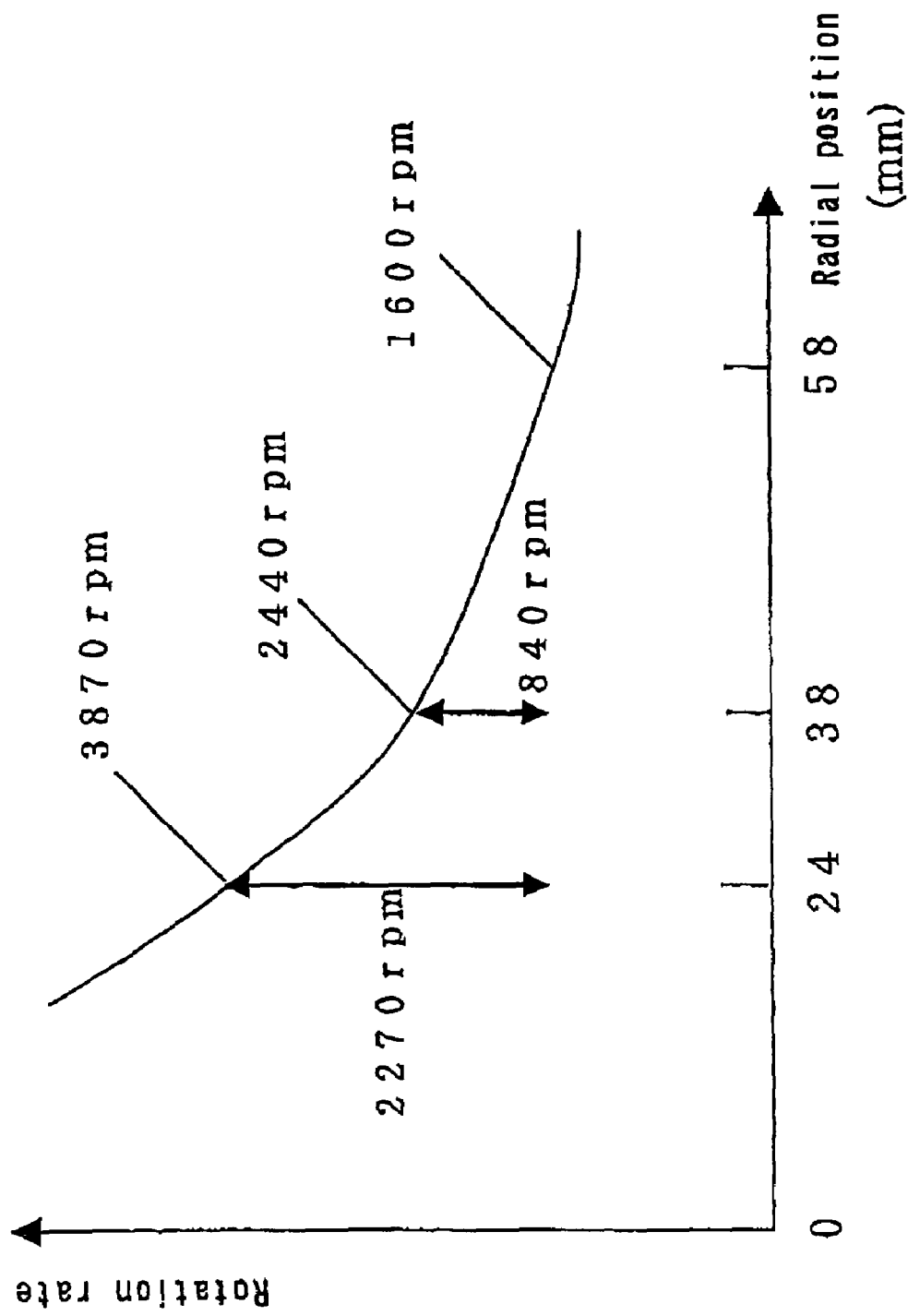
FIG. 16 shows the relationship between the radial position and the rotation rate difference of the disc according to the third example of the present invention.
Figure 28:
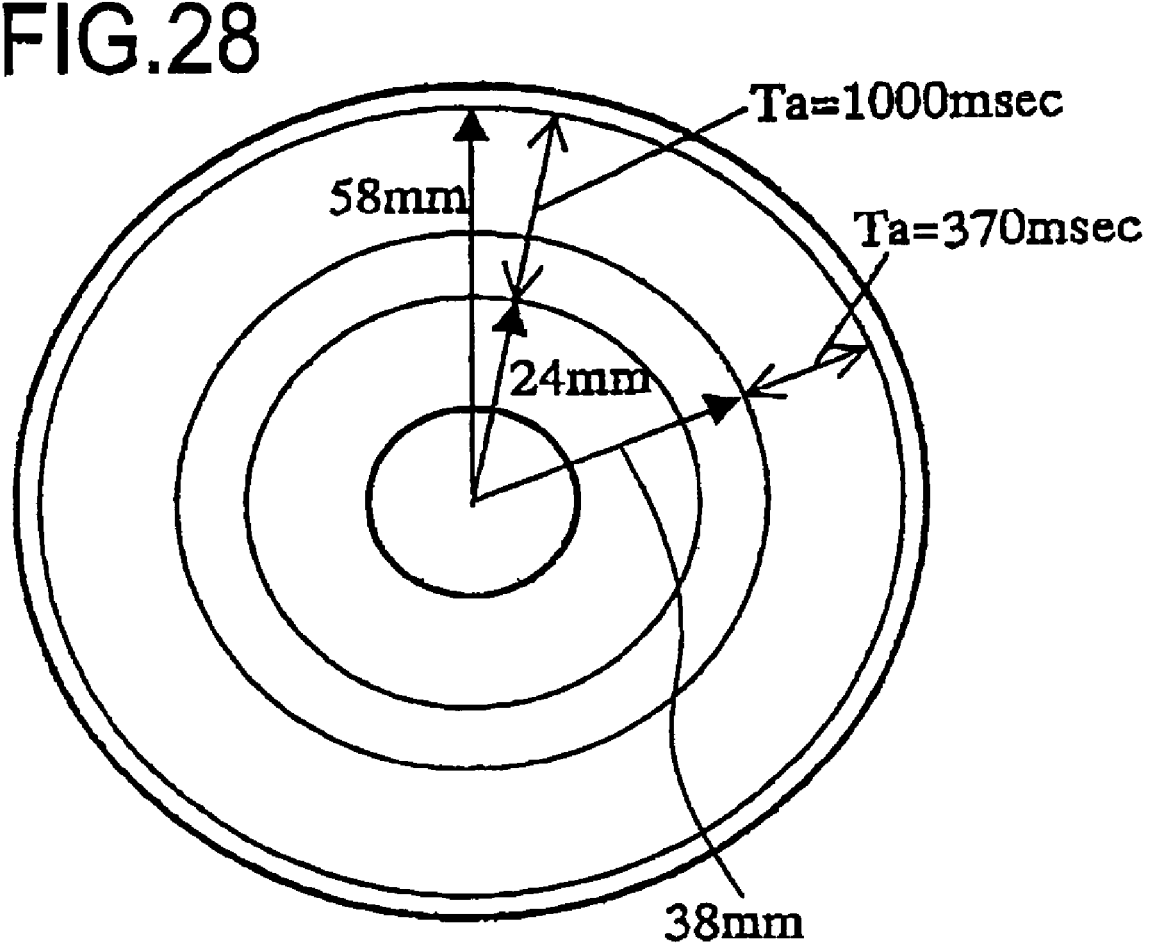
FIG. 28 shows areas to be accessed on the disc and an access time required for full seek in the area according to the third example of the present invention.

FIG. 16 shows the relationship between the radial position and the rotation rate of a disc having a diameter of 12 cm, a capacity of 25 GB, and a reading rate of 72Mbps. The logical product of the radial position and the rotation rate is constant. Therefore, when an access of a given distance is made in a radial direction, the access time is shorter at an outer portion of the disc than at an inner portion of the disc since the rotation rate difference Is smaller at the outer portion of the disc than the inner portion. The volume space extends between a position having a radius of 24 mm and a position having a radius of 58 mm, and the full seek time is in proportion to the rotation rate difference of 2270 rpm. It is assumed now that AV data Is to be recorded in an area extending between a position having a radius of 38 mm and a position having a radius of 58 mm. The access time, which is in proportion to the rotation rate difference of 840 rpm, is about 1/2.7 of 2270 rpm. In FIG. 28, the longest access time from a position having a radius of 24 mm to a position having a radius of 58 mm is 1000 msec. In such a case, the longest access time is reduced to 370 msec. by providing a recording area between a position having a radius of 38 mm and a position having a radius of 58 mm. The capacity of the area between the position having a radius of 38 mm and the position having a radius of 58 mm is 17 GB, which Is about 30 percent less than the case where the longest access time is 1000 msec. Unless a significantly large capacity is required, an outer portion of the disc can be set as a high-speed access zone in which AV data is to be recorded. In this manner, the access time can be significantly reduced, and the size required for a continuous recording area under the simultaneous recording condition can be reduced in proportion to the access time. Owing to such a high-speed access zone, even when the extent is shortened, continuous reproduction is made possible more often. This is especially useful for, for example, cut-editing, AV split editing or the like.

When recording is performed utilizing the above-described characteristics of the disc, the discs may be classified into discs having a high-speed access zone and discs with no such zone. Information indicating to which class the disc belongs may be recorded in the lead-in area or the volume space. For example, the disc having a high-speed access zone is classified as class 1, and the disc having no such zone is classified as class 0. The maximum access time in the high-speed access zone may be recorded together with the information on the class. Such settings improve inter-apparatus compatibility since an optical disc apparatus on which the disc is mounted can find the information on the class of the disc.

When an optical disc having a capacity of 25 GB is used for a consumer video recorder which has the same functionality as, for example, a VTR, such an optical disc realizes a recording time as long as 10 hours. This allows various types of processing to be performed with one disc, such as material editing, as well as timer recording. The editing performance after recording can be improved where a plurality of high-speed access zones are set.

When a high-speed access zone is set in a one-layer disc, the capacity is small. This problem is solved in the case of a two-layer disc, which has a high-speed access zone formed of (i) a zone of a recording surface of the first layer and (ii) a zone of a recording surface of a second layer, the zones being at the same radial position. Precisely, the zones of the two recording surfaces are not exactly at the same radial position due to the physical production process. However, the access time required for accessing between a target track in the first layer and a target track in the second layer is about the same as the sum of a focus switching time required by the pickup and the time period of rotational latency, and thus is generally shorter than the fine seek time. The time required for accessing between the target tracks in the layers is sufficiently shorter than the access time from an innermost portion to an outermost portion of the high-speed access zone.

For simultaneous recording of n number of real time data on an information recording medium, areas Ai in which real time data Di is to be recorded may be provided in an outer portion of the information recording medium (for example, the high-speed access zone) for all the values of i, which is 1 or greater and n or less. Thus, the access time can be shortened.

EXAMPLE 4

In a fourth example of the present invention, a simultaneous reproduction condition in the case where audio data and video data related to each other are recorded in different areas and then cut-edited will be described by way of three specific examples with reference to FIGS. 18, 19 and 20. Cut-editing is to designate the sets of a reproduction start point (hereinafter, referred to as an "in"point) and a reproduction termination point (hereinafter, referred to as an "out" point) to recorded real time data in order, so that a plurality of sections can be reproduced in the designated order. In the case where the audio data and video data are recorded in different areas, not as one MPEG stream, the audio data and video data can be regarded as two pieces of real time data, which can be simultaneously recorded using the methods described in the first, second and third examples.

Figure 17:
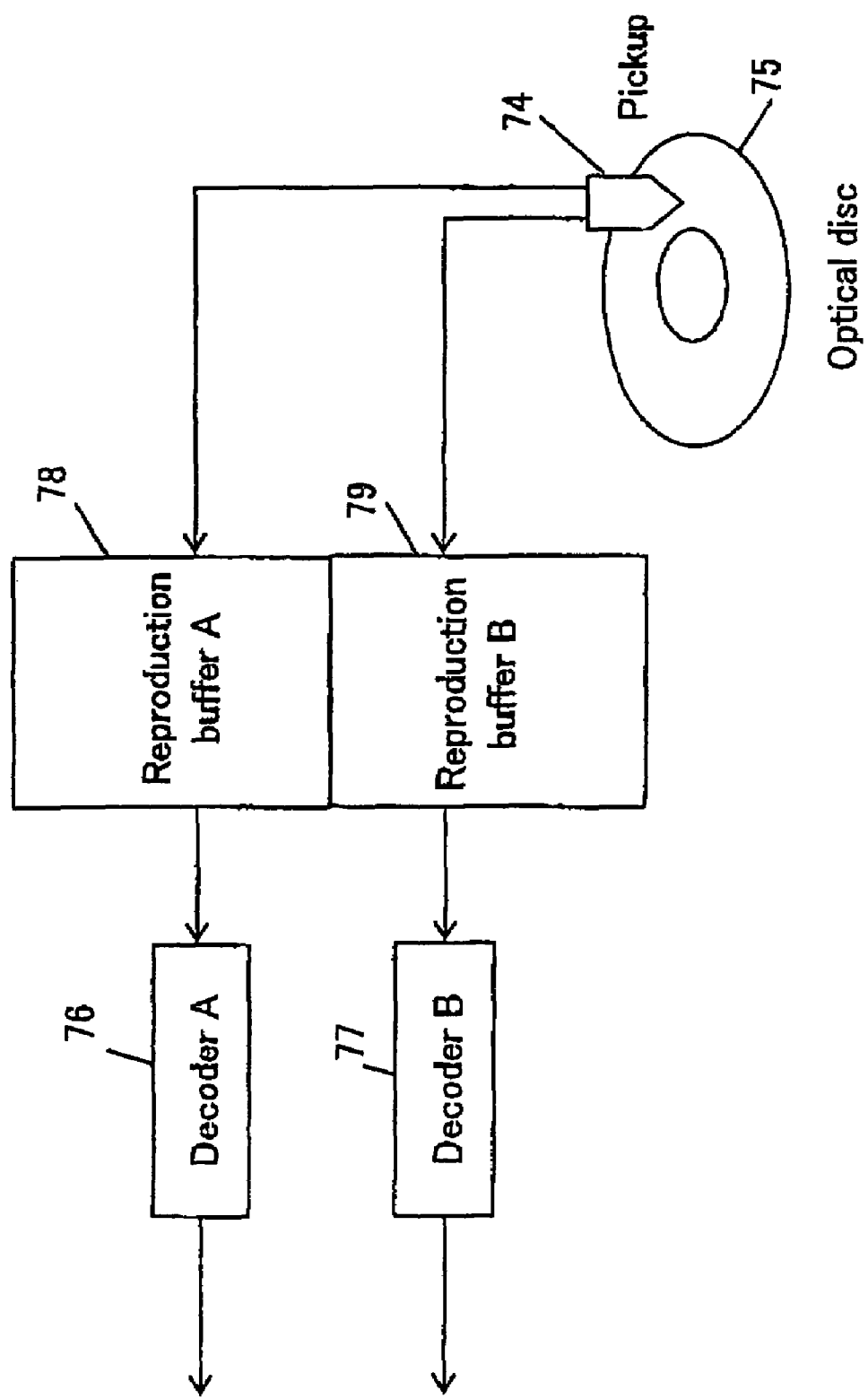
FIG. 17 shows a model for realizing simultaneous reproduction according to a fourth example of the present invention.

FIG. 17 shows a simultaneous reproduction model for simultaneously reproducing two pieces of real time data. The simultaneous reproduction model includes a pickup 74 for recording real time data to and reproducing real time data from an information recording medium, a reproduction buffer A (reproduction buffer 78) for accumulating real time data A read from the information recording medium, a decoder A (decoder 76) for decoding the real time data A accumulated in the reproduction buffer A, a reproduction buffer B (reproduction buffer 79) for accumulating real time data B read from the information recording medium, and a decoder B (decoder 77) for decoding the real time data B accumulated in the reproduction buffer B.

The difference between the simultaneous reproduction model and the simultaneous recording model is as follows. In simultaneous reproduction, when data is started to be read, the data is accumulated in the reproduction buffer, and the reproduction of the real time data is not interrupted unless the reproduction buffer becomes empty at the time of access. In simultaneous recording, when data is started to be recorded, the data amount in the recording buffer is reduced, and the data is accumulated in the recording buffer and the data is recorded without being missed unless the recording buffer is overflowed with data.

A simultaneous reproduction condition for simultaneously reproducing a plurality of pieces of real time data recorded on an information recording medium is similar to the simultaneous recording condition. The difference is that the data transfer rates Vt, Vd, Vd1, and Vd2 are not data transfer rates for recording but are data transfer rates for reproduction. Namely, in simultaneous reproduction, Vt is the data transfer rate between the pickup 74 and each of the reproduction buffers A and B, and Vd is the data transfer rate between each of the decoders A and B and each of the reproduction buffers A and B. Vd1 is the data transfer rate between the decoder A and the reproduction buffer A, and Vd2 is the data transfer rate between the decoder B and the reproduction buffer B.

Figure 29:
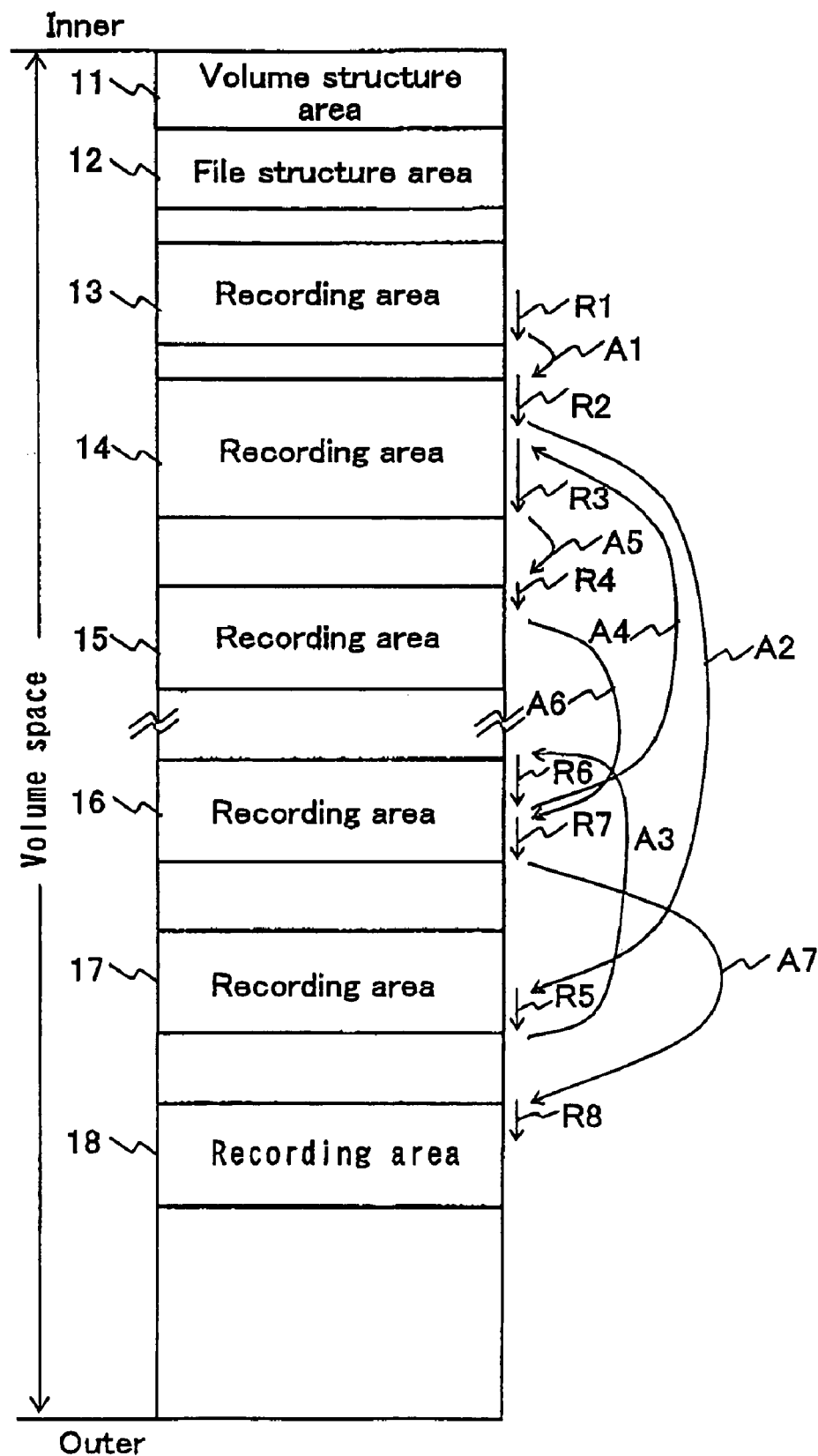
FIG. 29 shows access operations a layout of variable-sized recording areas on an information recording medium for simultaneous reproduction according to the fourth example of the present invention.
Figure 3C:
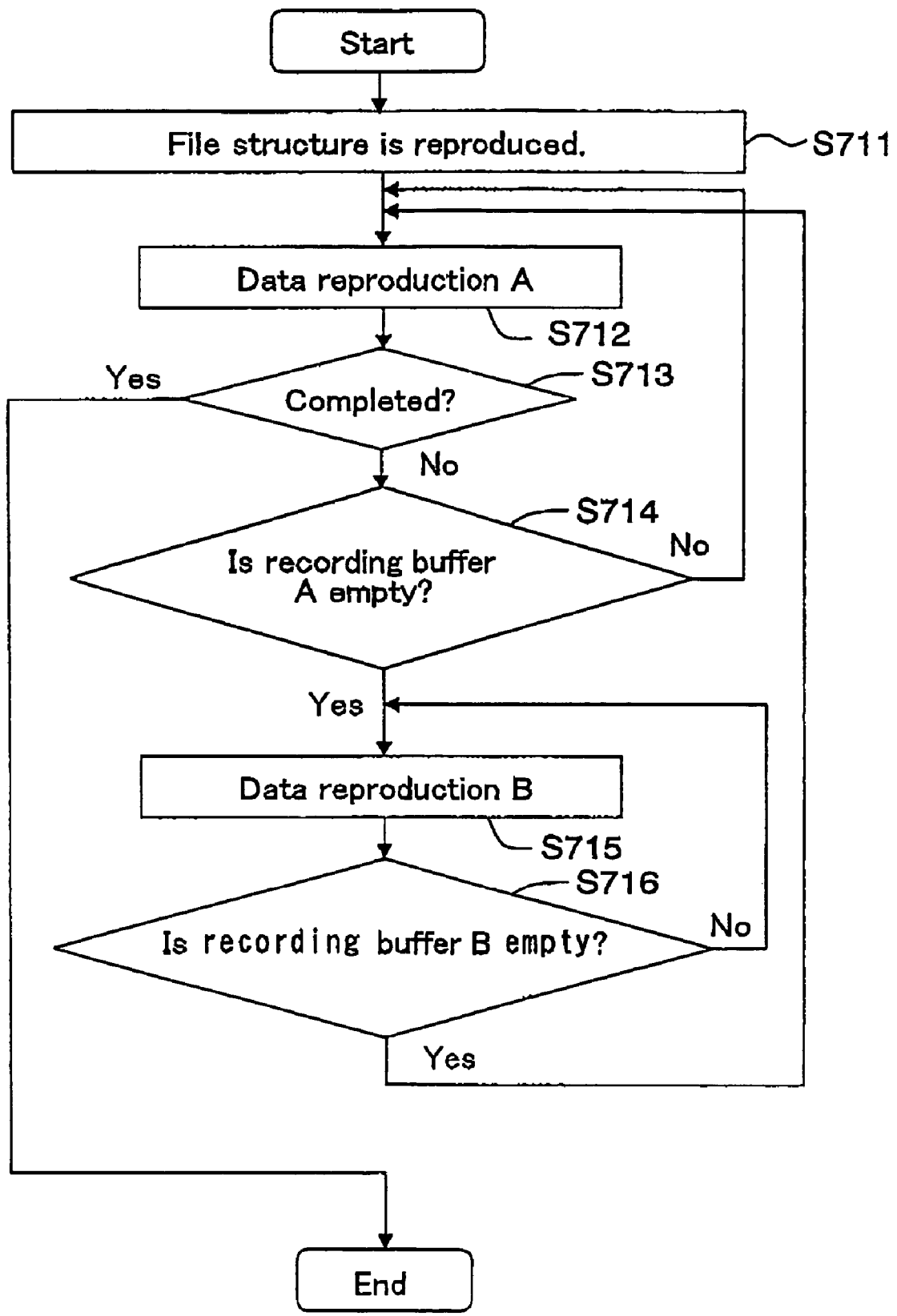

FIG. 29 shows access operations and a layout of the recording areas each having a variable size, for simultaneous reproduction of data recorded on the recording areas in the disc described in the first example. Simultaneously recorded data can be simultaneously reproduced using a reproduction apparatus similar to the recording apparatus.

FIG. 30 shows a flowchart illustrating a method for simultaneous reproduction corresponding to a method for simultaneous recording in the case where the recording rate of the data to be recorded is variable in a time-wise manner. The differences between the method for simultaneous reproduction and the method for simultaneous recording are that (i) the recording buffers are replaced with reproduction buffers, and (ii) the condition for switching one reproduction operation to another reproduction operation is different. Namely, in simultaneous reproduction, when the reproduction buffer becomes full, the reproduction operation is switched.

For simultaneous reproduction of n number of real time data recorded on an information recording medium, a simultaneous reproduction model is used. This simultaneous reproduction model Includes a pickup P for accessing an area in the information recording medium, a reproduction buffer RBi for accumulating real time data Di which is read from the information recording medium, and a decoding module DMi for decoding real time data Di accumulated in the reproduction buffer RBi. (This simultaneous reproduction model will be referred to as an "n-simultaneous reproduction model", hereinafter.) In this case, the following operation is performed in each of steps S712, S715, S713 and S714 shown in FIG. 30.

Step S712, S715: In compliance with the instruction from the data reproduction means 506 for reproduction, the optical disc drive 531 executes a reproduction operation Ri for reading the real time data Di from an area Ai having the real time data Di recorded thereon.

Step S713, S714: While the reproduction operation Ri is being executed, the reproduction switching means 515 determines whether the reproduction buffer RBi is full or not. When the reproduction buffer RBi is determined to be full, the switching means 515 switches the reproduction operation Ri to another reproduction operation Rj (i≠j). When the reproduction buffer RBi is determined not to be full, the reproduction switching means 515 continues the reproduction operation Ri.

Each of at least one recording area assigned as an area Ai in which the real time data Di is to be recorded is structured to fulfill a simultaneous reproduction condition that the reproduction buffer RBi can be made full by at most one access operation and at most two reproduction operations.

For example, the simultaneous reproduction condition can be fulfilled where each of the at least one area assigned as the area Ai in which the real time data Di is to be recorded has a size of Y (or Yi) or greater.

A minimum size Y for the recording area and a size B of the reproduction buffer RBi are obtained by the following expressions.

$$Y = 2 \times n \times Ta \times Vd \times Vt + (Vt - n \times Vd)$$

$$B = (2 \times n \times Ta \div (n-1) \times Y/Vt) \times Vd$$

Ta is the access time required for the pickup P to access between an innermost area and an outermost area of the Information recording medium.

Vt is the data transfer rate between the pickup P and the reproduction buffer RBi.

Vd is the data transfer rate between the decoding module DMi and the reproduction buffer RBi for all values of i.

A minimum size Yi for the recording area and a size Bi of the reproduction buffer RBi may be obtained by the following expressions.

$$Yi = (2 \times n \times Ta \times Vt \times Vdi) \div \{Vt - (Vd1 + Vd2 + \ldots + Vdn)\}$$

$$Bi = \{2 \times n \times Ta + (Y1 + Y2 + \ldots + Yn) + Vt - Yi + Vt\}Vdi$$

Vdi is the data transfer rate between the decoding module DMi and the reproduction buffer RBi.

Alternatively, a minimum size Yi for the recording area and a size Bi of the reproduction buffer RBi may be obtained by the following expressions in consideration of an estimated access time.

$$Yi = \{2 \times (T1 + \ldots + Tn) \times Vt \times Vdi\} + \{Vt - (Vd1 + Vd2 + \ldots + Vdn)\}$$

$$Bi = \{2 \times (T1 + \ldots + Tn) + (Y1 + Y2 + \ldots + Yn) + Vt - Yi + Vt\}Vdi$$

Ti is a first access time or a second access time. The first access time is an access time required for the pickup P to access from an area Ai in which the real time data Di is to be recorded to an area Aj in which real time data Dj is to be recorded. The second access time is an access time required for the pickup P to access from one area among at least one area assigned as the area Ai in which the real time data Di is to be recorded to another area.

Here, i is any integer of 1 or greater and n or less, and n is any integer of 2 or greater which represents the number of the plurality of pieces of real time data for simultaneous reproduction.

The above-described simultaneous reproduction condition is applicable to the case where the transfer rate of the plurality of pieces of real time data is the same (i.e., in the case where Vd1=Vd2= . . . =Vdn).

FIG. 31 shows a condition for simultaneous reproduction from recording areas each having a variable size. Each reproduction buffer can transfer data to the decoder continuously without being underflowed. Although not shown, a threshold in a buffer is predetermined such that the buffer is determined to be full when the data amount in the buffer is above the threshold.

The expressions for obtaining the simultaneous reproduction condition, which is obtained from FIG. 31, are the same as the expressions for obtaining the corresponding simultaneous recording condition.

FIG. 32 shows access operations for simultaneous reproduction of data recorded on the recording areas in the disc described in the third example and a layout of the recording areas each having a fixed size.

Figure 33:
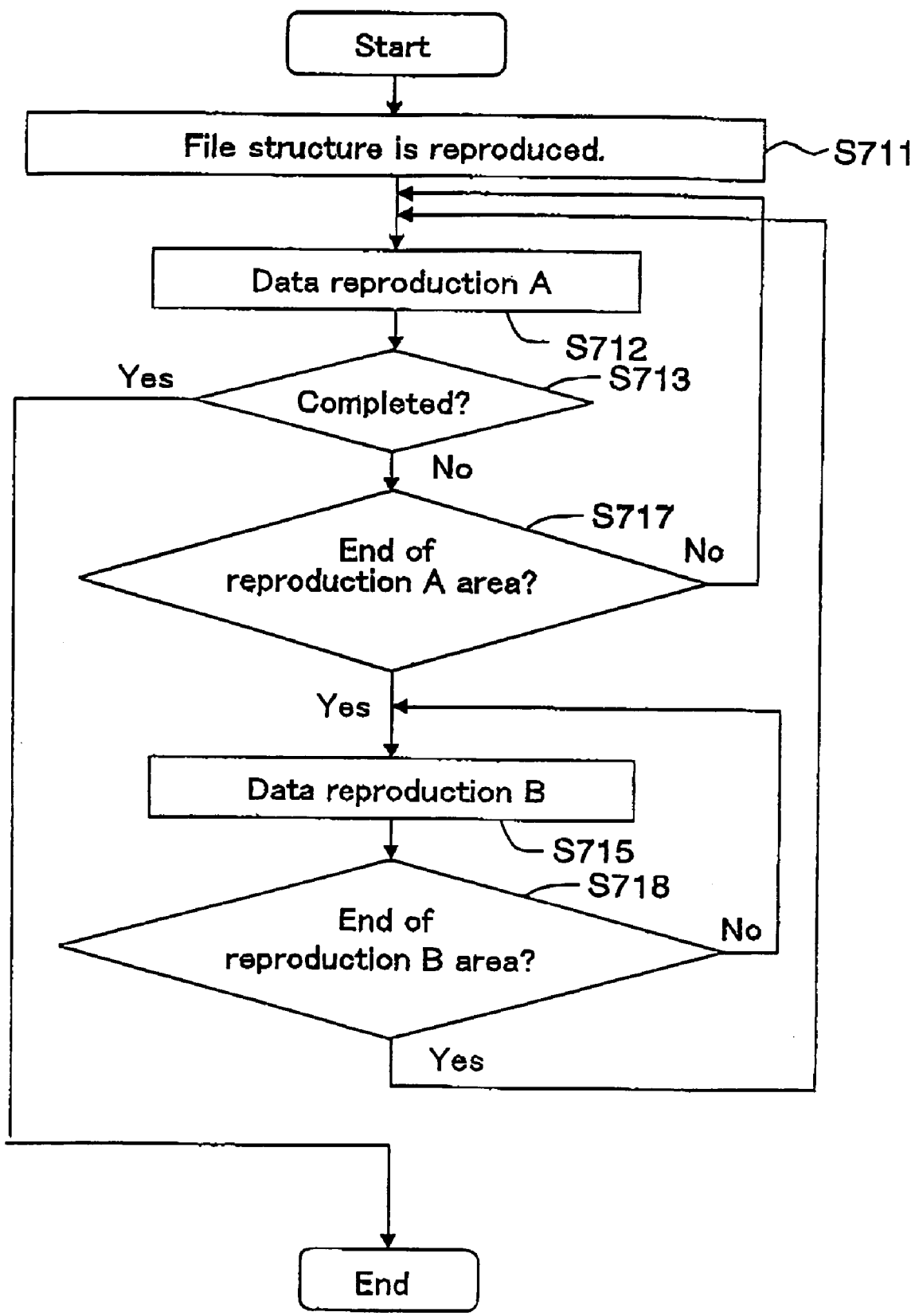
FIG. 33 is a flowchart illustrating a method for simultaneous reproduction from fixed-sized recording areas according to the fourth example of the present invention.

FIG. 33 shows a flowchart illustrating a method for simultaneous reproduction corresponding to a method for simultaneous recording in the case where the recording rate of the data to be recorded is fixed. The differences between the method for simultaneous reproduction and the method for simultaneous recording are that (i) the recording buffers are replaced with reproduction buffers, and (ii) the condition for switching one reproduction operation to another reproduction operation is different. Namely, in simultaneous reproduction, a reproduction operation is continued until the end of the area in which the data to be reproduced is recorded, and the reproduction operation is switched at the end of the area.

For simultaneous reproduction of n number of real time data, the "n-simultaneous reproduction model" described above is used. In this case, the following operation is performed in each of steps S712, S715, S717 and S718 shown in FIG. 33.

Step S712, S715: In compliance with the instruction from the data reproduction means 506 for reproduction, the optical disc drive 531 executes a reproduction operation Ri for reading real time data Di from an area Ai having the real time data Di recorded thereon.

Step S717, S718: In the reproduction operation Ri, the reproduction switching means 515 determines whether or not the real time data Di has been reproduced up to the end of at least one recording area assigned as an area Ai. When it is determined that the real time data Di has been reproduced up to the end of the recording area, the reproduction switching means 515 switches the reproduction operation Ri to another reproduction operation Rj (i≠j). When it is determined that the real time data Di has not been reproduced up to the end of the recording area, the reproduction switching means 515 continues the reproduction operation Ri.

Each of the at least one recording area assigned as the area Ai in which the real time data Di is to be recorded is structured to fulfill the simultaneous reproduction condition that the real time data Di accumulated in the reproduction buffer RBi during one reproduction operation can be consumed during n number of access operations accompanying switching between the reproduction operations and (n−1) number of reproduction operations.

For example, the simultaneous reproduction condition can be fulfilled where each of the at least one recording area assigned as the area Ai in which the real time data Di is to be recorded has a size of Yi.

A size Yi for the recording area and a size Bi of the reproduction buffer RBi are obtained by the following expressions.

$$Yi = (n \times Ta \times Vt \times Vdi) + \{Vt - (Vd1 + Vd2 + \ldots + Vdn)\}$$

$$Bi = \{n \times Ta + (Y1 + Y2 + \ldots + Yn) + Vt - Yi + Vt\}Vdi$$

Alternatively, a size Yi for the recording area and a size Bi of the reproduction buffer RBi may be obtained by the following expressions in consideration of an estimated access time.

$$Yi = \{(T1 + \ldots + Tn) \times Vt \times Vdi\} + \{Vt - (Vd1 + Vd2 + \ldots + Vdn)\}$$

$$Bi = \{(T1 + \ldots + Tn) + (Y1 + Y2 + \ldots + Yn) + Vt - Yi + Vt\}Vdi$$

Ti is an access time required for the pickup P to access from an area Ai in which the real time data Di is recorded to an area Aj in which real time data Dj is recorded.

Here, i is any integer of 1 or greater and n or less, and n is any integer of 2 or greater which represents the number of the plurality of pieces of real time data for simultaneous reproduction.

The above-described simultaneous reproduction condition is applicable to the case where the transfer rate of the plurality of pieces of real time data is the same (I.e., in the case where Vd1=Vd2= . . . =Vdn).

Figure 34:
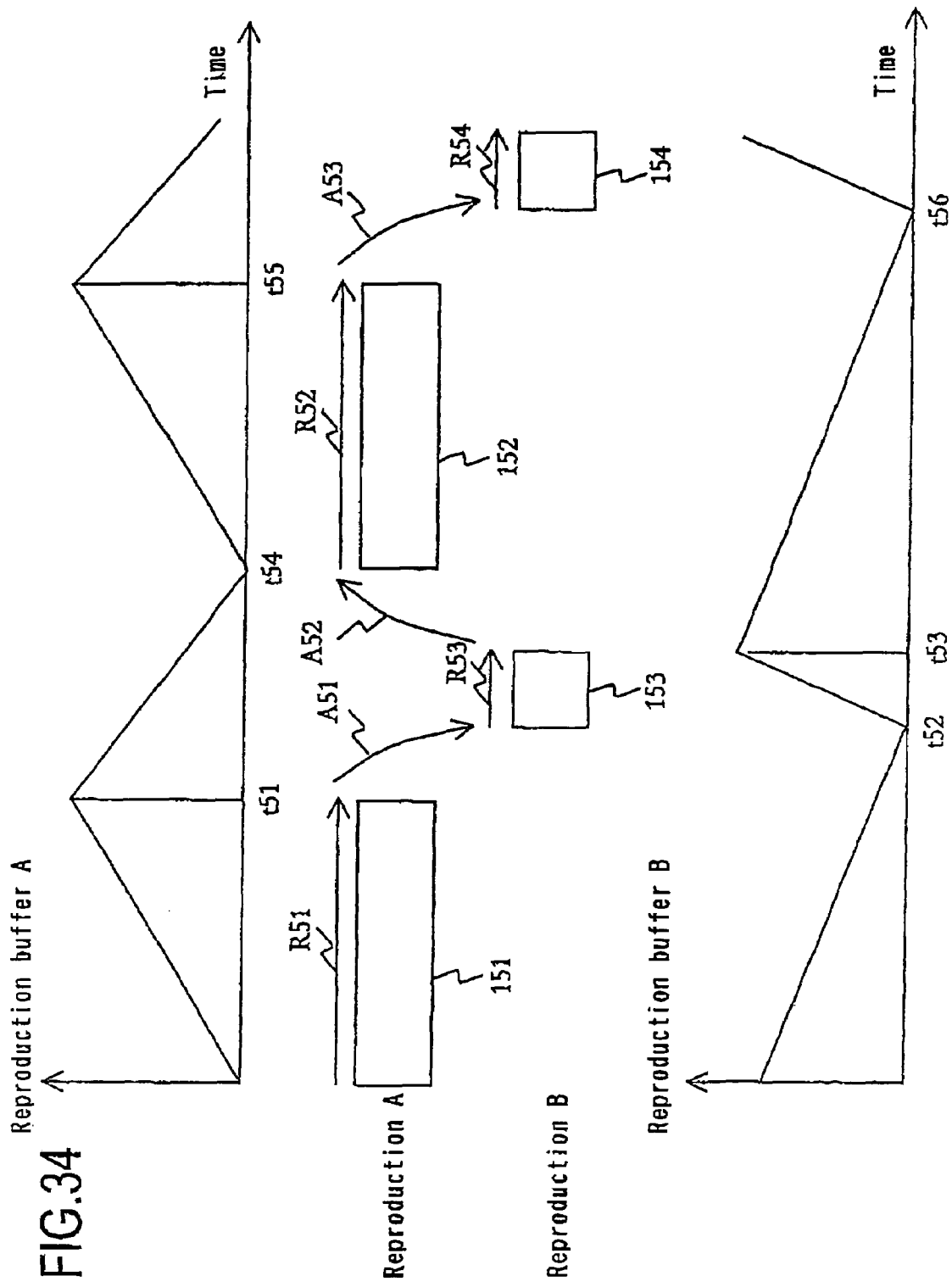
FIG. 34 shows a condition for simultaneous reproduction from fixed-sized recording areas of the information recording medium according to the fourth example of the present invention.

FIG. 34 shows a condition for simultaneous reproduction from recording areas each having a fixed size. Each reproduction buffer can transfer data to the decoder continuously without being underflowed. The simultaneous reproduction is performed by switching the reproduction operations at the end of the recording areas.

The expressions for obtaining the simultaneous reproduction condition, which are obtained from FIG. 34, are the same as the expressions for obtaining the corresponding simultaneous recording condition.

The structure of the information recording and reproduction apparatus is the same as that of the information recording and reproduction apparatus shown in FIG. 5. The reproduction switching means 515 controls switching of the reproduction operations of the real time data, and realizes reproduction of continuous data while buffering the data to be reproduced using reproduction buffer memories A and B (512, 513).

Figure 35:
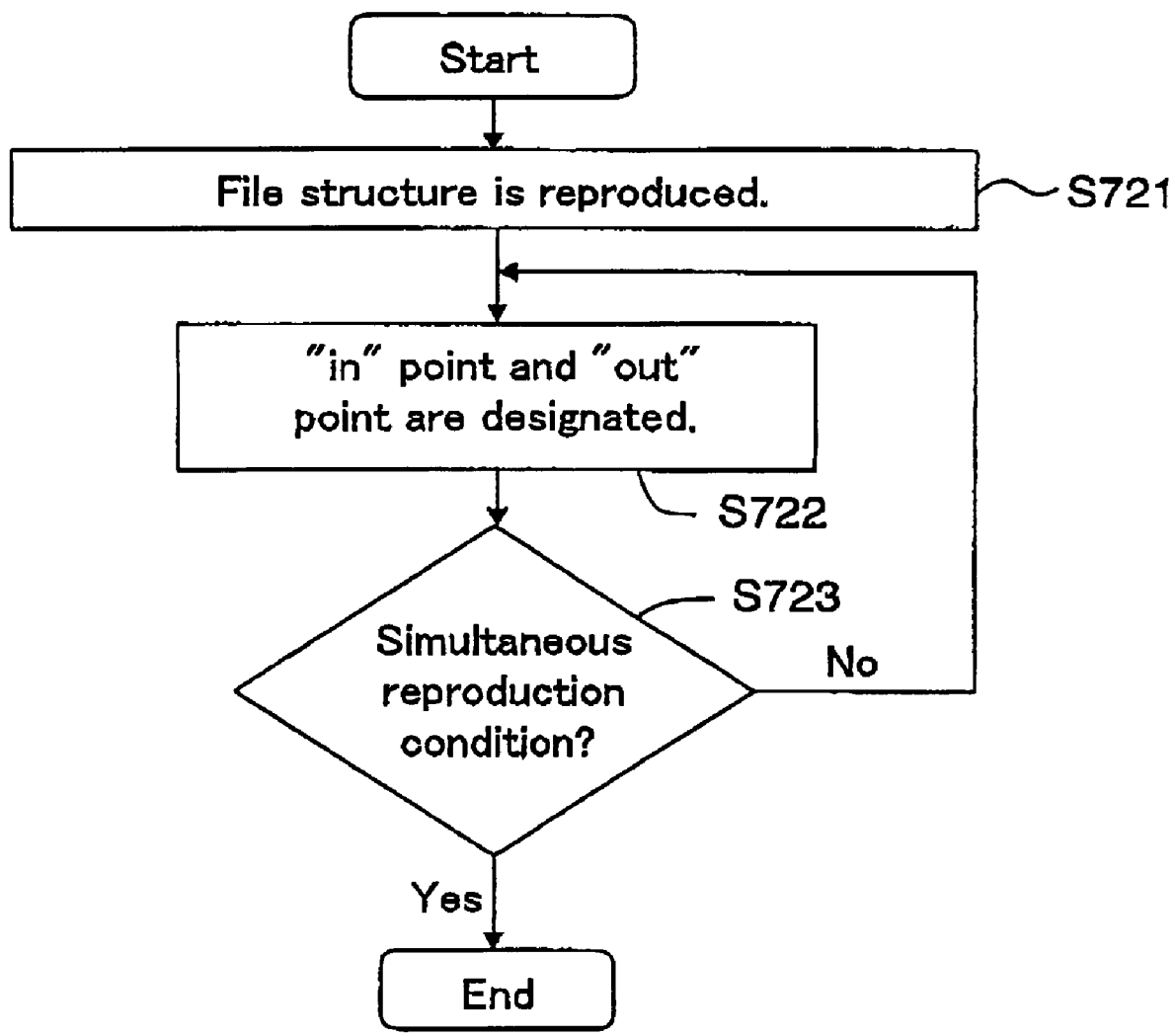
FIG. 35 is a flowchart illustrating an editing method according to the fourth example of the present invention.

FIG. 35 shows a procedure of a method for editing real time data. Such a method is stored, for example, in the form of a program in a memory in the system control section 501. Such a program can be executed by the microcomputer In the system control section 501.

The file structure processing means 504 reads out a file structure in order to find where data on the file is recorded (step S721).

"In" point and "out" point setting means 514 uses an "in" point and an "out" point to designate a range of area to be reproduced, in the area in which the real time data is recorded (step S722).

The unassigned area search means 503 determines whether or not the simultaneous reproduction condition is fulfilled for reproducing the area designated by the "in" point and the "out" point (step S723). The determination result is presented to the user by any method (for example, by way of display). When the simultaneous reproduction condition is fulfilled, the user understands that continuous reproduction is possible. When the simultaneous reproduction condition is not fulfilled, the user can change the editing point such that continuous reproduction is possible, or can move the data of a portion which causes discontinuity such that continuous reproduction is possible.

As the simultaneous reproduction condition, any of the above-mentioned conditions can be used. By permitting the real time data to be edited only when the simultaneous reproduction condition is fulfilled, it is guaranteed that a plurality of pieces of real time data including the edited real time data are simultaneously reproduced.

In order to guarantee that n number of real time data including the edited real time data are simultaneously reproduced, the "n-simultaneous reproduction model" described above is used. Referring to FIG. 35, the following operations are performed in steps S722 and S723.

In step S722: The "in" point and "out" point setting means 514 selects at least one area from an area Ai having real time data Di recorded therein. The selected at least one area shows the range of area that the user wishes to reproduce. Any method may be used for selecting the at least one area. For example, at least one area can be selected from the area Ai by designating the range of area Ai using the "in" point and the "out" point.

Step S723: The unassigned area search means 503 determines whether or not each of the at least one area selected in step S722 is structured to fulfill the simultaneous reproduction condition. Only when the determination result is "Yes", is it permitted to edit the real time data Di.

Here, i is any integer of 1 or greater and n or less, and n is any integer of 2 or greater which represents the number of the plurality of pieces of real time data for simultaneous reproduction.

Figure 18:
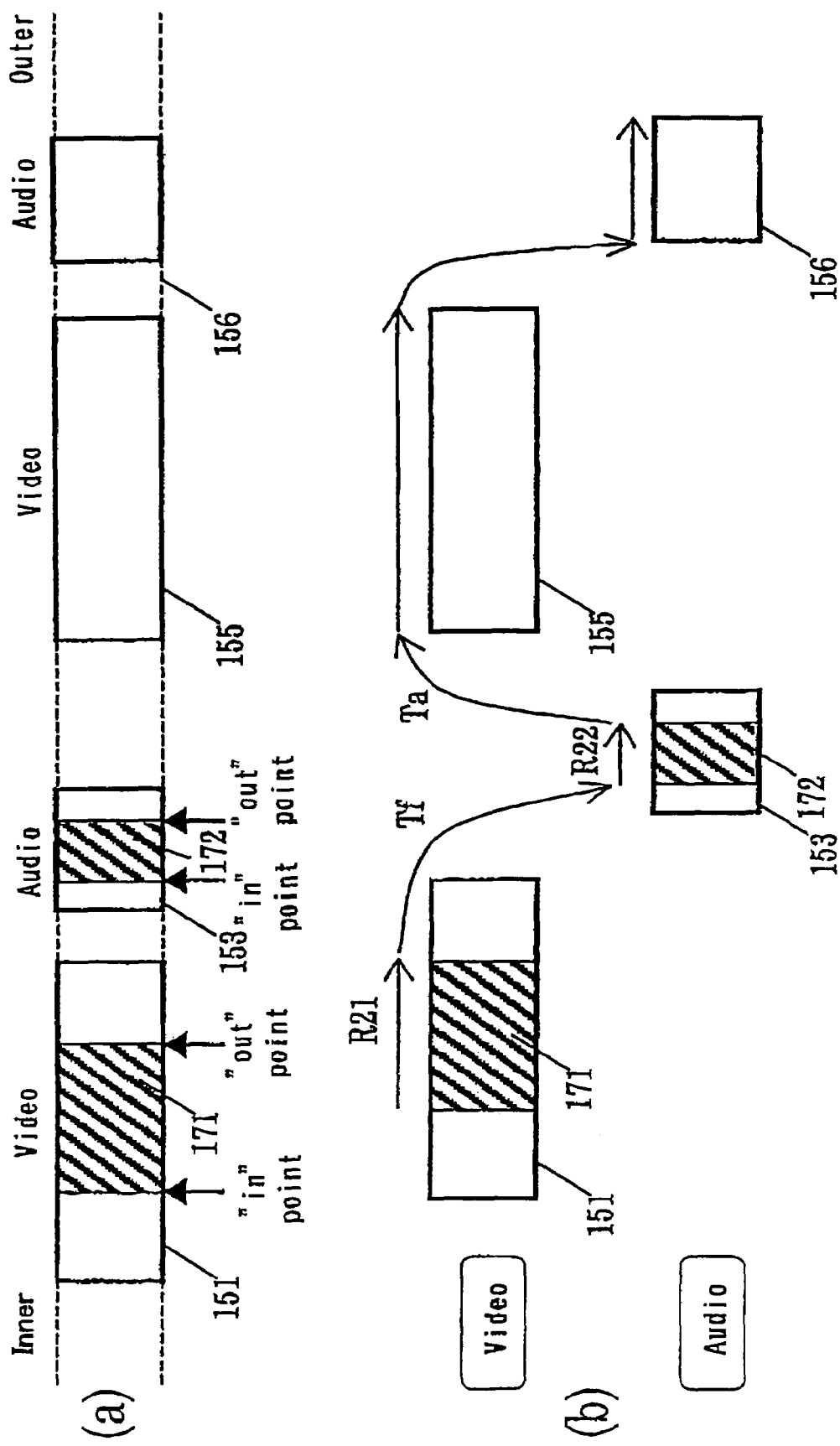
FIG. 18 shows an arrangement of one set of cut-edited video data and audio data and access operations for reproduction according to the fourth example of the present invention.
Figure 19:
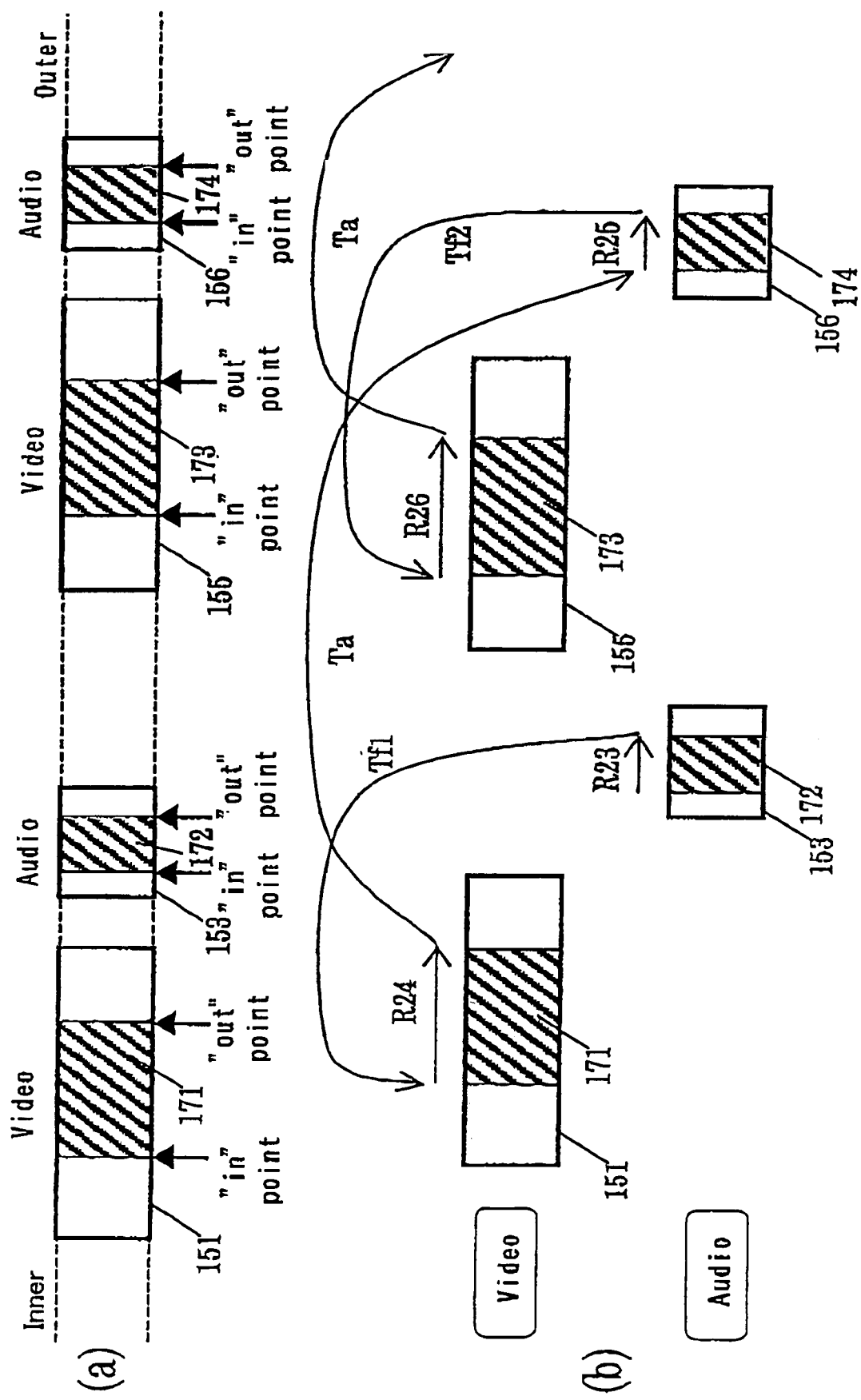
FIG. 19 shows an arrangement of two sets of cut-edited video data and audio data and access operations for reproduction according to the fourth example of the present invention.

FIG. 18 shows arrangement of data obtained by cut-editing video data and audio data which are simultaneously recorded, and access operations for reproduction. In this example, a recording area 151 of the video data and a recording area 153 for the corresponding audio data are located in an inner portion, and a recording area 155 of the video data and a recording area 156 for the corresponding audio data are located in an outer portion. In cut-editing, an "in" point and an "out" point are designated for each of video data and audio data, such that the video data in a recording area 171 and audio data in the recording area 172 are reproduced. After the data in the recording area 171 is reproduced (R21) and further after an access time Tf, the data in the recording area 172 is reproduced (R22). After an access time Ta, the data in the recording area 155 is reproduced. A condition for continuously reproducing the video data in the recording area 155 and the audio data in the recording area 156, in the case where a part of the data recorded in the inner portion (recording areas 171 and 172) is reproduced, will be discussed. As long as the amount of the real time data recorded on the disc is larger than the logical product of (i) the time from when the data is started to be read until the recording area next to the data is accessed and (ii) the transfer rate of the data, the reproduction buffer does not become empty. Based on this, the following expression is satisfied for video data.

$$YV + VdV \geqq (Ta + YV + Vt + (Tf + YA + Vt) + (a+b) \times Ts)$$

The following expression Is satisfied for audio data.

$$YA + VdA \geqq (Ta + YV + Vt + (Tf + YA + Vt) + (a+b) \times Ts)$$

The simultaneous reproduction condition is as follows.

$$YV + VdV \geqq (Ta + Tf + (a+b) \times Ts) \times Vt + (Vt - VdV - VdA)$$

$$YA + VdA \geqq (Ta + Tf + (a+b) \times Ts) \times Vt + (Vt - VdV - VdA)$$

Since the time required for reproducing audio data is the same as the time required for reproducing video data, the following expression is satisfied.

$$YA+VdA=YV+VdV$$

The required buffer sizes are as follows.

$$BV \geq (Ta+Tf+(a+b) \times Ts+YA+Vt) \times VdV$$

$$BA \geq (Ta+Tf+(a+b) \times Ts+YV+Vt) \times VdA$$

Here, YV and YA are respectively the minimum sizes of the recording areas 171 and 172. VdV is the transfer rate of video data. VdA is the transfer rate of audio data. Tf is the access time from the recording area 171 to the recording area 172. Ta is the access time from the recording area 172 to the recording area 155. "a" and "b" are respectively the numbers of ECC blocks to be skipped in the recording areas 171 and 172. Ts is the time required for reading one ECC block. Vt is the rate by which the data is read from the disc. BV is the size of the reproduction buffer required for video data. BA is the size of the reproduction buffer required for audio data.

Video data and audio data, which are correlated to each other, are rarely recorded randomly and are often recorded close to each other. For example, video data and audio data may be recorded within a fine seek distance or may be recorded in adjacent areas. When video data and audio data are recorded within a fine seek distance, Tf is about 100 msec. Where Ta is a full seek time, e.g., 1 sec., the simultaneous reproduction condition is significantly alleviated as compared to the case where Tf is regarded as Ta.

Next, a simultaneous reproduction condition in the case where an "in" point and an "out" point are set for each of two sets of recording areas will be described. FIG. 19 shows the arrangement of data obtained by cut-editing two sets of video data and audio data which are simultaneously recorded, and access operations for reproduction. The recording areas 151 and 153 are as described above. In this example, an "in" point and an "out" point are set for the recording area 155 for the video data and the recording area 156 for the corresponding audio data in an outer portion. Thus, data in the recording areas 173 and 174 are reproduced in addition to data in the recording areas 171 and 172. The operations are performed in the order of R23, Tf1, R24, Ta, R25, Tf2 and R26. The reason why the audio data is first reproduced, not the video data, is that in this way, the time required for displaying an image is shorter. Video data has a higher transfer rate than audio data. Thus, when video data is first read, an image can be displayed only after the video data in the recording area 171 is read and the recording area 172 is accessed. In the case where audio data is first read, an image can be displayed once the recording area 172 having a small data size is read and the recording area 171 is accessed by Tf1. As for recording, a required buffer size is smaller when video data is first recorded. Although not shown, it is possible to locate a recording area of audio data before a recording area of video data in the reproduction direction, such that video data is first recorded and then the corresponding audio data is recorded. In this manner, the buffer size required for recording can be prevented from increasing and the buffer size required for reproduction can be reduced.

A condition for continuous reproduction of audio/video data will be discussed. A condition for continuous reproduction of video data during the operations R23 through Tf2 is as follows.

$$YV+VdV \geq (TcA1+b \times Ts+Tf1+TcV1+a \times Ts+Ta+TcA2+b \times Ts+Tf2)$$

$$YV=TcV1 \times Vt$$

A condition for continuous reproduction of audio data during the operations R23 through Ta is as follows.

$$YV+VdA \geq (TcA1+b \times Ts+Tf1+TcV1+a \times Ts+Ta)$$

$$YA=TcA1 \times Vt$$

Accordingly, the following expressions are satisfied.

$$YV+VdV \geq (TcA1+2 \times b \times Ts+Tf1+a \times Ts+Ta+TcA2+Tf2) \times Vt+(Vt-VdV)$$

$$YA+VdA \geq (b \times Ts+Tf1+TcV1+a \times Ts+Ta) \times Vt+(Vt-VdA)$$

From these two expressions, YA and YV can be obtained. The required buffer sizes are obtained as follows.

$$BV \geq (TcA1+2 \times b \times Ts+Tf1+a \times Ts+Ta+TcA2+Tf2) \times VdV$$

$$BA \geq (TcV1+a \times Ts+b \times Ts+Tf1+Ta) \times VdA$$

Here, YV is the minimum size of combined recording areas 171 and 173 for video data. YA is the minimum size of combined recording areas 172 and 174 for audio data. VdV is the transfer rate of video data. VdA is the transfer rate of audio data. TcA1, TcV1, TcA2 and TcV2 are respectively net time periods required for reading data from the recording areas 172, 171, 174 and 173. Tf1 is the access time from the recording area 172 to the recording area 171. Ta is the access time from the recording area 171 to the recording area 174. Tf2 is the access time from the recording area 174 to the recording area 173. "a" is the number of ECC blocks to be skipped in each of the recording areas 171 and 173. "b" is the number of ECC blocks to be skipped in each of the recording areas 172 and 174. Ts is the time required for reading one ECC block. Vt is the rate by which the data is read from the disc. BV is the size of the reproduction buffer required for video data. BA is the size of the reproduction buffer required for audio data. As described above regarding skip recording, the time required for reading data from a recording area when there are "a" number of defective ECC blocks in the recording area Is the sum of the net time period required for reading effective data from the recording area and a×Ts.

Thus, the time to start reproduction of video data and audio data is made earlier when the audio data is first read.

Figure 20:
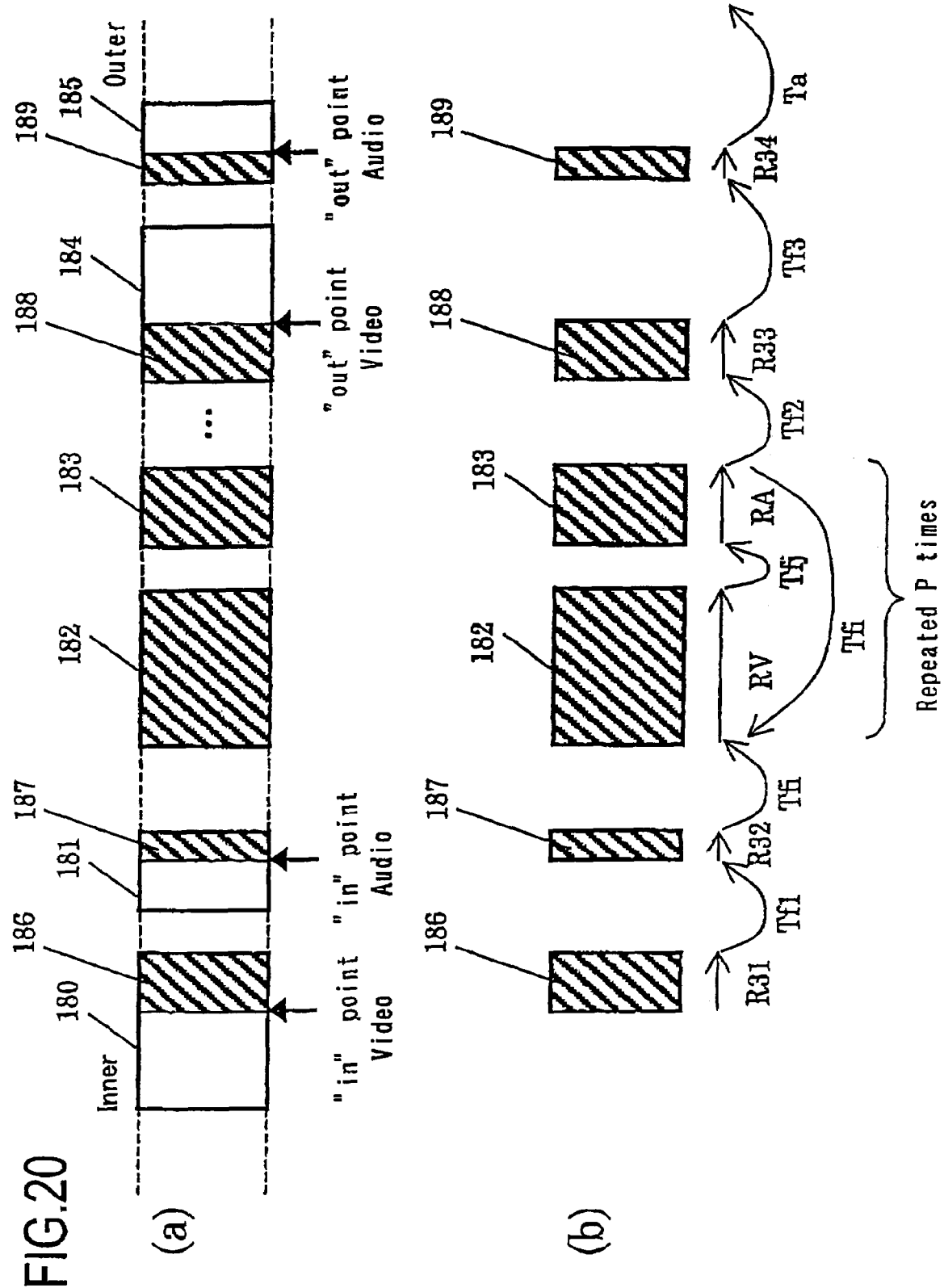
FIG. 20 shows an arrangement of video data and audio data which are cut-edited in units of a plurality of pieces of audio data and video data, and access operations for reproduction according to the fourth example of the present invention.

With reference to FIG. 20, an example in which a continuous recording area is out-edited in units including a plurality of pieces of audio data and a plurality of pieces of video data will be described. Here, each recording area of the audio data and the video data is not determined based on the full seek time, but based on a short-distance access condition, for example, a fine seek time condition. When an access operation from an innermost portion to an outermost portion is required for out-editing, a plurality of recording areas are reproduced and then a full seek access is performed. In FIG. 20, recording areas of video data and recording areas of audio data are arranged by turns from an innermost portion. Video data is recorded in recording areas 180, 182 and 184, and audio data is recorded in recording areas 181, 183 and 185. Although not shown, a plurality of recording areas may be located between the recording area 183 and the recording area 184. The "in" points for the video data and the audio data are respectively set in the recording areas 180 and 181, and the "out" points for the video data and the audio data are respectively set in the recording areas 184 and 185. With reference to part (a) of FIG. 20, a condition under which simultaneous reproduction can be continuously performed even when an access operation of Ta is performed after the data in the recording areas of 186, 187, 182, 183 . . . 188, 189 is reproduced will be discussed. Part (b) of FIG. 20 schematically shows the access operations. What will be discussed here includes a reading operation R31 from the recording area 186, an access operation of Tf1, a reading operation R31 from the recording area 187, an access operation of Tfi, a reading operation RV from the recording area 182, an access of Tfj, a reading operation RA from the recording area 183, an access operation of Tf2, a reading operation R33 from the recording area 188, an access operation of Tf3, a reading operation R34 from the recording area 189, and an access operation of Ta. It is assumed that a plurality of recording areas are located between the recording areas 183 and 184, and the recording areas 182 and 183 are read in repetition P times. Tfj is an access time from a recording area of video data to a recording area of audio data. Tfi is an access time from a recording of audio data to a recording area of video data. Tfj and Tfi are access times in accordance with the arrangement of the recording areas located between the recording areas 183 and 184, and therefore include "j" and "i". TinV, TinA, TcV, TcA, TouV and TouA are net time periods for reading data from the disc respectively corresponding to the reading operations R31, R32, RV, RA, R33 and R34. "a" and "b" are respectively the numbers of ECC blocks to be skipped in each of a recording area of video data and a recording area of audio data. The condition for video data is as follows.

$$YV+VdV \geq (TinV+Tf1+TinA+P\times(TcV+Tfj+Tfi+TcA)+Tf2+ToutV+Tf3+ToutA)+Ta+(P+2)\times(a+b)\times Ts)$$
$$YV=(TinV+P\times TcV+ToutV)\times Vt$$

The condition for audio data is as follows.

$$YA+VdA \geq (TinV+Tf1+TinA+P\times(TcV+Tfj+Tfi+TcA)+Tf2+ToutV+Tf3+ToutA)+Ta+(P+2)\times(a+b)\times Ts)$$
$$YA=(TinA+P\times TcA+ToutA)\times Vt$$

Accordingly, the condition for simultaneous reproduction of video data and audio data is as follows.

$$YV+VdV \geq (Tf1+Tf2+Tf3+P\times(Tfj+Tfi)+Ta+(P+2)\times(a+b)\times Ts)\times Vt+(Vt-VdV-VdA)$$

$$YA+VdA \geq (Tf1+Tf2+Tf3+P\times(Tfj+Tfi)+Ta+(P+2)\times(a+b)\times Ts)\times Vt+(Vt-VdV-VdA)$$

Since the time required for reproducing YA is equal to the time required for reproducing YV, YA÷VdA=YV÷VdV. Since the time required for reproducing YcV is equal to the time required for reproducing YcA, the following expressions are satisfied.

$$YcV+VdV=YcA+YA,$$

$$YcV=TcV\times Vt, \text{ and}$$

$$YcA=TcA\times Vt.$$

The required buffer sizes are as follows.

$$BV \geq ((Tf1+TinA)+Tf2+(Tf3+ToutA)+P\times(Tfj+Tfi+TcA)+Ta+(P+2)\times(a+b)\times Ts)\times VdV$$

$$BA \geq (TinV+Tf1+Tf2+(ToutV+Tf3)+P\times(TcV+Tfj+Tfi)+Ta+(P+2)\times(a+b)\times Ts)\times VdA$$

Here, P is the number of the sets of continuous areas, from each of which whole data is read completely, and the sets of continuous areas are located within a cut (P≧0). TinV is the time required for reading a recording area of video data from the "in" point. ToutV is the time required for reading a recording area of video data until the "out" point. TinA is the time required for reading a recording area of audio data from the "in" point. ToutA is the time required for reading a recording area of audio data until the "out" point. YV Is the total size of the video data to be reproduced. YA is the total size of the audio data to be reproduced. VdV is the transfer rate of video data. VdA is the transfer rate of audio data. Tf1 is the access time from the recording area 186 to the recording area 187. Tf2 is the access time from the recording area 183 to the recording area 188. Tf3 is the access time from the recording area 188 to the recording area 189. Ta is the access time from the recording area 189 to the next recording area. "a" is the number of ECC blocks to be skipped in each of the recording areas 186, 182 and 188. "b" is the number of ECC blocks to be skipped in each of the recording areas 187, 183 and 189. Ts is the time required for reading one ECC block. Vt is the rate by which the data is read from the disc. YcV is the data size of the recording area 182 of video data. YcA is the data size of the recording area 183 of audio data. BV is the size of the reproduction buffer required for video data. BA is the size of the reproduction buffer required for audio data.

P can be found from the above-described simultaneous reproduction condition. Thus, once the minimum size of each of a recording area of video data and a recording area of audio data in consideration of the short-distance access time is found, the number of recording areas of the video data and the number of recording areas of the audio data which are required for cut-editing can be obtained. By recording, while interleaving, the audio data and the video data in areas which are smaller than YV and YA determined based on the expressions for obtaining the simultaneous reproduction condition in which interleaving is not considered, the access time between the cut-editing "in" point in a reproduction area of the audio data and the cut-editing "in" point in a reproduction area of the video data can be shortened. The access time between the cut-editing "out" point in the reproduction area of the audio data and the cut-editing "out" point in the reproduction area of the video data can also be shortened.

In the example shown in FIG. 20, the audio data and the video data are recorded in areas distanced from each other. In the case where the audio data and the video data are recorded in continuous areas, the access between the audio data and the video data is not necessary. This alleviates the simultaneous reproduction condition.

EXAMPLE 5

In the fourth example, cut-editing is performed by designating the "in" point and the "out" point. In a fifth example of the present invention, a search method for finding the "in" point and the "out" point will be described. Professional-use VTRs have a function of outputting audio corresponding to an image displayed even during a high-speed search. Such a function is provided so that the user can identify a transition point between scenes and can distinguish a narration from music, by listening to audio output during a fast-forward operation. This is useful for finding the "in" point and the "out" point. In this example, audio data and video data are recorded in different areas, is and a search of a disc is performed at the speed m times as fast as the normal speed while outputting audio data in a fast-forward operation. In a search with audio, two pieces of real time data are simultaneously reproduced; i.e., audio data is reproduced at the speed m times as fast as the normal speed, and video data is intermittently reproduced. In the case of the video data, the same data can be continuously output when the reproduction buffer becomes empty during the intermittent reproduction. Namely, video data is read from selected recording areas, whereas audio data is read from all the recording areas. Data accumulated in the reproduction buffer for audio data is transferred to the decoder at m times the transfer rate of the audio data.

Figure 21:
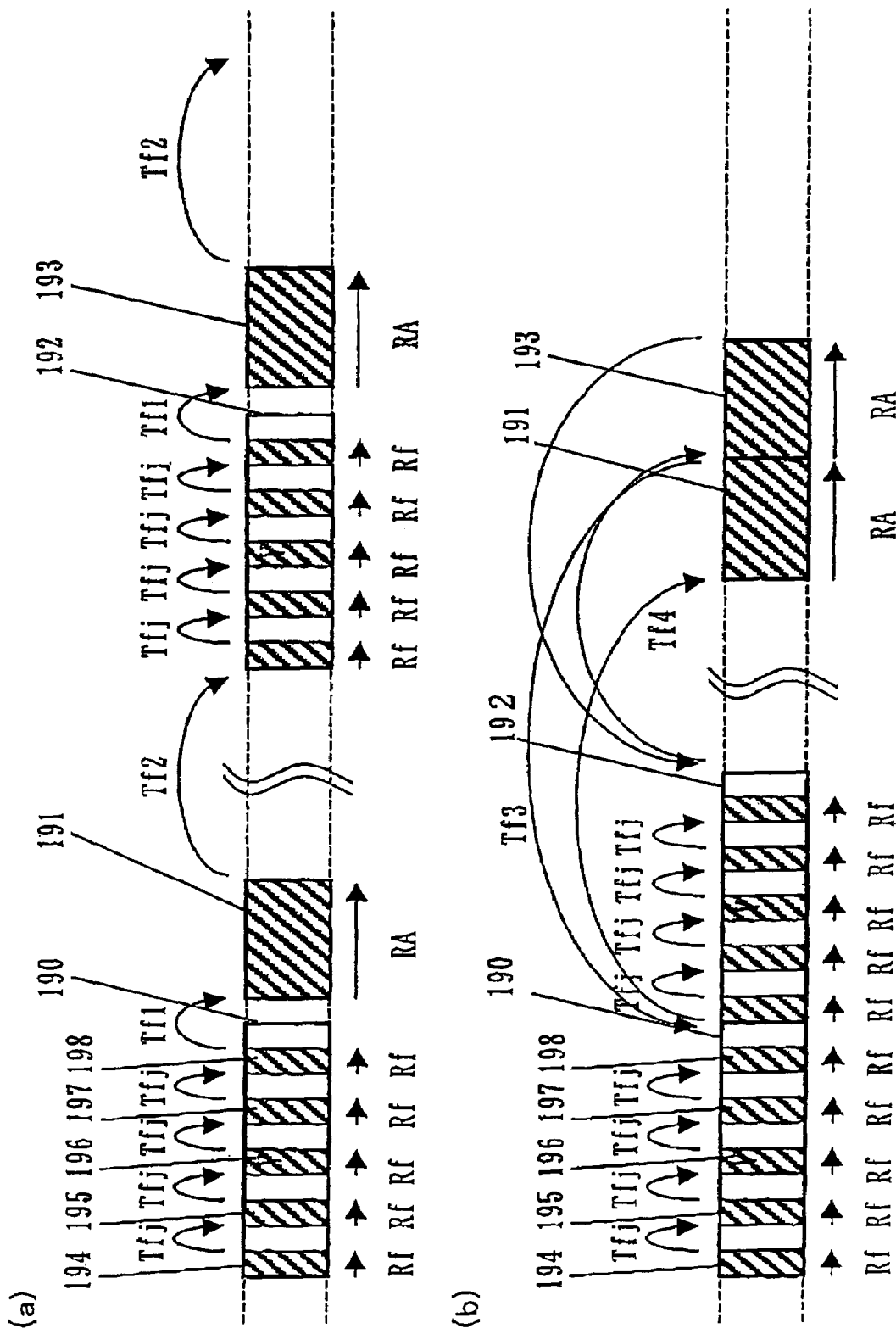
FIG. 21 shows access operations for performing a search while reproducing audio data at a high speed according to a fifth example of the present invention.

FIG. 21 shows access operations which are performed when a search is conducted while high-speed-reproducing audio data. Video data is recorded in recording areas 190 and 192, and audio data is recorded in recording areas 191 and 193. Audio data and video data at an identical time, which are correlated to each other, are located close to each other. When cut-editing or the like is performed, the distance between the audio data and the video data may be changed. Access times Tf1 and Tf2 are defined in consideration of such a change. In the recording area 190, small accesses (Tfj) as shown are performed to read prescribed video data (Rf). For reading data from five portions, data is read from the recording areas 194, 195, 196, 197 and 198. After the access time to a recording area of audio data (Tf1), the audio data in the recording area 191 is read (RA). Then, the video data in the next recording area 192 is accessed (Tf2).

Figure 36:
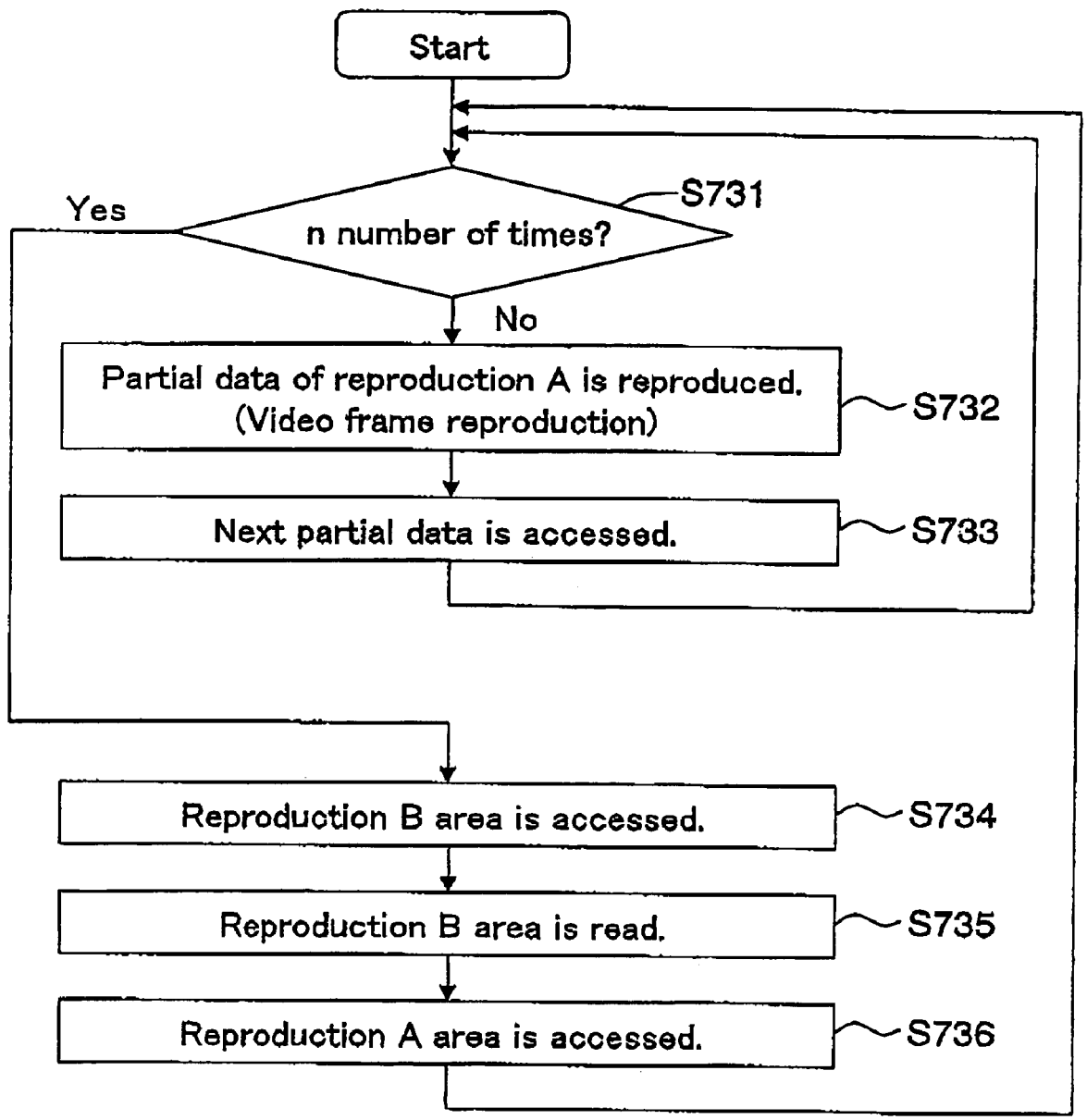
FIG. 36 is a flowchart illustrating a search with audio according to the fifth example of the present invention.

FIG. 36 is a flowchart illustrating a method for search with audio. Reproduction A is a reproduction operation of video data, and reproduction B is a reproduction operation of audio data. First, video data is partially read from an area having the video data recorded therein (step S732). At this point, compressed video data forming one frame is read. Then, the next recording area having the video data recorded therein is accessed In accordance with the value of "m" of the search performed at the speed m times as fast as the normal speed. For example, with reference to FIG. 21, an access operation from the area 194 to the area 195 (step S733) is performed. Steps S732 and S733 are repeated n times (step S731). Video data forming n number of video frames is read, and then the next recording area having audio data recorded therein is accessed (step S734). A prescribed size of audio data is read from the accessed recording area (step S735). Then, the next recording area having video data recorded therein is accessed (step S736). Steps S731, S732, S733, S734, S735 and 6736 are repeated to continue a search with audio.

As described above, video data is intermittently read from a prescribed area. From the area having the corresponding audio data recorded therein, all the audio data is read. For the video data, the frames are displayed sequentially while some frames are displayed a plurality of times. For the audio data, the data is supplied to the decoder in accordance with the value of "m" of the search performed at the speed m times as fast as the normal speed. Thus, a search with audio is realized.

Figure 37:
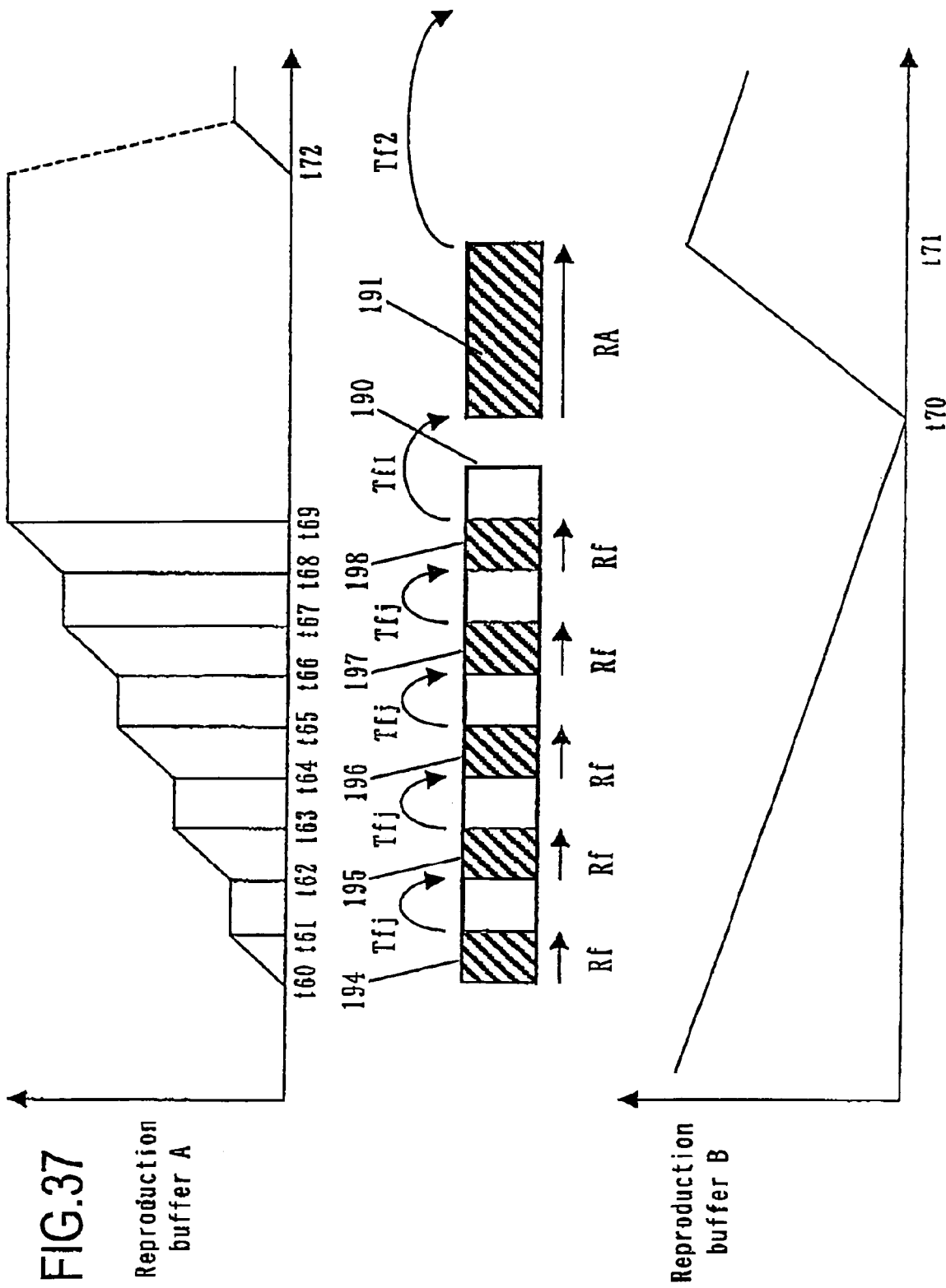
FIG. 37 shows a condition for simultaneous reproduction in the search with audio according to the fifth example of the present invention.
Figure 38:
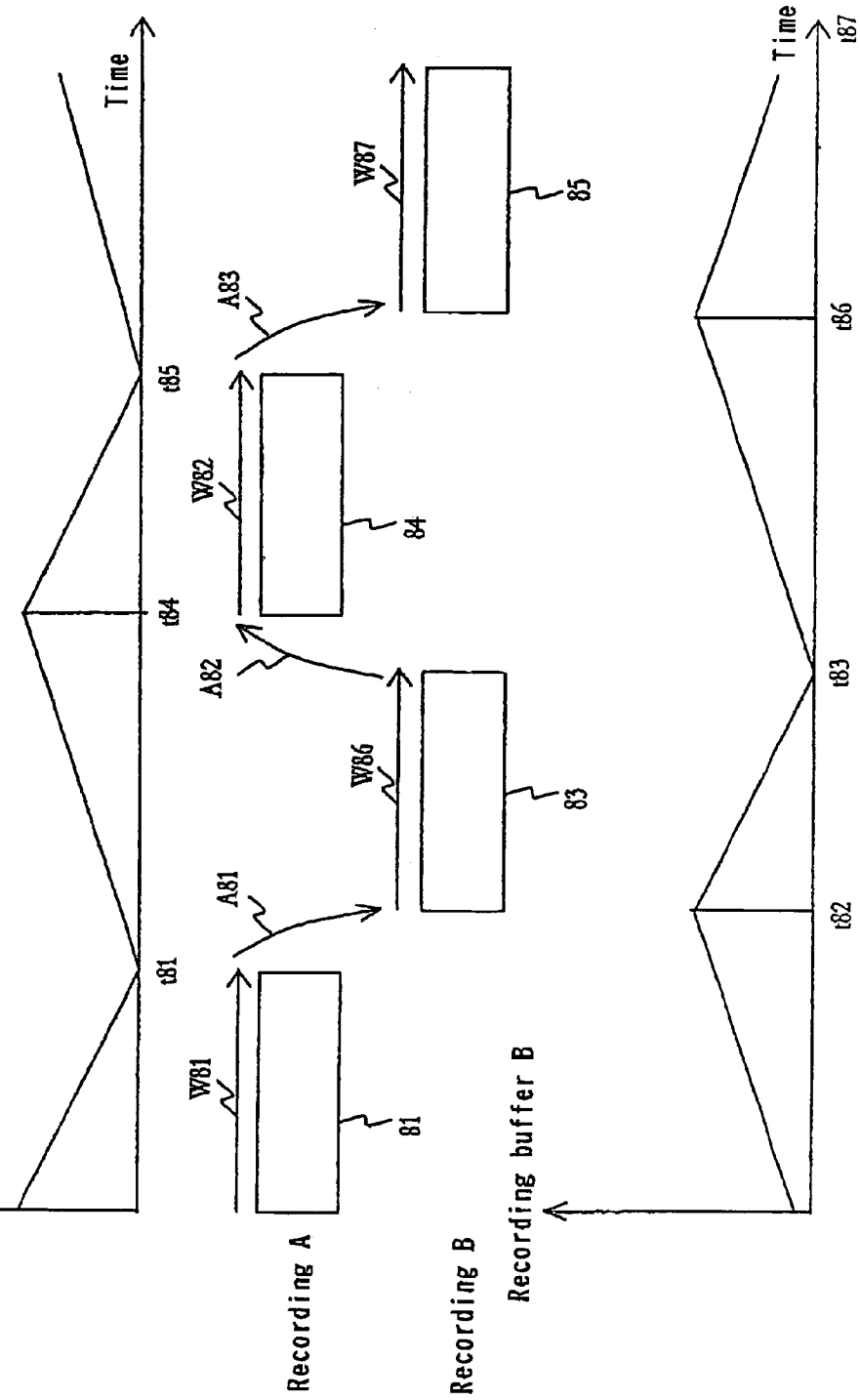
FIG. 38 shows a conventional simultaneous recording condition.
Figure 39:
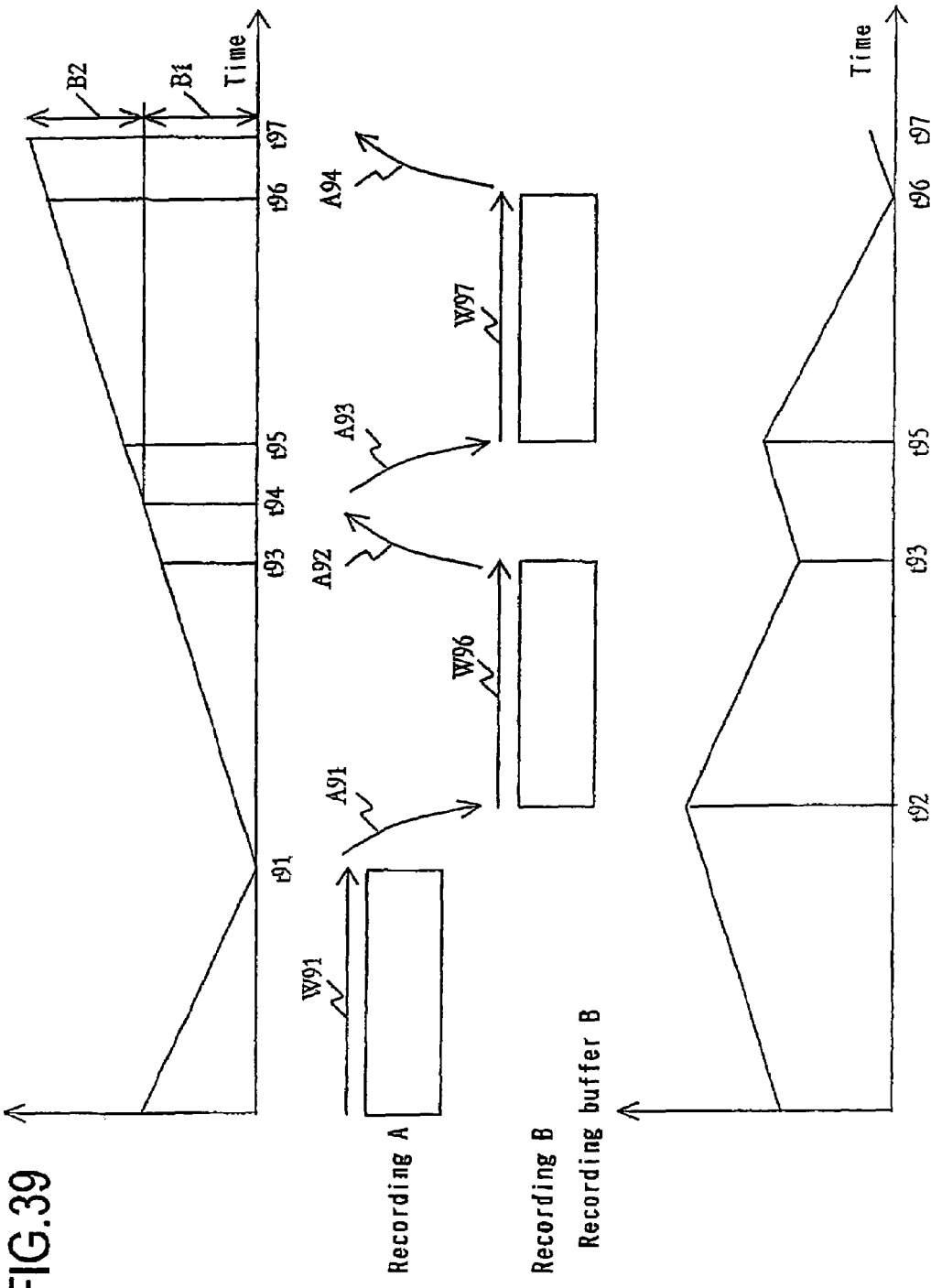
FIG. 39 shows a conventional simultaneous recording operation.

FIG. 37 shows a condition for simultaneous reproduction in a search with audio. Data is accumulated in the reproduction buffer A each time video data is reproduced. Namely, during time periods t60-t61, t62-63, t64-t65, t66-67, and t68-t69, data is read from the areas 194, 195, 196, 197 and 198 and accumulated in the reproduction buffer A. Although it is not shown at what timing the video data is transferred from the reproduction buffer A to the decoder A, video data, which is read in accordance with the value of "m" of the search performed at the speed m times as fast as the normal speed, is transferred to the decoder. Time t72 represents the time immediately after the access operation of Tf2. The time period from time t60 to t72 is one period. Therefore, the video data accumulated in the reproduction buffer A is deleted from the reproduction buffer A when the next video data is read after the access operation of Tf2. The operations Rf and Tfj are repeated, and the audio data Is transferred to the decoder B at the same speed as the speed of search from the reproduction buffer B during Tf1 and Tf2. Therefore, the data in the reproduction buffer B is consumed. While the data is read from the recording area of audio data by the reading operation RA, the audio data in transferred to the decoder B at the same speed as the speed of search, and the audio data is also transferred to the reproduction buffer B. Thus, the data amount in the reproduction buffer B increases. With reference to FIG. 37, a condition for simultaneous reproduction will be discussed hereinafter.

Where the time period, in which video data is intermittently read and audio data is read, is one period (Tp), Tp=TcV+TcA+Tf2. TcV is the time required for reproducing one period of video data. TcV=n×T1V+(n−1)×Tfj+Tf1. In the above expression, n is the number of frames which is displayed in one period. Y1V is the recording size of one frame of video data. T1V is the time required for reading one frame of video data from the disc. Vt is the rate by which the data is read from the disc. TcA is the time required for reproducing one period of audio data. TcA=YA+Vt. YA is the continuous area in which the audio data is recorded.

It is assumed that the video data is compressed in units of frame, like DV (digital video) data used in digital video cameras.

The condition for seamless simultaneous reproduction of audio data at the speed m times as fast as the normal speed is as follows, where V&A is the normal reproduction rate of audio data.

$$YA+(VdA\times m) \geq n \times T1V+(n-1)\times Tfj+Tf1+TcA+Tf2$$

Where YA=TcA×Vt, $$YA+(VdA\times m) \geq \{n \times T1V+(n-1)\times Tfj+Tf1+Tf2\}\times Vt+(Vt-m\times VdA).$$

Where x is the number of frames displayed per second at the speed m times as fast as the normal speed, $$x=n \div (YA+(VdA\times m))$$

$$YA+(VdA\times m) \geq n \div x$$

Accordingly, $$m \leq YA\times Vt+\{VdA\times (Vt\times (n\times T1V+(n-1)\times Tfj+Tf1+Tf2)+YA\}$$

where (Vt−m×VdA)>0.

Thus, the value of m is found by giving n. The number of frames per second, x, can be found.

By determining the minimum size for the recording area of audio data with the above-described condition, a search with audio can be realized.

Regarding the audio data, data of two channels, i.e., L channel and R channel may be recorded in one recording area. Alternatively, data of four channels, i.e., L1 channel, R1 channel, L2 channel, and R2 channel may be recorded in one continuous recording area. In this case, the transfer rate of the audio data is in proportion to the number of channels.

In the case of data obtained by encoding audio data and video data in a mixed manner, such as the MPEG data or DV data, a search with audio can only be performed at the speed twice as high as the normal speed at the maximum, in general. According to the present invention, the audio data which is identical to the main audio data to be recorded is additionally recorded In a different recording area having the size equal to or greater than the size determined based on the above-mentioned condition. Thus, a search with audio can be performed at a speed which is greater than or equal to the speed twice as high as the normal speed. In this case, the audio data, which is identical to the main audio data to be recorded, is recorded in another recording area. Thus, the reliability of the audio data is improved.

As shown in FIG. 21 (parts (a) and (b)) the audio data and the video data may be recorded in an interleaved manner, or continuously for each piece of data. When the audio data and the video data are recorded in an interleaved manner as in part (a) of FIG. 21, the access time between a recording area of audio data and a recording area of video data is shorter. This advantageously alleviates the simultaneous reproduction condition. When the value of "m" of a search which is performed at the speed m times as fast as the normal speed is increased, the size of audio data which needs to be continuously reproduced is increased. This increases the size of the recording areas of audio data and the video data to be interleaved. When the audio data and the video data are recorded in areas distanced from each other as in part (b) of FIG. 21, the audio data can be recorded in a large continuous area. This allows a larger size of audio data to be read with no access. This is useful for the case where the value of "m" of a search which is performed at the speed m times as fast as the normal speed is greater.

The audio data to be recorded in the different area may be compressed audio data. In this case, the transfer rate of the data is reduced, and thus the speed of search with audio can be further increased.

The video data can be read in units of j frames, where j is larger than 1. In this case, Y1V is the size of data corresponding to j frames, and n is the number of frames displayed in one period multiplied by j. In the case of MPEG data, the video data can be read in units of GOP.

In the case where one piece of video data and k pieces of audio data are recorded in different areas, a simultaneous reproduction model including the following elements is used: a pickup P for accessing an area on an information recording medium, a reproduction buffer RBv for accumulating video data Dv read from the Information recording medium, a decoding module DMv for decoding the video data Dv accumulated in the reproduction buffer RBv, a reproduction buffer RBi for accumulating audio data Di read from the information recording medium, and a decoding module DMi for decoding the audio data Di accumulated in the reproduction buffer RBi. The apparatus performs, for example, the following steps: a step of executing a reproduction operation Rv for partially reading the video data Dv from an area Av having the video data Dv recorded therein (S732 and S733); a step of, after the video data Dv is intermittently reproduced from n number of areas of the area Av, accessing a recording area Ai to switch the reproduction operation Rv to a reproduction operation Ri (S734); a step of accessing an area Ai having audio data Di recorded therein (i–1) times to read the audio data Di from the area Ai i times (not shown): and a step of reading the amount of data determined based on the simultaneous reproduction condition from the corresponding area Ai and then accessing a recording area Av to switch the reproduction operation Ri to a reproduction operation Rv (S736). The apparatus is structured to fulfill the simultaneous reproduction condition that: the audio data Di, consumed from the reproduction buffer RBi during (n–1) number of access operations to the area Av, n number of reproduction operations from the area Av, an access operation from the area Av to the area Ai, (k–1) number of access operations between the areas Ai, (k–1) number of reproduction operations of the data from the areas Ai, and an access operation from the area Ai to the area Av, is reproduced by one reproduction operation and can be transferred from the reproduction buffer RBi to the decoding module DMi at the speed of search, which is m times as fast as the normal speed. Here, i, k and n are each an arbitrary integer.

In this case also, the condition for preventing the audio data from being interrupted is as follows.

$$YA+(VdA \times m) \geq n \times T1 V+(n-1) \times Tfj+Tf1+Tf2+(k-1) \times Tfi+k \times TcA$$

Here, Tfi is the access time between areas Ai having the audio data Di recorded therein. From YA=TcA+Vt, the condition for simultaneous reproduction is as follows.

$$YA+(VdA \times m) \geq \{n \times T1 V+(n-1) \times Tfj+Tf1+Tf2+(k-1) \times Tfi\} \times Vt+(Vt-k \times m \times VdA)$$

EXAMPLE 6

In a sixth example of the present invention, a condition for simultaneous reproduction after AV split editing will be discussed by way of three specific examples shown in FIGS. 22, 23 and 24. "AV split editing" refers to editing audio data and video data independently from each other. For example, instead of simultaneously switching the video data and the audio data at a transition point between video sequences, the audio data can be switched several seconds before the transition point. Thus, the viewer can expect that the video sequences will be switched, which provides the effect of making the transition point less conspicuous.

Figure 22:
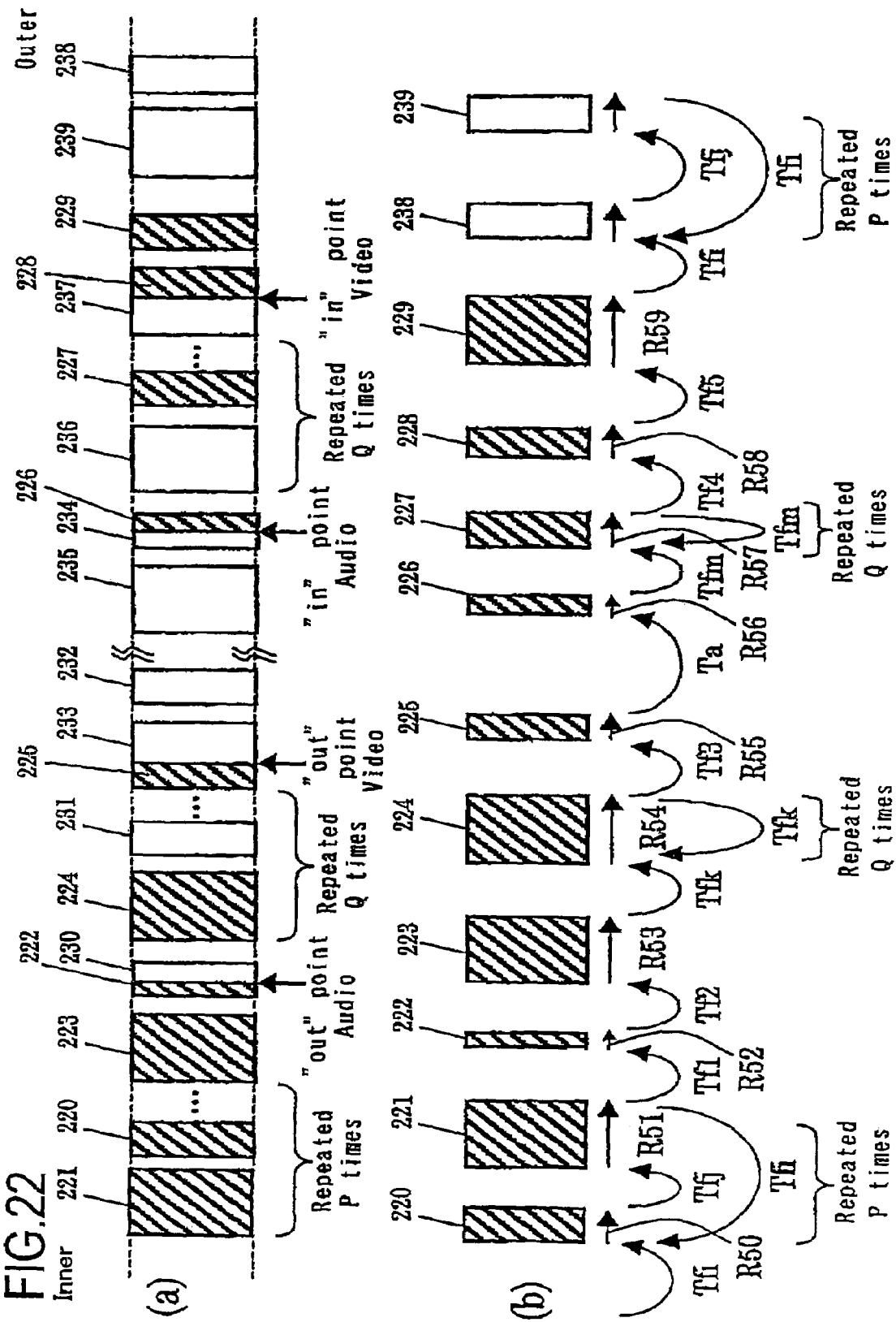
FIG. 22 shows an arrangement of AV-split-edited video data and audio data and access operations for reproduction in the case where the audio data and the video data are recorded in different areas according to a sixth example of the present invention.

FIG. 22 shows a data arrangement on the disc and access operations in the case where audio data and video data, which are separately encoded and recorded in different areas, are AV-split-edited. Part (a) of FIG. 22 shows the data arrangement. It is assumed that the video data and the audio data are alternately recorded. Video data is recorded in recording areas 221, 223, 224, 233, 235, 236, 237 and 239, and audio data is recorded in recording areas 220, 230, 231, 232, 234, 227, 229 and 238. It is assumed here that the recording areas 232 and 235 are far from each other by editing. Although not shown, there are (P–1) number of recording areas of video data and audio data between the recording areas 220 and 223. These areas are provided in order to find how many recording areas of data need to be reproduced in advance, since it is necessary to accumulate a prescribed amount of data in the reproduction buffer from the "out" point until the next recording area is accessed. The "out" point of video data is set in the recording area 233, and the "out" point of audio data at the identical time should be normally in the recording area 232. However, in part (a) of FIG. 22, the "out" point of audio data is set in the recording area 230. The reason is that in AV split editing, the "out" point of video data and the "out" point of audio data are independently set, and in general the "out" point of audio data is set before the "out" point of video data. Although not shown, there are (Q–1) number of recording areas of video data and audio data between the recording areas 231 and 233 in order to enlarge the distance between the "out" point of video data and the "out" point of audio data. The "in" point of video data is set in the recording area 237, and the "in" point of audio data at the identical time should be normally in the recording area 229 but is set in the recording area 234 in part (a) of FIG. 22. The reason is that the "in" point of audio data is set such that the difference in the time of reproduction between the "out" point of video data and the "out" point of audio data is equal to the difference in time of reproduction between the "in" point of video data and the "in" point of audio data. Similarly, there are (Q–1) number of recording areas of video data and audio data between the recording areas 227 and 237 although not shown.

Part (b) of FIG. 22 shows access operations for reproducing each recording area. An access operation of Tfi to the recording area 220 (of audio data), a reproduction operation R50 from the recording area 220, an access operation of Tfj to the recording area 221 (of video data), and a reproduction operation R51 from the recording area 221 are performed. Next, an access operation of Tf1, a reproduction operation R52 from the recording area 222, an access operation of Tf2, a reproduction operation R53 from the recording area 223, and an access operation of Tfk are performed. Accessing these areas P times in repetition is to repeat, P times, a series of operations (one period) of: an access operation of Tfj to a recording area of video data, a reproduction operation from the recording area of video data, an access operation of Tfi to a recording area of audio data, and a reproduction operation from the recording area of audio data. Next, a recording operation R54 from the recording area 224 of video data is performed. The reproduction operations from the recording areas of video data are repeated Q times including the next recording area of video data. The value of "Q" is determined based on the difference in time of reproduction between the "out" point of audio data and the "out" point of video data. Tfk is the access time between the recording areas of video data. An access operation of Tf3 is performed to the next recording area 225, and then a reproduction operation R55 from the recording area 225 is performed. An access operation of Ta is performed in order to read data from the "in" point of the audio data. Next, a reproduction operation R56 from the recording area 226, an access operation of Tfm, and a reproduction operation R57 from the recording area 227 of audio data are performed. The reproduction operations from the recording areas of audio data are repeated Q times including the next recording area of audio data. The value of "Q" is determined based on the difference in time of reproduction between the "in" point of audio data and the "in" point of video data. Tfm is the access time between the recording areas of audio data. An access operation of Tf4 is performed to the next recording area 228, and then a reproduction operation R58 from the recording area 228 is performed. Then, an access operation of Tf5 and a reproduction operation R59 from the recording area 229 are performed.

The net time periods required for the reproduction operations R60 through R59 are, respectively, TcV, TcA, TcV, ToutA, TcV, ToutV, TinA, TcA, TinV, and TcA. "a" is the number of ECC blocks to be skipped in the recording area of video data, and "b" is the number of ECC blocks to be skipped in the recording area of audio data.

The condition for simultaneous reproduction for video data is as follows.

$$YV + VdV \geq P \times (TcA + (a+b) \times Ts + TcV + Tfj + Tfi) + Tf1 + ToutA +$$
$$(a+b) \times Ts + Tf2 + TcV + Q \times (TcV + a \times Ts + Tfk) + Tf3 +$$
$$ToutV + a \times Ts + Ta + TinA + b \times Ts + Q \times (TcA + b \times Ts + Tfm) +$$
$$Tf4 + TcA + b \times Ts + Tf5 + TinV + a \times TsYV =$$
$$(P + 1 + Q) \times YcV + ToutV \times Vt + TinV \times Vt$$

The condition for simultaneous reproduction for audio data is as follows.

$$YA / VdA \geq P \times (TcA + (a+b) \times Ts + TcV + Tfj + Tfi) + Tf1 + ToutA +$$
$$(a+b) \times Ts + Tf2 + TcV + Q \times (TcV + a \times Ts + Tfk) + Tf3 +$$
$$ToutV + a \times Ts + Ta + TinA + b \times Ts + Q \times (TcA + b \times Ts + Tfm) +$$
$$Tf4 + TcA + b \times Ts + Tf5 + TinV + a \times TsYA =$$
$$(P + 1 + Q) \times YcA + (ToutA + TinA) \times Vt$$

Based on the above, $$YV + VdV \geq$$
$$(ToutA + TinA - (ToutV + TinV) \times VdA + VdV + (P + Q + 3) \times (a + b) \times$$
$$Ts + P \times (Tfi + Tfj) + Q \times (Tfk + Tfm) + Tf1 + Tf2 + Tf3 +$$
$$Tf4 + Tf5 + Ta) \times Vt + (Vt - VdV - VdA)YV + VdV \geq$$
$$(ToutV + TinV - (ToutA + TinA) \times VdV / VdA +$$
$$(P + Q + 3) \times (a + b) \times Ts + P \times (Tfi + Tfj) + Q \times (Tfk + Tfm) +$$
$$Tf1 + Tf2 + Tf3 + Tf4 + Tf5 + Ta) \times Vt + (Vt - Vdv - VdA)$$

The condition for simultaneous reproduction of audio data up to the "in" point of audio data is as follows.

$$YA' / VdA \geq P \times (TcV + (a+b) \times Ts + TcA + Tfj + Tfi) +$$
$$Tf1 + TcV + (a+b) \times Ts + Tf2 + ToutA +$$
$$Q \times (TcV + a \times Ts + Tfk) + Tf3 + ToutV + a \times Ts + Ta$$

Here, $$YA' = P \times YcA + ToutA \times VtYA' + VdA =$$
$$(P + Q + 2) \times a \times Ts + (P + 1) \times b \times Ts + P \times (Tfj + Tfi) + Q \times Tfk +$$
$$Tf1 + Tf2 + Tf3 + Ta + TspV) + Vt + (Vt - VdV - VdA)$$

where $TspV = (Q + 1) \times TcV + ToutV - ToutA \times VdV + VdA$

In addition, $YA+VdA=YV+VdV, TcV \times Vt=YcV, TcA \times Vt=YcA, YcV+VdV=YcA+VdA.$ Based on the above three expressions, the necessary sizes of recording areas of video data and audio data can be obtained. YA'/YdA represents the time required for reproducing audio data from the disc until the access operation of Ta to performed, and is used as an index indicating how much audio data needs to be recorded before the "out" point In AV split editing.

When a reproduction operation of video data is switched to a reproduction operation of audio data in the middle, i.e., before the "out" point, a full seek occurs while an access is made from a recording area of video data to a recording area of audio data. Therefore, the size of data which needs to be recorded before the split point is increased. As described above, in split editing in which audio data is switched before the video data, the number of times that the full seek is performed can be reduced by reading the video data up to the "out" point and, after accessing the start of the recording area of the corresponding audio data, reading the audio data. In split editing in which video data is switched before the audio data, the number of times that the full seek is performed can be reduced by reading the audio data up to the "out" point and, after accessing the start of the recording area of the corresponding video data, reading the video data.

Figure 23:
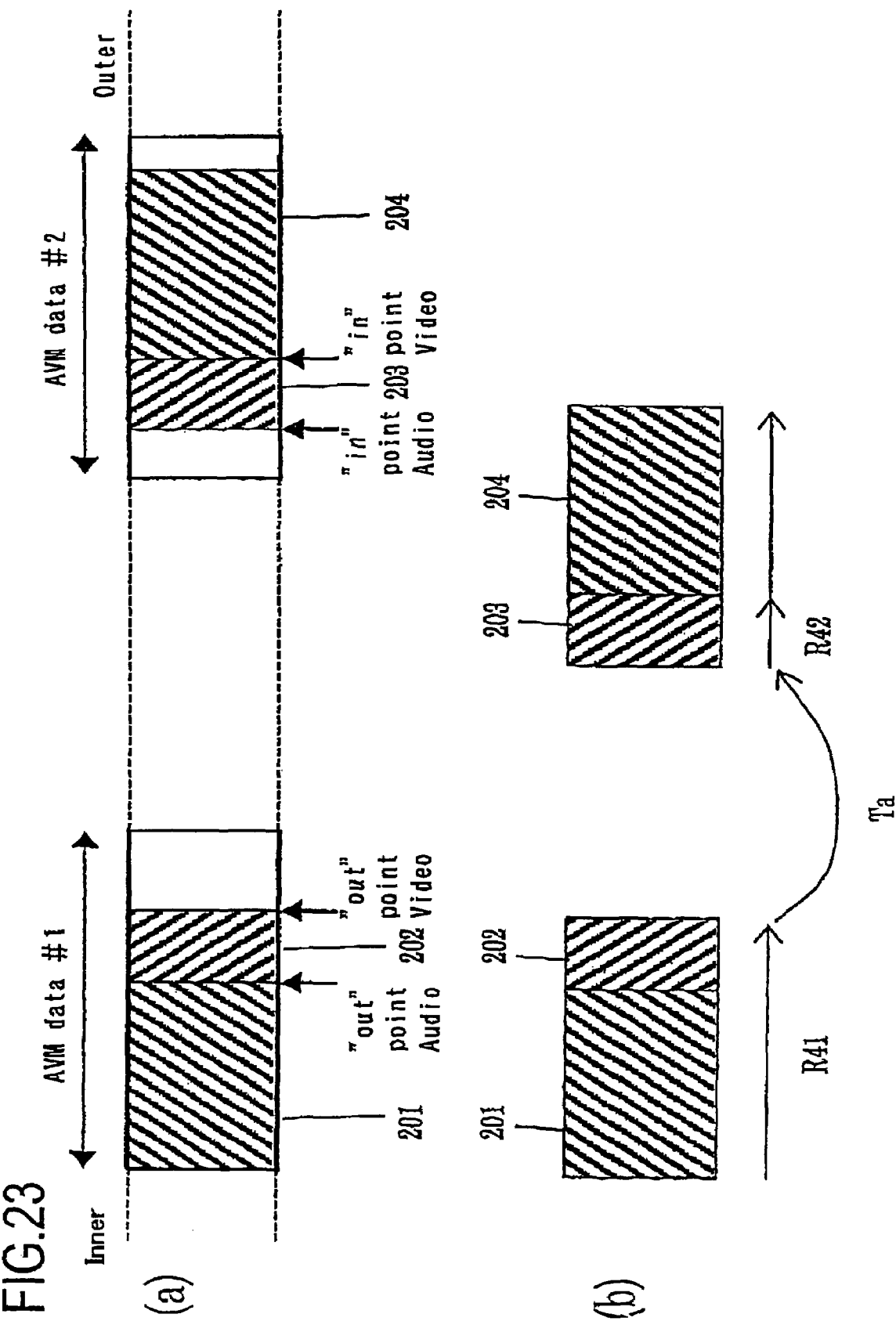
FIG. 23 shows an arrangement of AV-split-edited video data and audio data of AVM data and access operations for reproduction according to the sixth example of the present invention.

FIG. 23 shows a data arrangement on the disc and access operations in the case where audio data and video data, which are encoded and recorded in a mixed manner, are AV-split-edited. In this example, data obtained by encoding audio data and video data in a mixed manner, such as MPEG data or DV data, will be referred to as "AVM (Audio Video Mix Data)". Part (a) of FIG. 23 shows two pieces of AVM data arranged on the disc. As shown here, an "out" point and an "in" point are set for each of the audio data and the video data. As described above, the difference in time of reproduction between the "out" point of audio data and the "out" point of video data is equal to the difference in time of reproduction between the "in" point of audio data and the "in" point of video data. From a recording area of AVM data #1, a recording area 201 is read, and audio data and video data are decoded. A recording area 202 is read, and only video data is decoded. From a recording area of AVM data #2, a recording area 203 is read, and only audio data is decoded. A recording area 204 is read, and audio data and video data are decoded. Although all the data is read from the recording areas 202 and 203, only the video data or only the audio data is decoded. The reason is that it is less time-consuming to read all the data than selectively reading either the audio data or the video data, since the AVM data includes the audio data and the video data in a mixed state. Thus, the recording areas 202 and 203 have data at an identical time of reproduction, and thus the data in the recording area 202 and the data in the recording area 203 need to be reproduced simultaneously.

Part (b) of FIG. 23 shows the access operations. The recording areas 201 and 202 are read continuously (R41). After the access operation of Ta, the recording area 203 is read (R42), and then the recording area 204 is read.

The condition for simultaneous reproduction for video data regarding the operations from R41 to R42 is as follows.

$$YV+VdV \geq (TcY+(a+b) \times Ts+2Tsp+Ta)$$

$$YV=(TcY+Tsp) \times Vt \times (VdV+Vd)$$

Accordingly, $$YV+VdV \geq ((a+b) \times Ts+Tsp+Ta) \times Vt+(Vt-Vd)$$

The condition for simultaneous reproduction for audio data regarding the operations from R41 to Ta is as follows.

$$YA+VdA \geq (TcY+a \times Ts+Tsp+Ta)$$

$$YA=TcY \times Vt \times (VdA+Vd)$$

Accordingly, $$YA+VdA \geq (a \times Ts+Tsp+Ta) \times Vt+(Vt-Vd)$$

or $$YV+VdV \geq (a \times Ts+Tsp \times Vt+Vd+Ta) \times Vt+(Vt-Vd)$$

The necessary buffer size (B) is:

$$B \geq (Ta+(a+b) \times Ts+Tsp) \times Vd$$

The buffer size (B-extraA) for processing the audio data is:

$$B\text{-}extraA \geq Tsp \times (Vt \times (VdA+Vd)-VdA)$$

Tsp is the net time required for reading the recording area 202 or 203, In which either the video data or the audio data is reproduced. TcY is the net time required for reading the recording area 201, in which both the audio data and the video data are reproduced. "a" is the number of defective ECC blocks to be skipped in the recording area 201 and 202. "b" is the number of defective ECC blocks to be skipped in the recording area 203. Ts Is the time required for reading one ECC block. Vt is the data transfer rate from the disc. Vd is the AVM data transfer rate from the buffer to the decoder.

Split editing has been generally difficult for AVM data. According to the present invention, the time period in which split editing is possible and the size of the area in which the AVM data is to be recorded before the split point are obtained.

In the case where the time of split editing is short, AV-split-editing is possible with this method. In the case where the time of split editing is longer, the recording area 203 is larger, and thus the efficiency at which the audio data is extracted from the recording area 203 is lowered. This increases the size of the recording area 201 to an unpractical level.

A method for AV split editing in the case where the time of split editing is longer will be described. Instead of extracting the audio data from the recording area 203, the same audio data is recorded in another area in advance, and the same audio data is used for AV-split-editing. Part (a) of FIG. 24 shows a data arrangement on the disc, on which (i) AVM data including audio data and video data encoded and recorded in a mixed manner and (ii) the audio data same as the audio data in the AVM data are recorded in a different area. The same audio data is to be AV-split-edited. As shown here, an "out" point and an "in" point are set for each of audio data and video data. An "in" point of audio data is set in a recording area 213 which is different from the recording area having the AVM data recorded therein. From a recording area of AVM data #1, a recording area 211 is read, and audio data and video data are decoded. A recording area 212 is read, and only video data is decoded. Audio data is read from the recording area 213. From a recording area of AVM data #2, a recording area 214 is read, and audio data and video data are decoded.

Figure 24:
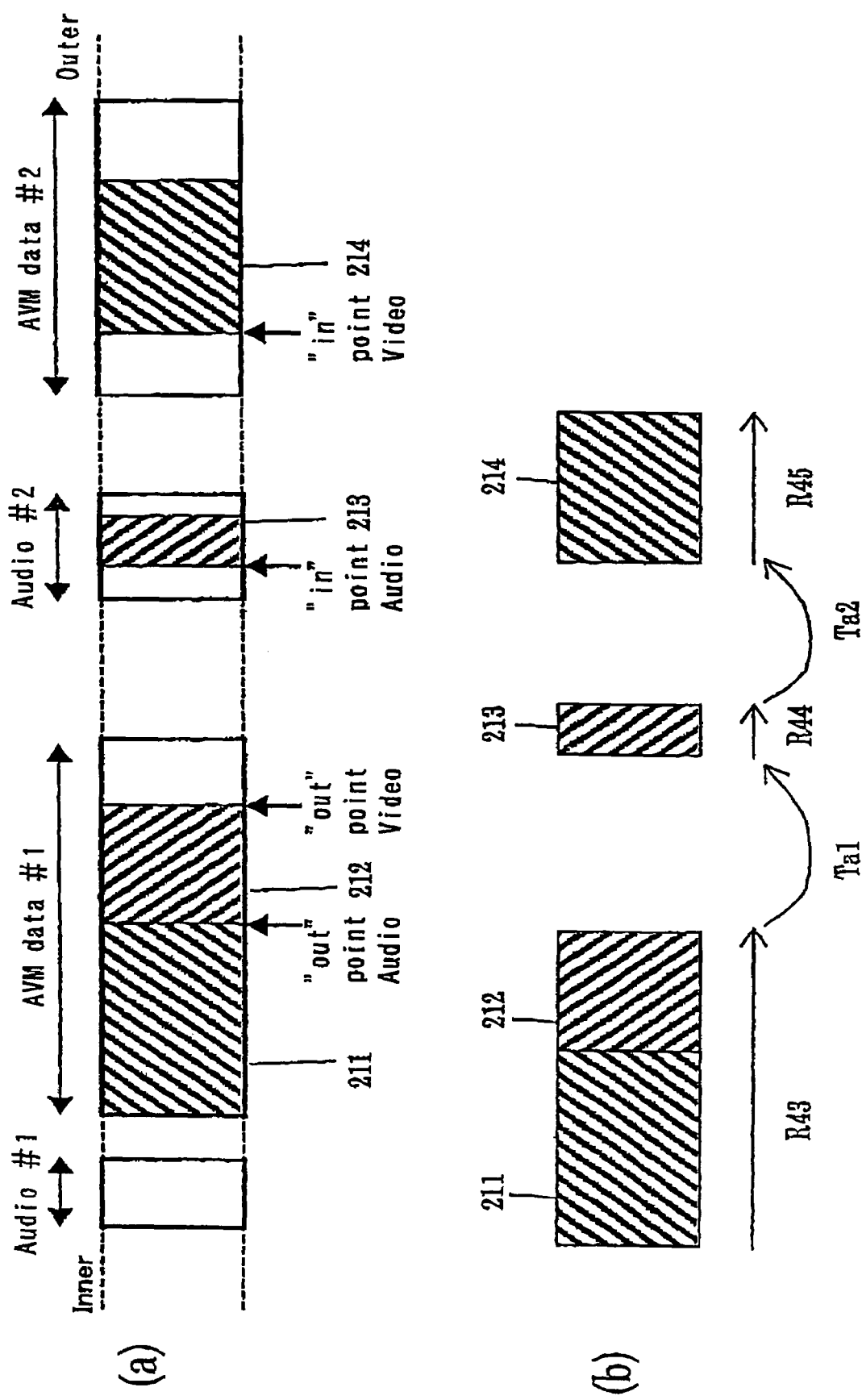
FIG. 24 shows an arrangement of AV-split-edited video data and audio data of AVM data and access operations for reproduction in the case where audio data recorded in a different area Is used according to the sixth example of the present invention.

Part (b) of FIG. 24 shows the access operations. The recording areas 211 and 212 are read continuously (R43). After the access operation of Ta1, the recording area 213 is read (R44). After an access operation of Ta2, the recording area 214 is read.

The condition for simultaneous reproduction for video data regarding the operations from R43 to Ta2 is as follows.

$$YV+VdV \geq (TcY+(a+c) \times Ts+Tsp+TspA+Ta1+Ta2)$$

$$YV=(TcY+TcV) \times Vt \times (VdV+Vd)$$

Accordingly, $$YV/VdV \geq ((a+c) \times Ts+TspA+Ta1+Ta2) \times Vt+(Vt-Vd)$$

The condition for simultaneous reproduction for audio data regarding the operations from R43 to Ta1 is as follows.

$$YA'+VdA \geq (TcY+a \times Ts+Tsp+Ta1)$$

$$YA'=TcY \times Vt \times (VdA+Vd)$$

Accordingly, $$YA'+VdA \geq (a \times Ts+Tsp \times Vt+Vd+Ta1) \times Vt+(Vt-Vd)$$

The necessary buffer size (S) for AVM data is:

$$B \geq (Ta1+TspA+Ta2+(a+c) \times Ts) \times Vd$$

The buffer size (B-extra) for the audio data which is independently decoded is:

$$B\text{-}extraA \geq TspA \times (Vt-VdA)$$

TspA is the net time required for reading audio data in the recording area 213 for split editing. "a" is the number of defective ECC blocks to be skipped in the recording area 211 and 212. "c" is the number of defective ECC blocks to be skipped in the recording area 213. Even when the time of split editing is longer, AV split editing is possible by using audio data which is identical to, but is recorded in a different area from, the audio data of the AVM data.

Regarding the audio data, data of two channels, i.e., L channel and R channel may be recorded in one recording area. Alternatively, data of four channels, i.e., L1 channel, R1 channel, L2 channel, and R2 channel may be recorded in one recording area. In this case, the transfer rate of the audio data is in proportion to the number of channels.

INDUSTRIAL APPLICABILITY

With an information recording medium according to the present invention, a recording operation and a reproduction operation are switched to each other in accordance with the amounts of data accumulated in the buffer memories. Accordingly, the recording buffers are controlled to be in a state close to empty. Therefore, even in a situation where recording cannot be executed by the pickup for a prescribed period of time, simultaneous recording can be performed stably. Since the recording operations are switched at an appropriate timing, simultaneous recording can be realized with a small buffer memory capacity. In the case where data is assigned such that the areas in which data is to be recorded have at least the minimum size required for the number of access operations which is twice the number of pieces of real time data, data which is recorded by one apparatus can be reproduced by another apparatus. Thus, reproduction compatibility is guaranteed.

By setting an optimal simultaneous recording condition utilizing different transfer rates of the data to be recorded, data having a low transfer rate can be recorded in a smaller recording area, which improves the utilization efficiency of the disc.

By estimating the inter-extent access time based on the access performance of the drive, an appropriate minimum size of the extent can be obtained.

Since the condition for simultaneous recording is similar to the condition for simultaneous reproduction, these conditions are usable for a search, editing or the

The invention claimed is:

1. A method for simultaneously recording a plurality of pieces of real time data on an information recording medium in accordance with a simultaneous recording model,
wherein the simultaneous recording model includes a pickup P for accessing an area on the information recording medium, an encoding module EMi for encoding real time data Di, and a recording buffer WBi for accumulating the encoded real time data Di,
the method comprising the steps of:
searching for an unassigned area in a volume space in the information recording medium and assigning at least one unassigned area in the volume space as an area Ai in which the real time data Di is to be recorded;
executing a recording operation Wi for recording the real time data Di accumulated in the recording buffer WBi in the area Ai; and
determining whether the recording buffer WBi is empty or not while the recording operation Wi is being executed; when the recording buffer WBi is determined to be empty, switching the recording operation Wi to another recording operation Wj (i≠j); and when the recording buffer WBi is determined not to be empty, continuing the recording operation Wi;
wherein:
the plurality of pieces of real time data to be recorded include data to be encoded by a variable rate;
each of the at least one area assigned as the area Ai is structured to fulfill a simultaneous recording condition that the recording buffer WBi is made empty by at most one access operation and at most two recording operations; and
i is an integer where 1≦i≦n, and n is an integer where n≧2 which represents the number of the plurality of pieces of real time data for simultaneous recording.

2. A method according to claim 1, wherein:
each of the at least one area assigned as the area Ai has a size of Y or greater;

$Y = 2 \times n \times Ta \times Vd \times Vt \div (Vt - n \times Vd)$;

Ta is an access time required for the pickup P to access between an innermost area and an outermost area of the information recording medium;
Vt is a data transfer rate between the pickup P and the recording buffer WBi; and
Vd is a data transfer rate between the encoding module EMi and the recording buffer WBi for all values of i.

3. A method according to claim 1, wherein:
each of the at least one area assigned as the area Ai has a size of Yi or greater;

$Yi = (2 \times n \times Ta \times Vt \times Vdi) \div \{Vt - (Vd1 + Vd2 + \ldots + Vdn)\}$;

Ta is an access time required for the pickup P to access between an innermost area and an outermost area of the information recording medium;
Vt is a data transfer rate between the pickup P and the recording buffer WBi; and
Vdi is a data transfer rate between the encoding module EMi and the recording buffer WBi.

4. A method according to claim 1, further comprising the steps of estimating a first access time required for the pickup P to access from the area Ai to an area Aj and a second access time required for the pickup P to access from one area among the at least one area assigned as the area Ai to another area.

5. A method according to claim 4, wherein:
each of the at least one area assigned as the area Ai has a size of Y or greater;

$Y = \{2 \times (T1 + \ldots + Tn) \times Vt \times Vd\} \div (Vt - n \times Vd)$;

Ti is the first access time or the second access time;
Vt is a data transfer rate between the pickup P and the recording buffer WBi; and
Vd is a data transfer rate between the encoding module EMi and the recording buffer WBi for all values of i.

6. A method according to claim 4, wherein:
each of the at least one area assigned as the area Ai has a size of Yi or greater;

$Yi = \{2 \times (T1 + \ldots + Tn) \times Vt \times Vdi\} \div \{Vt - (Vd1 + Vd2 + \ldots + Vdn)\}$;

Ti is the first access time or the second access time;
Vt is a data transfer rate between the pickup P and the recording buffer WBi; and
Vdi is a data transfer rate between the encoding module EMi and the recording buffer WBi.

7. A method according to claim 1, wherein the area Ai is provided in an outer portion of the information recording medium for all values of i.

8. An information recording apparatus for simultaneously recording a plurality of pieces of real time data on an information recording medium in accordance with a simultaneous recording model,
wherein the simultaneous recording model includes a pickup P for accessing an area on the information recording medium, an encoding module EMi for encoding real time data Di, and a recording buffer WBi for accumulating the encoded real time data Di,
the information recording apparatus comprising:
means for searching for an unassigned area in a volume space in the information recording medium and assigning at least one unassigned area in the volume space as an area Ai in which the real time data Di is to be recorded;
means for executing a recording operation Wi for recording the real time data Di accumulated in the recording buffer WBi in the area Ai; and means for determining whether the recording buffer WBi is empty or not while the recording operation Wi is being executed; when the recording buffer WBi is determined to be empty, switching the recording operation Wi to another recording operation Wj (i≠j); and when the recording buffer WBi is determined not to be empty, continuing the recording operation Wi;

wherein:

the plurality of pieces of real time data to be recorded include data to be encoded by a variable rate;

each of the at least one area assigned as the area Ai is structured to fulfill a simultaneous recording condition that the recording buffer WBi is made empty by at most one access operation and at most two recording operations; and i is an integer where 1≦i≦n, and n is an integer where n≧2 which represents the number of the plurality of pieces of real time data for simultaneous recording.

9. An information recording medium having a plurality of pieces of real time data recorded thereon in accordance with a simultaneous recording model.

wherein:

the simultaneous recording model includes a pickup P for accessing an area on the information recording medium, an encoding module EMi for encoding real time data Di, and a recording buffer WBi for accumulating the encoded real time data Di;

each of at least one area assigned as an area Ai in which the real time data Di accumulated in the recording buffer WBi is to be recorded is structured to fulfill a simultaneous recording condition that the recording buffer WBi is made empty by at most one access operation and at most two recording operations;

the plurality of pieces of real time data to be recorded include data to be encoded by a variable rate; and i is an integer where 1≦i≦n, and n is an integer where n≧2 which represents the number of the plurality of pieces of real time data for simultaneous recording, wherein:

each of the at least one area assigned as the area Ai has a size of Y or greater;

$$Y = 2 \times n \times Ta \times Vd \times Vt \div (Vt - n \times Vd);$$

Ta is an access time required for the pickup P to access between an innermost area and an outermost area of the information recording medium;

Vt is a data transfer rate between the pickup P and the recording buffer WBi; and Vd is a data transfer rate between the encoding module EMi and the recording buffer WBi for all values of i.

10. An information recording medium having a plurality of pieces of real time data recorded thereon in accordance with a simultaneous recording model, wherein:

the simultaneous recording model includes a pickup P for accessing an area on the information recording medium, an encoding module EMi for encoding real time data Di, and a recording buffer WBi for accumulating the encoded real time data Di;

each of at least one area assigned as an area Ai in which the real time data Di accumulated in the recording buffer WBi is to be recorded is structured to fulfill a simultaneous recording condition that the recording buffer WBi is made empty by at most one access operation and at most two recording operations;

the plurality of pieces of real time data to be recorded include data to be encoded by a variable rate; and i is an integer where 1≦i≦n. and n is an integer where n≧2 which represents the number of the plurality of pieces of real time data for simultaneous recording, wherein:

each of the at least one area assigned as the area Ai has a size of Yi or greater;

$$Y_i = (2 \times n \times Ta \times Vt \times Vdi) \div \{Vt - (Vd1 + Vd2 + \ldots + Vdn)\};$$

Ta is an access time required for the pickup P to access between an innermost area and an outermost area of the information recording medium;

Vt is a data transfer rate between the pickup P and the recording buffer WBi; and Vdi is a data transfer rate between the encoding module EMi and the recording buffer WBi.

11. An information recording medium having a plurality of pieces of real time data recorded thereon in accordance with a simultaneous recording model, wherein:

the simultaneous recording model includes a pickup P for accessing an area on the information recording medium, an encoding module EMi for encoding real time data Di, and a recording buffer WBi for accumulating the encoded real time data Di;

each of at least one area assigned as an area Ai in which the real time data Di accumulated in the recording buffer WBi is to be recorded is structured to fulfill a simultaneous recording condition that the recording buffer WBi is made empty by at most one access operation and at most two recording operations;

the plurality of pieces of real time data to be recorded include data to be encoded by a variable rate: and i is an integer where 1≦i≦n. and n is an integer where n≧2 which represents the number of the plurality of pieces of real time data for simultaneous recording, wherein:

each of the at least one area assigned as the area Ai has a size of Y or greater;

$$Y = \{2 \times (T1 + \ldots + Tn) \times Vt \times Vd\} \div (Vt - n \times Vd);$$

Ti is an estimated first access time required for the pickup P to access from the area Ai to an area Aj or an estimated second access time required for the pickup P to access from one area among the at least one area assigned as the area Ai to another area;

Vt is a data transfer rate between the pickup P and the recording buffer WBi; and Vd is a data transfer rate between the encoding module EMi and the recording buffer WBi for all values of i.

12. An information recording medium having a plurality of pieces of real time data recorded thereon in accordance with a simultaneous recording model, wherein:

the simultaneous recording model includes a pickup P for accessing an area on the information recording medium, an encoding module EMi for encoding real time data Di, and a recording buffer WBi for accumulating the encoded real time data Di;

each of at least one area assigned as an area Ai in which the real time data Di accumulated in the recording buffer WBi is to be recorded is structured to fulfill a simultaneous recording condition that the recording buffer WBi is made empty by at most one access operation and at most two recording operations;

the plurality of pieces of real time data to be recorded include data to be encoded by a variable rate: and i is an integer where $1 \leq i \leq n$, and n is an integer where $n \geq 2$ which represents the number of the plurality of pieces of real time data for simultaneous recording, wherein:

each of the at least one area assigned as the area Ai has a size of Yi or greater;

$$Yi=\{2\times(T1+\ldots+Tn)\times Vt\times Vdi\}\div\{Vt-(Vd1+Vd2+\ldots+Vdn)\};$$

Ti is an estimated first access time required for the pickup P to access from the area Ai to an area Aj or an estimated second access time required for the pickup P to access from one area among the at least one area assigned as the area Ai to another area;

Vt is a data transfer rate between the pickup P and the recording buffer WBi; and Vdi is a data transfer rate between the encoding module EMi and the recording buffer WBi.

13. An information recording medium having a plurality of pieces of real time data recorded thereon in accordance with a simultaneous recording model, wherein:

the simultaneous recording model includes a pickup P for accessing an area on the information recording medium, an encoding module EMi for encoding real time data Di, and a recording buffer WBi for accumulating the encoded real time data Di;

each of at least one area assigned as an area Ai in which the real time data Di accumulated in the recording buffer WBi is to be recorded is structured to fulfill a simultaneous recording condition that the recording buffer WBi is made empty by at most one access operation and at most two recording operations;

the plurality of pieces of real time data to be recorded include data to be encoded by a variable rate; and i is an integer where $1 \leq i \leq n$, and n is an integer where $n \geq 2$ which represents the number of the plurality of pieces of real time data for simultaneous recording, wherein the area Ai is provided in an outer portion of the information recording medium for all values of i.

14. A method for simultaneously reproducing a plurality of pieces of real time data recorded on an information recording medium in accordance with a simultaneous reproduction model, wherein the simultaneous reproduction model includes a pickup P for accessing an area on the information recording medium, a reproduction buffer RBi for accumulating real time data Di read from the information recording medium, and a decoding module DMi for decoding the real time data Di accumulated in the reproduction buffer RBi, the method comprising the steps of:

executing a reproduction operation Ri for reading the real time data Di from an area Ai having the real time data Di recorded therein; and determining whether the reproduction buffer RBi is full or not while the reproduction operation Ri is being executed; when the reproduction buffer RBi is determined to be full, switching the reproduction operation Ri to another reproduction operation Rj ($i \neq j$); and when the reproduction buffer RBi is determined not to be full, continuing the reproduction operation Ri;

wherein:

the plurality of pieces of real time data to be reproduced include data to be encoded by a variable rate;

each of at least one area assigned as the area Ai is structured to fulfill a simultaneous reproduction condition that the reproduction buffer RBi is made full by at most one access operation and at most two reproduction operations; and i is an integer where $1 \leq i \leq n$, and n is an integer where $n \geq 2$ which represents the number of the plurality of pieces of real time data for simultaneous reproduction.

15. A method according to claim 14, wherein:

each of the at least one area assigned as the area Ai has a size of Y or greater;

$$Y=2\times n\times Ta\times Vd\times Vt\div(Vt-n\times Vd);$$

Ta is an access time required for the pickup P to access between an innermost area and an outermost area of the information recording medium;

Vt is a data transfer rate between the pickup P and the reproduction buffer RBi; and Vd is a data transfer rate between the decoding module DMi and the reproduction buffer RBi for all values of i.

16. A method according to claim 14, wherein:

each of the at least one area assigned as the area Ai has a size of Yi or greater;

$$Yi=(2\times n\times Ta\times Vt\times Vdi)\div\{Vt-(Vd1+Vd2+\ldots+Vdn)\};$$

Ta is an access time required for the pickup P to access between an innermost area and an outermost area of the information recording medium;

Vt is a data transfer rate between the pickup P and the reproduction buffer RBi; and Vdi is a data transfer rate between the decoding module DMi and the reproduction buffer RBi.

17. A method according to claim 14, further comprising the steps of estimating a first access time required for the pickup P to access from the area Ai to an area Aj and a second access time required for the pickup P to access from one area among the at least one area assigned as the area Ai to another area.

18. A method according to claim 17, wherein:

each of the at least one area assigned as the area Ai has a size of Y or greater;

$$Y=\{2\times(T1+\ldots+Tn)\times Vt\times Vd\}\div(Vt-n\times Vd);$$

Ti is the first access time or the second access time;

Vt is a data transfer rate between the pickup P and the reproduction buffer RBi; and Vd is a data transfer rate between the decoding module DMi and the reproduction buffer RBi for all values of i.

19. A method according to claim 17, wherein:

each of the at least one area assigned as the area Ai has a size of Yi or greater;

$$Yi=\{2\times(T1+\ldots+Tn)\times Vt\times Vdi\}\div\{Vt-(Vd1+Vd2+\ldots+Vdn)\};$$

Ti is the first access time or the second access time;

Vt is a data transfer rate between the pickup P and the reproduction buffer RBi; and Vdi is a data transfer rate between the decoding module DMi and the reproduction buffer RBi.

20. A method according to claim 14, wherein the area Ai is provided in an outer portion of the information recording medium for all values of i.

21. A method according to claim 14, wherein real time data D1 through Dn include video data and a plurality of pieces of audio data, and a portion of the video data and at least one piece of the plurality of pieces of audio data are simultaneously reproduced.

22. An information reproduction apparatus for simultaneously reproducing a plurality of pieces of real time data recorded on an information recording medium in accordance with a simultaneous reproduction model, wherein the simultaneous reproduction model includes a pickup P for accessing an area on the information recording medium, a reproduction buffer RBi for accumulating real time data Di read from the information recording medium, and a decoding module DMi for decoding the real time data Di accumulated in the reproduction buffer RBi, the information reproduction apparatus comprising:

means for executing a reproduction operation Ri for reading the real time data Di from an area Ai having the real time data Di recorded therein; and means for determining whether the reproduction buffer RBi is full or not while the reproduction operation Ri is being executed; when the reproduction buffer RBi is determined to be full, switching the reproduction operation Ri to another reproduction operation Rj ($i \neq j$); and when the reproduction buffer RBi is determined not to be full, continuing the reproduction operation Ri;

wherein:

the plurality of pieces of real time data to be reproduced include data to be encoded by a variable rate;

each of at least one area assigned as the area Ai is structured to fulfill a simultaneous reproduction condition that the reproduction buffer RBi is made full by at most one access operation and at most two reproduction operations; and i is an integer where $1 \leq i \leq n$, and n is an integer where $n \geq 2$ which represents the number of the plurality of pieces of real time data for simultaneous reproduction.

* * * * *

UNITED STATES PATENT AND TRADEMARK OFFICE
CERTIFICATE OF CORRECTION

PATENT NO.        : 7,529,160 B2                                           Page 1 of 1
APPLICATION NO. : 10/488195
DATED             : May 5, 2009
INVENTOR(S)       : Yoshiho Gotoh et al.

It is certified that error appears in the above-identified patent and that said Letters Patent is hereby corrected as shown below:

Title Page, item (54), the title should read -- METHOD AND APPARATUS FOR SIMULTANEOUS RECORDING AND REPRODUCTION, AND INFORMATION RECORDING MEDIUM THEREFOR --.

Column 52, line 32, "rate:" should read -- rate; --.

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,529,160 B2  
APPLICATION NO. : 10/488195  
DATED : May 5, 2009  
INVENTOR(S) : Yoshiho Gotoh et al.

Page 1 of 1

It is certified that error appears in the above-identified patent and that said Letters Patent is hereby corrected as shown below:

Title Page, item (54) and Column 1, lines 1-4, the title should read -- METHOD AND APPARATUS FOR SIMULTANEOUS RECORDING AND REPRODUCTION, AND INFORMATION RECORDING MEDIUM THEREFOR --.

Column 52, line 32, "rate:" should read -- rate; --.

This certificate supersedes the Certificate of Correction issued November 10, 2009.

Signed and Sealed this

First Day of December, 2009

David J. Kappos  
*Director of the United States Patent and Trademark Office*